(12) United States Patent
Tokuchi et al.

(10) Patent No.: US 11,500,510 B2
(45) Date of Patent: Nov. 15, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Kengo Tokuchi, Kanagawa (JP); Takahiro Okayasu, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/323,403

(22) Filed: May 18, 2021

(65) Prior Publication Data

US 2022/0197480 A1 Jun. 23, 2022

(30) Foreign Application Priority Data

Dec. 21, 2020 (JP) .............................. JP2020-211704

(51) Int. Cl.
*G06F 3/04815* (2022.01)
*G02B 27/01* (2006.01)
*G06F 3/04817* (2022.01)
*G06F 3/04842* (2022.01)
*G06F 3/01* (2006.01)

(52) U.S. Cl.
CPC ..... *G06F 3/04815* (2013.01); *G02B 27/0172* (2013.01); *G06F 3/011* (2013.01); *G06F 3/04817* (2013.01); *G06F 3/04842* (2013.01); *G02B 2027/014* (2013.01)

(58) Field of Classification Search
CPC .. G06F 3/04815; G06F 3/011; G06F 3/04817; G06F 3/04842; G02B 27/0172; G02B 2027/014
See application file for complete search history.

(56) References Cited

U.S. PATENT DOCUMENTS

| | | | |
|---|---|---|---|
| 8,751,969 B2 | 6/2014 | Matsuda et al. | |
| 10,198,620 B2* | 2/2019 | Guo | G06F 16/5838 |
| 10,540,005 B2* | 1/2020 | Yoon | G06Q 20/352 |
| 10,665,027 B2 | 5/2020 | Leppanen et al. | |
| 10,983,347 B2* | 4/2021 | Kim | G02F 1/137 |
| 2010/0208033 A1* | 8/2010 | Edge | G06T 19/006 348/46 |
| 2017/0235377 A1* | 8/2017 | Margolina | G06F 3/04815 715/849 |
| 2019/0340816 A1* | 11/2019 | Rogers | G06F 3/013 |

FOREIGN PATENT DOCUMENTS

| | | |
|---|---|---|
| JP | 5263049 B2 | 8/2013 |
| JP | 2019-125986 A | 7/2019 |
| JP | 6633220 B2 | 1/2020 |
| WO | 2019/142659 A1 | 7/2019 |

* cited by examiner

*Primary Examiner* — Cao H Nguyen
(74) *Attorney, Agent, or Firm* — Oliff PLC

(57) ABSTRACT

An information processing apparatus includes a processor configured to: control a device that disposes a virtual image in real space; and dispose, in a case where the device disposes the virtual image in front of a physical display device with an external terminal including the physical display device connected to the information processing apparatus, a button for requesting an operation of the external terminal as the virtual image.

20 Claims, 42 Drawing Sheets

FACE TURNS LEFTWARD FROM DISPLAY 11

------▶ DIRECTION OF LINE OF SIGHT

FACE TURNS UPWARD FROM DISPLAY 11

------▶ DIRECTION OF LINE OF SIGHT

FIG. 29C 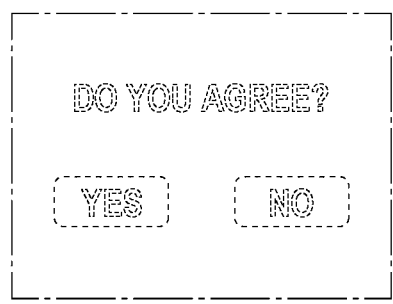 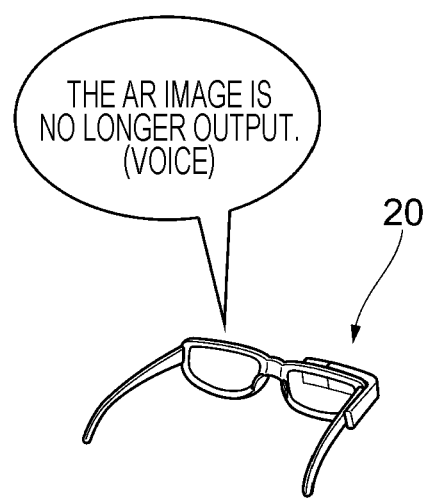

PERSON A

PERSON A

PERSON B

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-211704 filed Dec. 21, 2020.

BACKGROUND

(i) Technical Field

The present disclosure relates to an information processing apparatus and a non-transitory computer readable medium.

(ii) Related Art

There are currently techniques for presenting a virtual world where real world and virtual visual information are combined together. These techniques are called "augmented reality (AR)" and "mixed reality (MR)" (e.g., refer to Japanese Patent No. 5263049).

SUMMARY

With the spread of devices that achieve experience of AR, MR, or the like (hereinafter referred to as "XR devices"), it is now expected that there will be more opportunities to see both a screen displayed on a physical display device (hereinafter referred to as a "real screen") and a virtual image displayed by an XR device at the same time. For example, a virtual image might be disposed in front of a display device.

Aspects of non-limiting embodiments of the present disclosure relate to cooperation between a virtual image and a display device at a time when the virtual image is disposed in front of the display device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: control a device that disposes a virtual image in real space; and dispose, in a case where the device disposes the virtual image in front of a physical display device with an external terminal including the physical display device connected to the information processing apparatus, a button for requesting an operation of the external terminal as the virtual image.

BRIEF DESCRIPTION OF THE DRAWINGS

Exemplary embodiments of the present disclosure will be described in detail based on the following figures, wherein:

FIG. 15A illustrates a position at a time when the user is looking at the display; and FIG. 15B illustrates a position at a time when the user is looking leftward from the display;

FIG. 16A illustrates a position at a time when the user is looking at the display; and FIG. 16B illustrates a position at a time when the user is looking upward from the display;

FIG. 17A illustrates an example of a process cooperatively performed by the computer and the XR device; and FIG. 17B illustrates movement of the AR image;

FIG. 18A illustrates an example of a process for moving a cursor in the AR image to the display; and FIG. 18B illustrates an example of an operation performed by the user;

FIG. 19A illustrates another example of the process for moving the cursor displayed on the display to the AR image; and FIG. 19B illustrates another example of the operation performed by the user;

FIG. 20A illustrates another example of the process for moving the cursor in the AR image to the display; and FIG. 20B illustrates another example of the operation performed by the user;

FIG. 26A illustrates an example of a process performed when an XR device is turned off; and FIG. 26B illustrates an example of an output alarm;

FIG. 27A illustrates an example of a process performed when the user takes off the XR device; and FIG. 27B illustrates an example of an output alarm;

FIG. 28A illustrates an example of a process performed when a positional relationship between the XR device and the computer satisfies a predetermined condition, and FIG. 28B illustrates an example of an output alarm;

FIGS. 29A to 29D are diagrams illustrating an example of changes in an output AR image according to the ninth exemplary embodiment: FIG. 29A illustrates an example of an AR image output when a distance between the XR device and the computer is smaller than a threshold; and FIGS. 29B to 29D illustrate how the AR image fades out as the XR device and the computer become farther from each other;

FIG. 30A illustrates an example of an output AR image at a time when the distance between the XR device and the computer is greater than the threshold; and FIGS. 30B to 30D illustrate how the AR image fades in as the XR device and the computer become closer to each other;

FIG. 31A illustrates an example of a process performed when the XR device connects to the computer 10 again; and FIG. 31B illustrates a possible scene;

FIG. 35A illustrates an example of a screenshot at a certain time; and FIG. 35B illustrates an example of another screenshot at another time;

FIG. 39A illustrates a state before a person meets another person; and FIG. 39B illustrates a state after the person meets the other person;

DETAILED DESCRIPTION

Exemplary embodiments of the present disclosure will be described hereinafter with reference to the drawings.

First Exemplary Embodiment

Overall Configuration of System

Figure 1:
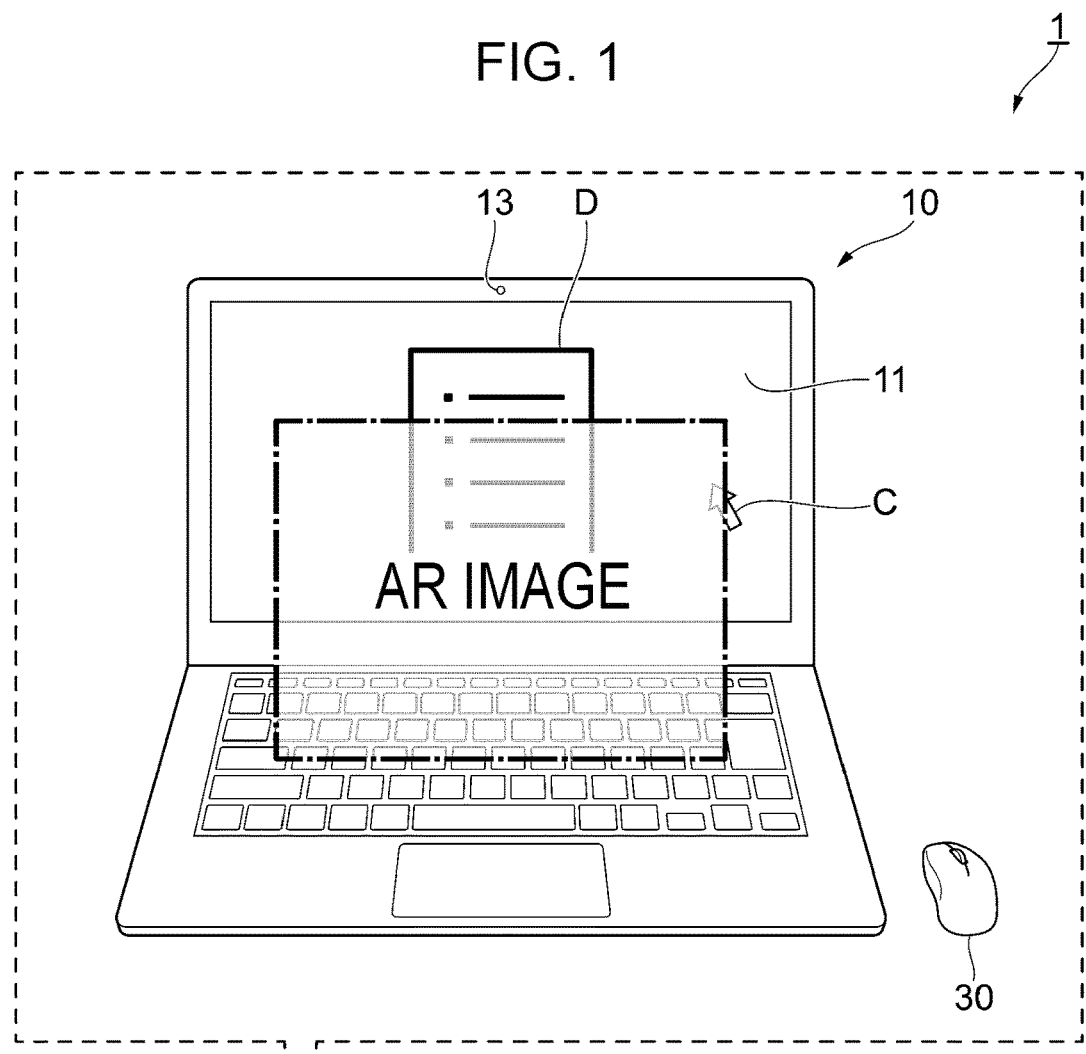
FIG. 1 is a diagram illustrating an example of use of an information processing system assumed in a first exemplary embodiment.
Figure 1:
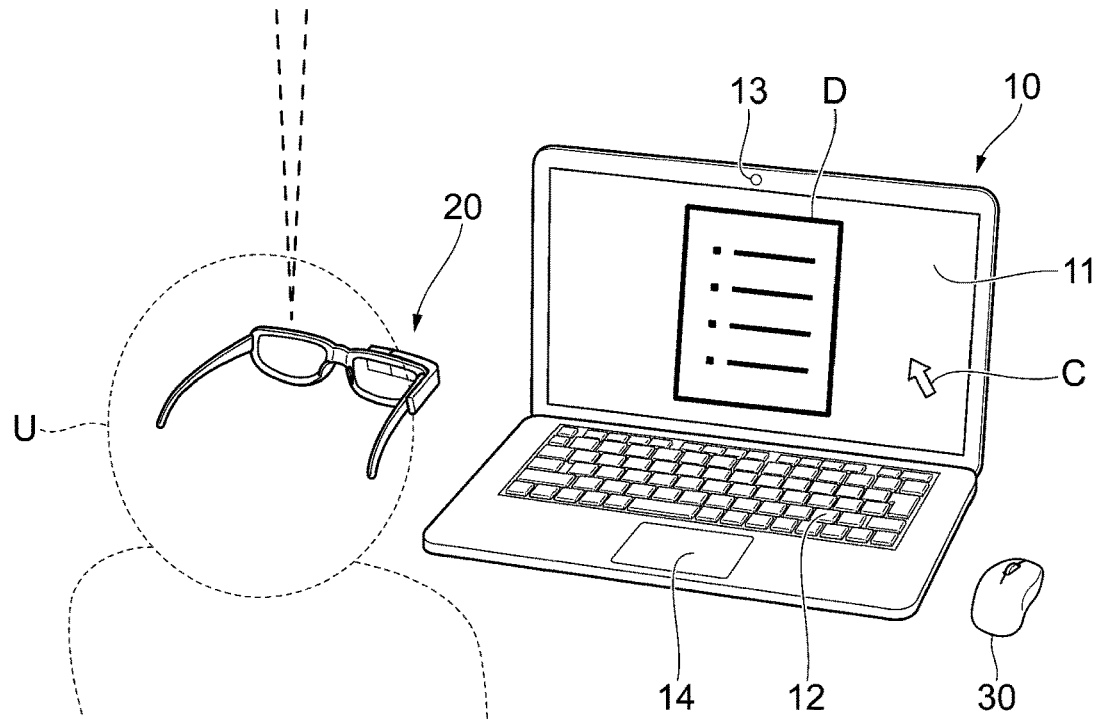

FIG. 1 is a diagram illustrating an example of use of an information processing system 1 assumed in a first exemplary embodiment.

The information processing system 1 illustrated in FIG. 1 includes a computer 10 and an XR device 20 connected to each other. A term "connected" herein refers to a communicable state.

In FIG. 1, one XR device 20 is connected to the information processing system 1. Plural XR devices 20, however, may be connected to the computer 10, instead. Alternatively, one XR device 20 may be connected to plural computers 10, or plural computers 10 and plural XR devices 20 may be connected to each other.

In FIG. 1, the computer 10 is a laptop computer. The computer 10, however, may be a desktop computer, a tablet computer, or a smartphone, instead. The computer 10 is an example of an external terminal in relation to the XR device 20.

The computer 10 includes a display 11, a keyboard 12, a camera 13, and a touchpad 14. The display 11 is an example of a physical display device and displays various pieces of information.

In FIG. 1, the display 11 displays a document D. A mouse 30 is used as a pointing device.

In FIG. 1, the XR device 20 is a glasses-type device worn on a head of a user U. The XR device 20 according to the present exemplary embodiment includes a camera and has a function of recognizing real space using captured images.

The XR device 20 equipped with a camera is also called an "AR glass" or an "MR glass". The XR device 20 according to the present exemplary embodiment may be a smart glass without a camera.

The XR device 20 is an example of an information processing apparatus that disposes, in real space, a virtual image (hereinafter also referred to as an "AR image") that does not exist in real space.

An AR image may be a two-dimensional image or a three-dimensional image. Although one AR image is disposed in the air in FIG. 1, plural AR images may be disposed in the air, instead. When plural AR images are disposed in the air, the AR Images may be arranged side-by-side or in a depth direction relative to the user U.

The AR image may be disposed at any position in real space. For example, the AR image may be disposed on the same plane as a screen of the display 11, in front of or behind the display 11, or outside the display 11. In the present exemplary embodiment, "outside the display 11" refers to a position at which the AR image does not overlap the display 11 in a direction of a line of sight of the user U.

In the present exemplary embodiment, the AR image is disposed in front of the display 11 is. In other words, the AR image and the display 11 at least partially overlap each other from a point of view of the user U.

In FIG. 1, a balloon defined by a broken line indicates a state of space recognized by the user U wearing the XR device 20. The user U sees an AR image overlapping the display 11.

Although a glasses-type device will be described as the XR device 20 in the present exemplary embodiment, the XR device 20 may be a head-mounted device, instead, which is worn on the head like a hat.

Configuration of Computer

Figure 2:
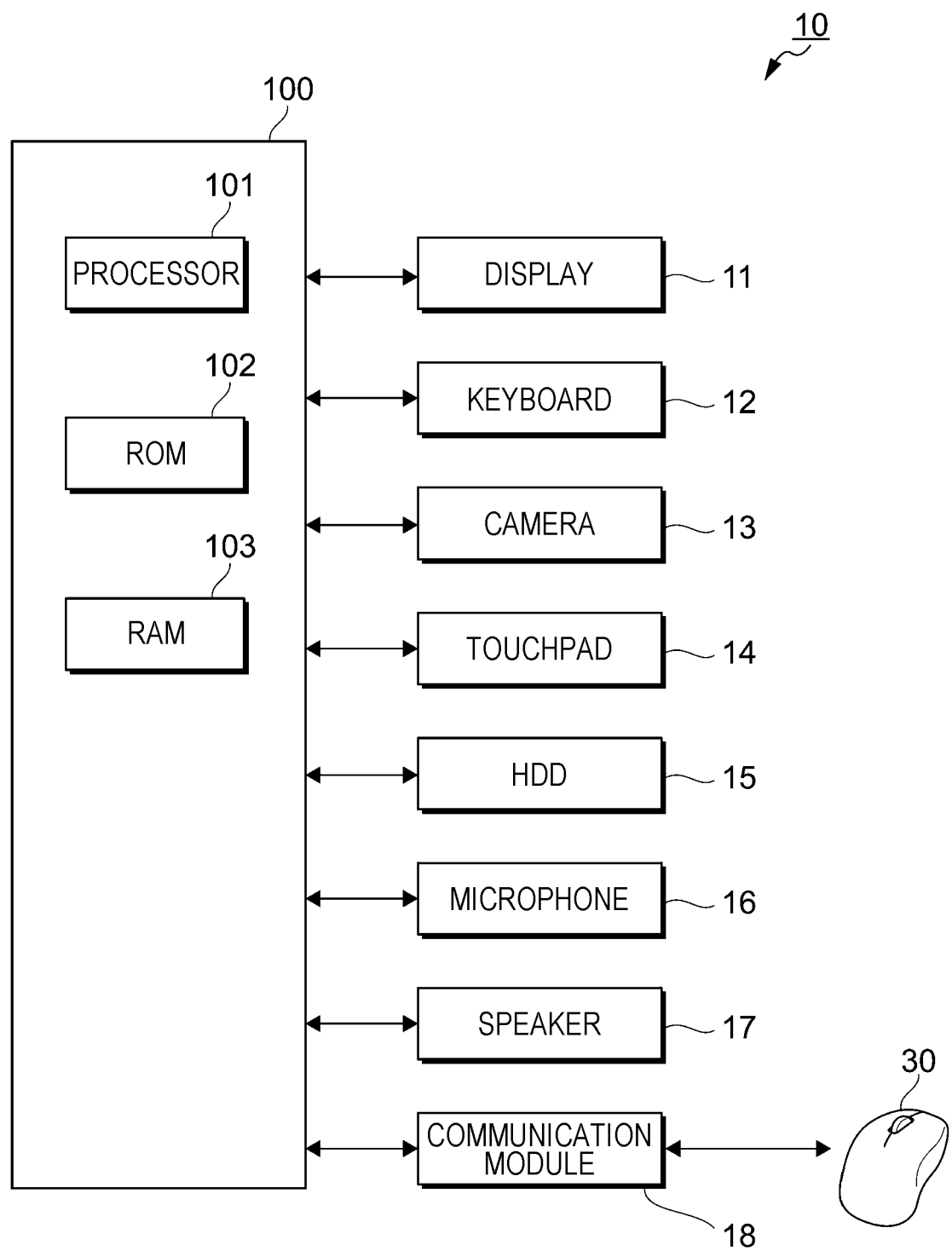
FIG. 2 is a diagram illustrating an example of the hardware configuration of a computer.

FIG. 2 is a diagram illustrating an example of the hardware configuration of the computer 10.

The computer 10 illustrated in FIG. 2 includes a data processing unit 100, the display 11, the keyboard 12, the camera 13, the touchpad 14, a hard disk drive (HDD) 15, a microphone 16, a speaker 17, and a communication module 18.

An organic electroluminescent (EL) display or a liquid crystal display, for example, is used as the display 11.

A translucent touch sensor that does not prevent the user U from seeing the display 11 may be provided on a surface of the display 11. The display 11 equipped with a touch sensor is also called a "touch panel". A capacitive film sensor, for example, is used as the touch sensor.

The keyboard 12 is used to input operations to the computer 10.

The camera 13 is attached to a frame of the display 11 or the like and used to capture images of the user U who operates the computer 10 and a scene in front of the display 11. The camera 13, however, may be removably attached to the computer 10, instead.

A complementary metal-oxide-semiconductor (CMOS) image sensor or a charge-coupled device (CCD) image sensor, for example, is used as the camera 13.

Even when the XR device 20 worn by the user U is a smart glass, it can be detected that the user U is in front of the computer 10 and that the user U is looking at the display 11, for example, by processing images captured by the camera 13.

The touchpad 14 is a pointing device and used to move a cursor or the like as with the mouse 30.

The HDD 15 is an auxiliary storage device that employs a magnetic disk as a storage medium. Although the HDD 15 is used as an auxiliary storage device in the present exemplary embodiment, a nonvolatile rewritable semiconductor memory may be used, instead. An operating system and application programs are installed on the HDD 15.

In the following description, the operating system and the application programs are not distinguished from one another and will be referred to as "programs".

The application programs will also be referred to as "applications" or "apps".

The HDD 15 stores data files to be processed by the computer 10.

The microphone 16 is a device that converts a sound into an electrical signal. Audio data obtained through the microphone 16 is stored in the HDD 15 or the like and used to perform an operation or make an input with sound.

The speaker 17 is a device that converts an electrical signal into a sound. The speaker 17 is used to output an alarm sound or a guide sound.

The communication module 18 communicates with external devices through, for example, Wi-Fi (registered trademark), Bluetooth (registered trademark), or Ethernet. The computer 10 and the XR device 20 according to the present exemplary embodiment are connected to each other through Bluetooth (registered trademark).

The data processing unit 100 includes a processor 101, a read-only memory (ROM) 102, and a random-access memory (RAM) 103.

The processor 101 is achieved, for example, by a central processing unit (CPU). The processor 101 achieves various functions by executing programs.

The ROM 102 and the RAM 103 are semiconductor memories. The ROM 102 stores basic input/output system (BIOS) and the like. The RAM 103 is used as a storage device for executing programs.

Configuration of XR Device

Figure 3:
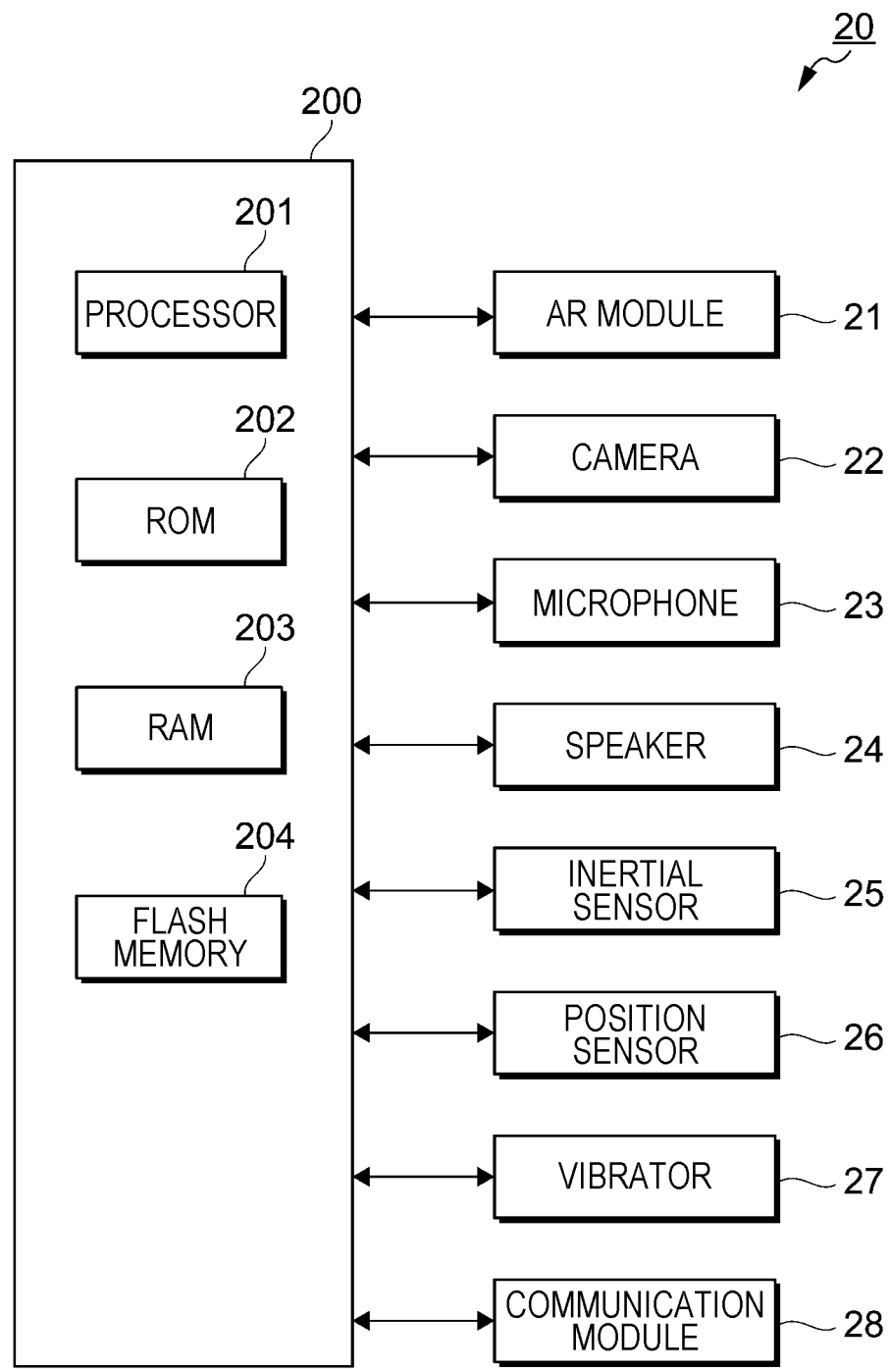
FIG. 3 is a diagram illustrating an example of the hardware configuration of an XR device.

FIG. 3 is a diagram illustrating an example of the hardware configuration of the XR device 20.

The XR device 20 illustrated in FIG. 3 includes a data processing unit 200, an AR module 21, a camera 22, a microphone 23, a speaker 24, an inertial sensor 25, a position sensor 26, a vibrator 27, and a communication module 28.

The AR module 21 allows the user U to see an AR image that does not exist in reality and includes optical and electronic components.

Typical methods employed by the AR module 21 include a method in which a one-way mirror is disposed in front of eyes of the user U, a method in which a volumetric hologram is disposed in front of the eyes of the user U, and a method in which a blazed grating is disposed in front of the eyes of the user U.

Alternatively, the AR module 21 may employ a method in which a small display is disposed in front of the eyes of the user U and an image obtained by combining together an image captured by the camera 22 and an AR image is displayed on the display 11.

In this method, an image processed using a dedicated algorithm is displayed on a display to which a translucent film in which a large number of minute pinholes are formed is attached. That is, a vivid image is displayed to the user U by combining together image processing based on the dedicated algorithm and adjustment of light. This technique has already been put into practice as a technique for correcting eyesight. Some vendors have announced that this technique will be used with glasses-type XR devices 20.

A CMOS image sensor or a CCD image sensor, for example, is used as the camera 22. Any number of cameras 22 may be used. When two cameras 22 are used, for example, the cameras 22 are arranged at both ends of a front part of the frame. When two cameras 22 are used, stereo imaging can be performed. Distances to subjects, therefore, can be measured, and positional relationships between the subjects can also be estimated.

The microphone 23 is a device for converting voice of the user U and other sounds into electrical signals.

The speaker 24 is a device for converting an electrical signal into a sound and outputting the sound. The speaker 24 may be a bone conduction speaker or a cartilage conduction speaker.

The speaker 24 may be a device independent of the XR device 20, instead, such as wireless earphones.

The inertial sensor 25 is achieved, for example, by a six-axis sensor. The six-axis sensor includes a three-axis acceleration sensor and a three-axis angular velocity sensor. Movement of the head of the user U wearing the XR device 20 is estimated on the basis of an output of the inertial sensor 25.

The position sensor 26 is a global positioning system (GPS) module that measures a position of the XR device 20 by receiving GPS signals transmitted from three or more GPS satellites.

An indoor positioning module may be separately provided as the position sensor 26, instead. The indoor positioning module may be, for example, a module that measures the position of the XR device 20 by receiving a Bluetooth low energy (BLE) beacon, a module that measures the position of the XR device 20 by receiving a Wi-Fi (registered trademark) signal, a module that measures the position of the XR device 20 through autonomous navigation, or a module that measures the position of the XR device 20 by receiving an indoor messaging system (IMES) signal.

The vibrator 27 is a device that generates continuous or intermittent vibration. The vibration generated by the vibrator 27 is used for a notification to the user U, such as an alarm.

The communication module 28 communicates with external devices through, for example, Wi-Fi (registered trademark), Bluetooth (registered trademark), or Ethernet. The computer 10 and the XR device 20 according to the present exemplary embodiment are connected to each other through Bluetooth (registered trademark).

The data processing unit 200 includes a processor 201, a ROM 202, a RAM 203, and a flash memory 204.

The processor 201 is achieved, for example, by a CPU. The processor 201 achieves various functions by executing programs.

The ROM 202 and the RAM 203 are semiconductor memories. The ROM 202 stores BIOS and the like. The RAM 203 is a storage device used to execute programs.

The flash memory 204 is used to store an operating system, firmware, programs, and data files. The flash memory 204 is used as an auxiliary storage device.

Figure 4:
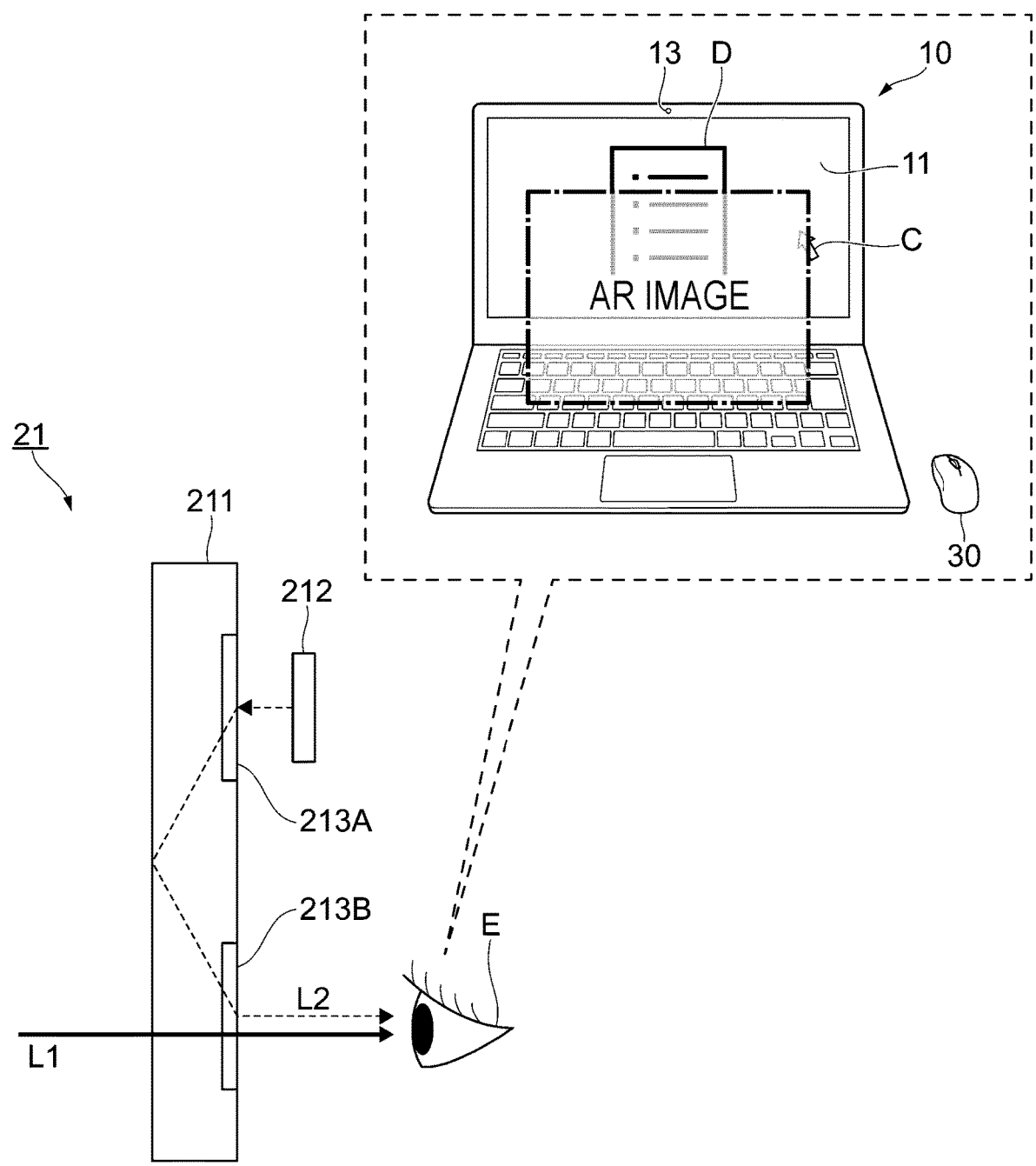
FIG. 4 is a diagram illustrating an example of the conceptual configuration of an AR module.

FIG. 4 is a diagram illustrating an example of the conceptual configuration of the AR module 21. The AR module 21 illustrated in FIG. 4 corresponds to the method in which a blazed grating is disposed in front of the eyes of the user U.

The AR module 21 illustrated in FIG. 4 includes a light guide plate 211, a microdisplay 212, a diffraction grating 213A to which image light L2 is input, and a diffraction grating 213B from which the image light L2 is output.

The light guide plate 211 is equivalent to lenses of glasses. The light guide plate 211 has a transmittance of, say, 85% or higher. The user U, therefore, can directly see a scene in front thereof through the light guide plate 211. Outside light L1 passes straight through the light guide plate 211 and the diffraction grating 213B and is incident on eyes E of the user U.

The microdisplay 212 is a display device that displays an AR image to be presented to the user U. Light of the AR image displayed on the microdisplay 212 is projected onto the light guide plate 211 as the image light L2. The image light L2 is refracted by the diffraction grating 213A, reflected inside the light guide plate 211, and reaches the diffraction grating 213B. The diffraction grating 213B refracts the image light L2 toward the eyes E of the user U.

As a result, the outside light L1 and the image light L2 are simultaneously incident on the eyes E of the user U. As a result, the user U recognizes the AR image as if the AR image exists in front of the computer 10 as indicated by a balloon in FIG. 4.

Process

Figure 5:
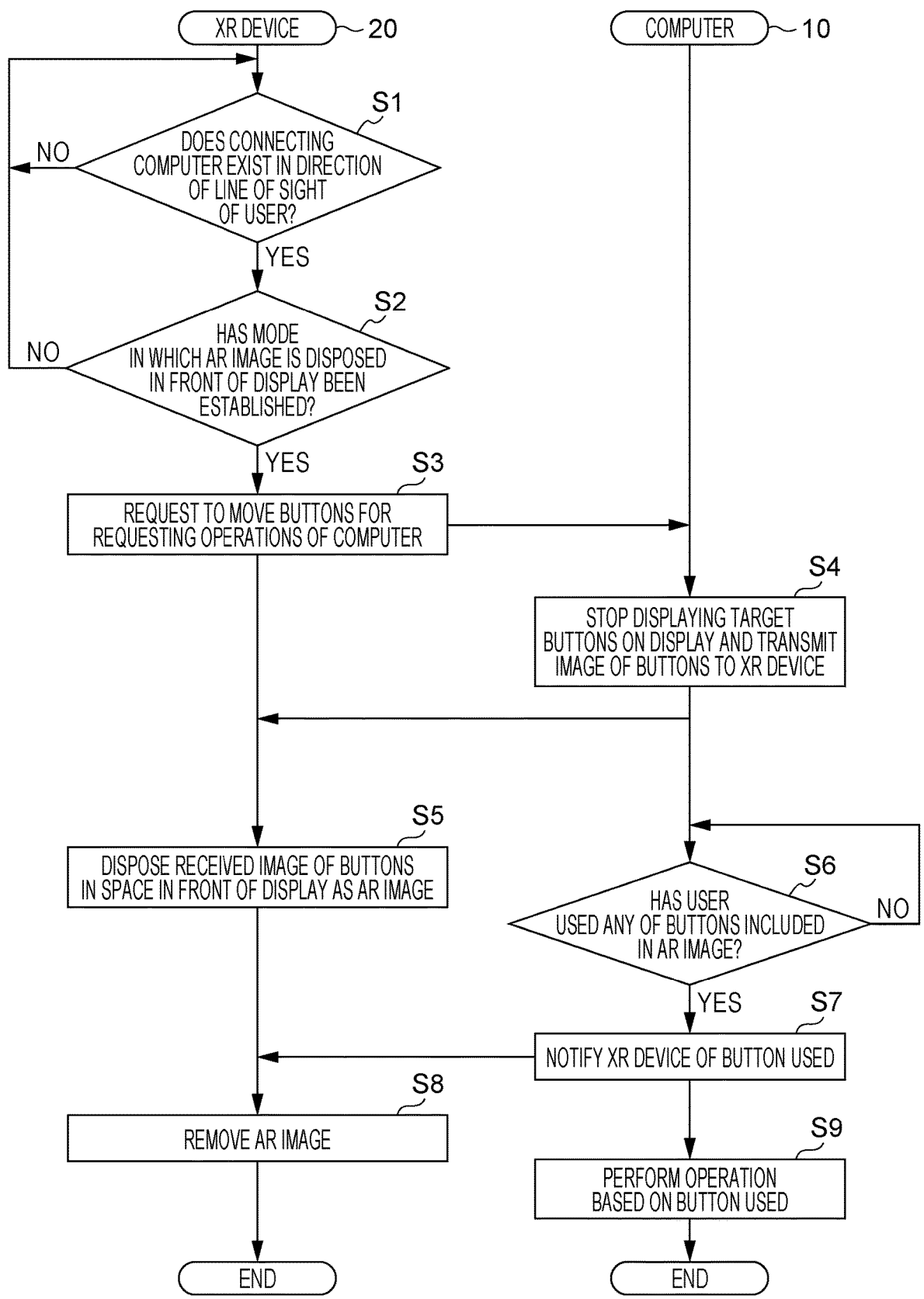
FIG. 5 is a diagram illustrating an example of a process cooperatively performed by the computer and the XR device according to a first exemplary embodiment.

FIG. 5 is a diagram illustrating an example of a process cooperatively performed by the computer 10 and the XR device 20 according to the first exemplary embodiment.

The computer 10 and the XR device 20 used in the present exemplary embodiment can operate independently of each other.

The computer 10, therefore, can operate independently when not cooperating with the XR device 20. For example, the user U can operate the computer 10 without wearing the XR device 20.

The XR device 20, too, can operate independently when not cooperating with the computer 10. For example, the user U wearing the XR device can see the AR image in real space even if the computer 10 is turned off.

The process illustrated in FIG. 5 assumes that the computer 10 and the XR device 20 can both operate independently.

In FIG. 5, the XR device 20 determines whether the display 11 (refer to FIG. 1) of the computer 10 to which the XR device 20 is connecting exists in the direction of the line of sight of the user U (step S1). In practice, the processor 201 (refer to FIG. 3) of the XR device 20 makes the determination.

It is assumed in the present exemplary embodiment that the direction of the line of sight of the user U is a direction to the center of an image capture range of the camera 22 (refer to FIG. 3) provided for the XR device 20. The center need not be a point but may have a predetermined area. This is because the user U tends to turn his/her face in a direction in which he/she is interested.

When the XR device 20 is provided with a sensor that tracks a user□s line of sight, a direction of the line of sight detected by the sensor may be used. Techniques for tracking a line of sight include a corneal reflex method, in which a reflection point of light is set on a cornea and an image of the cornea is captured, and an eye-tracking system, in which an image of a reflection pattern caused on a cornea is captured and then a dedicated image processing algorithm and a physiological three-dimensional model are used.

Whether the user U wears the XR device 20 can be detected using a contact sensor provided at a temple or a nose pad, for example, of the XR device 20.

While a negative result is obtained in step S1, the XR device 20 repeatedly makes the determination in step S1. In FIG. 5, the AR image is not fixed at particular coordinates in real space but changes coordinates thereof in accordance with changes in the direction of the line of sight. If the user wearing the XR device 20 is not looking at the computer 10, a negative result is obtained in step S1.

If a positive result is obtained in step S1, the XR device 20 determines whether a mode in which the AR image is disposed in front of the display 11 has been established (step S2).

If a negative result is obtained in step S2, the XR device 20 returns to the determination in step S1.

Alternatively, the determination in step S2 and the determination in step S1 may be switched. When the determination in step S2 is made before step S1, the XR device 20 repeatedly makes the determination in step S2 while a negative result is obtained in step S2.

If a positive result is obtained in step S2, the XR device 20 requests the computer 10 to move buttons for requesting operations of the computer 10 (step S3). When an image of a browser is displayed on the display 11, for example, the buttons for requesting operations include a page close button, a next page button, a previous page button, and a link button.

When the computer 10 has executed an app for creating and editing the document D (hereinafter also referred to as "office software"), for example, the buttons for requesting operations include buttons and menus arranged in a toolbar.

The buttons for requesting operations also include shortcut icons associated with certain files and applications displayed on a desktop, in a taskbar or a start menu, and the like and icons for notification.

For example, a shortcut icon might be used to open a certain file. Another shortcut icon might be used to activate an application associated therewith.

The icons for notification include an icon displayed on the display 11 when a message is received in an email app or a short message app (hereinafter also referred to a "message app").

In the present exemplary embodiment, buttons and icons used by the user U to request operations of the computer 10 will be generically referred to as "buttons".

Buttons to be moved from the display 11 to an AR image need not be all the buttons for requesting operations, but may be only predetermined buttons.

For example, only buttons used for selection (hereinafter also referred to as "selection buttons") and buttons used for making determinations (hereinafter also referred to as "determination buttons") may be moved, and other buttons may remain on the display 11. The movement of buttons includes movement of a dialog box including buttons to be moved.

The buttons used for selection include not only buttons with two choices, such as "Yes/No", "Agree/Disagree", "OK/Cancel", and "Next/Back", but also buttons with three or more choices. The buttons with three or more choices include "Permit All Applications/Warn Before Installing Non-Store Applications/Permit Only Store Applications", and "Save/Not Save/Cancel". A sign "/" means "or".

The selection buttons include buttons used to select whether to perform an operation. The selection buttons are used to select whether to perform operations such as installation, uninstallation, downloading, uploading, activation, termination, transmission, reception, opening, and closing.

In the present exemplary embodiment, such operations include operations that results in a change to the system configuration of the computer 10, such as installation, uninstallation, downloading, and uploading of a program.

The determination buttons include an "OK" button displayed along with a message such as "Press OK to start process". The determination buttons also include an "authenticate" button displayed along with a message such as "Input authentication code".

In the present exemplary embodiment, the determination buttons include buttons for confirmation (hereinafter also referred to as "confirmation buttons"). When confirmation buttons include options, such buttons are classified into selection buttons.

Upon receiving the request in step S3, the computer 10 stops displaying the target buttons on the display 11 and transmits an image of the buttons to the XR device 20 (step S4).

Next, the XR device 20 disposes the received image of the buttons in a space in front of the display 11 as an AR image (step S5).

As illustrated in FIG. 1, the space in front of the display 11 refers to a space between the display 11 of the computer 10 and the XR device 20. In the present exemplary embodiment, the space in front of the display 11 refers to a part of a space between the display 11 of the computer 10 and the XR device 20 in which the AR image overlaps the display 11 from the point of view of the user U wearing the XR device 20.

In the present exemplary embodiment, movement of a cursor C or use of a button in the AR image is performed using the mouse 30 (refer to FIG. 1) connected to the computer 10. That is, in the present exemplary embodiment, the cursor C is moved using the mouse 30 even while the AR image is displayed.

The cursor C, however, may be displayed on the display 11 in a part of the space in which the AR image does not overlap the display 11 from the point of view of the user U.

If the cursor C is moved out of the display 11, the cursor C may be displayed in the AR image. With this setting, if the user U moves the cursor C displayed on the display 11 out of the display 11, the cursor C is displayed on one of the buttons in the AR image. As a result, the user U can perform operations on both an image displayed on the display 11 and the AR image only with the mouse 30.

The user U can still use the keyboard 12 (refer to FIG. 1), the touchpad 14 (refer to FIG. 1), and the like even while the AR image is presented to the user U.

Even while the AR image is presented to the user U, therefore, the user U can input text or browse web images, for example, using the keyboard 12 or the like.

The XR device 20 and the computer 10 according to the present exemplary embodiment share coordinates in real space, where the AR image is disposed.

On the basis of the above assumption, the computer 10 according to the present exemplary embodiment continues to monitor requests from the user U given through the cursor C even when the cursor C is no longer displayed on the display 11.

That is, even when the buttons are no longer displayed on the display 11, the computer 10 determines whether the user U has used any of the buttons included in the AR image (step S6).

While a negative result is obtained in step S6, the computer 10 repeatedly makes the determination in step S6. If a button that has not been moved to the AR image is used, however, an operation based on the button used is performed.

If a positive result is obtained in step S6, the computer 10 notifies the XR device 20 of the button used (step S7).

Upon being notified in step S7, the XR device 20 removes the AR image (step S8). That is, the XR device 20 no longer disposes, in front of the display 11, the AR image including the buttons for requesting operations of the computer 10.

Buttons irrelevant to the button used, however, may continue to be presented as an AR image. In addition, an AR image relating to information regarding execution of the button used and various alarms may continue to be disposed.

After performing step S7, the computer 10 performs an operation based on the button used (step S9). The computer 10 displays the cursor C on the display 11 again as necessary.

EXAMPLES OF PRESENTATION

First Example

Figure 6:
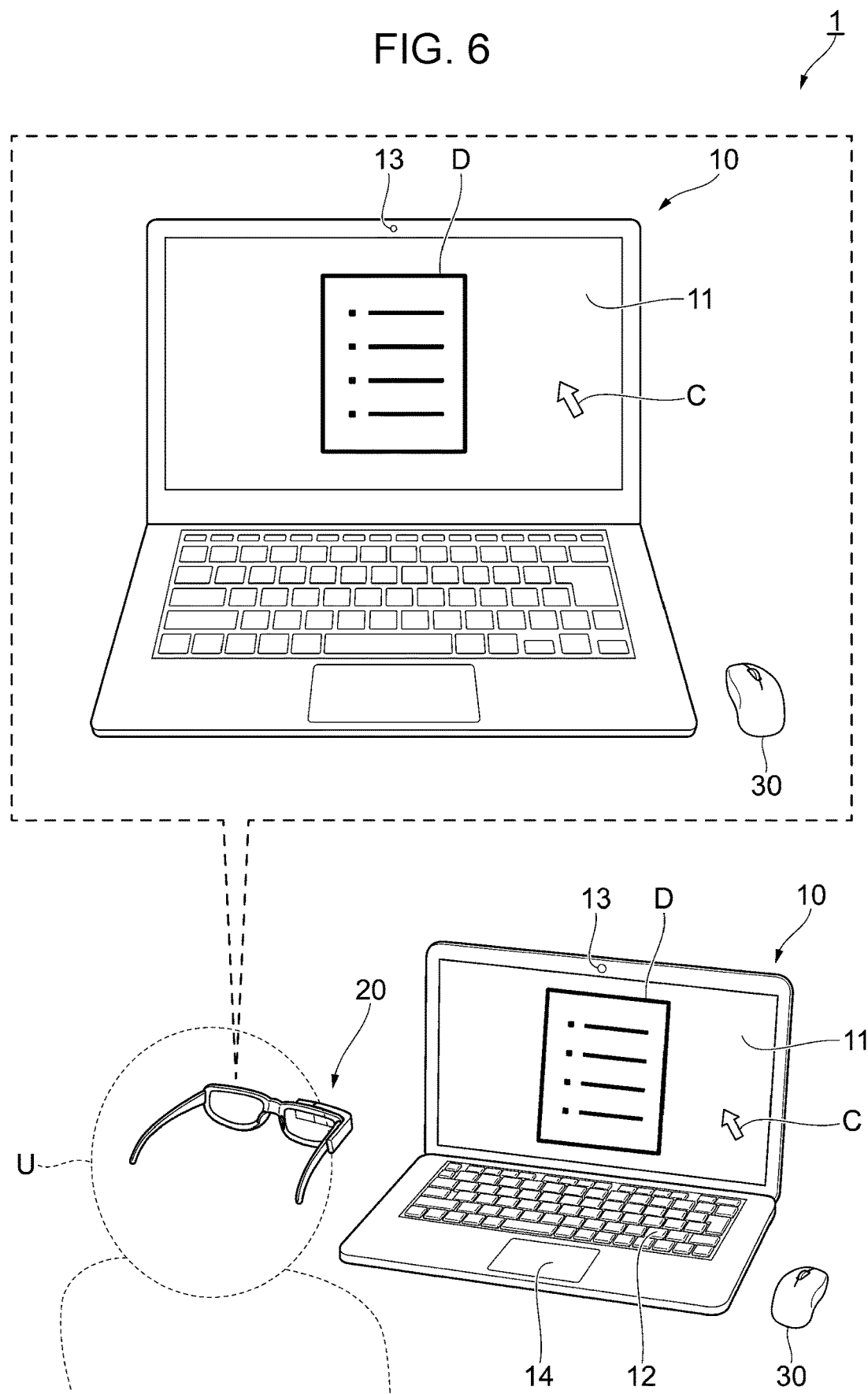
FIG. 6 is a diagram illustrating an example of presentation at a time when a mode in which an AR image is disposed in front of a display has not been established.

FIG. 6 is a diagram illustrating an example of presentation at a time when the mode in which an AR image is disposed in front of the display 11 has not been established.

In FIG. 6, the same components as in FIG. 1 are given the same reference numerals. The presentation illustrated in FIG. 6 also applies when the XR device 20 and the computer 10 are not connected to each other.

The presentation illustrated in FIG. 6 corresponds to a case where a negative result has been obtained in step S1 (refer to FIG. 5) or step S2 (refer to FIG. 5).

A balloon in FIG. 6 indicates how the user U wearing the XR device 20 recognizes a space in front thereof. The user U sees the space as it is in reality.

The document D and the cursor C are displayed on the display 11. The document D is an example of content.

Figure 7:
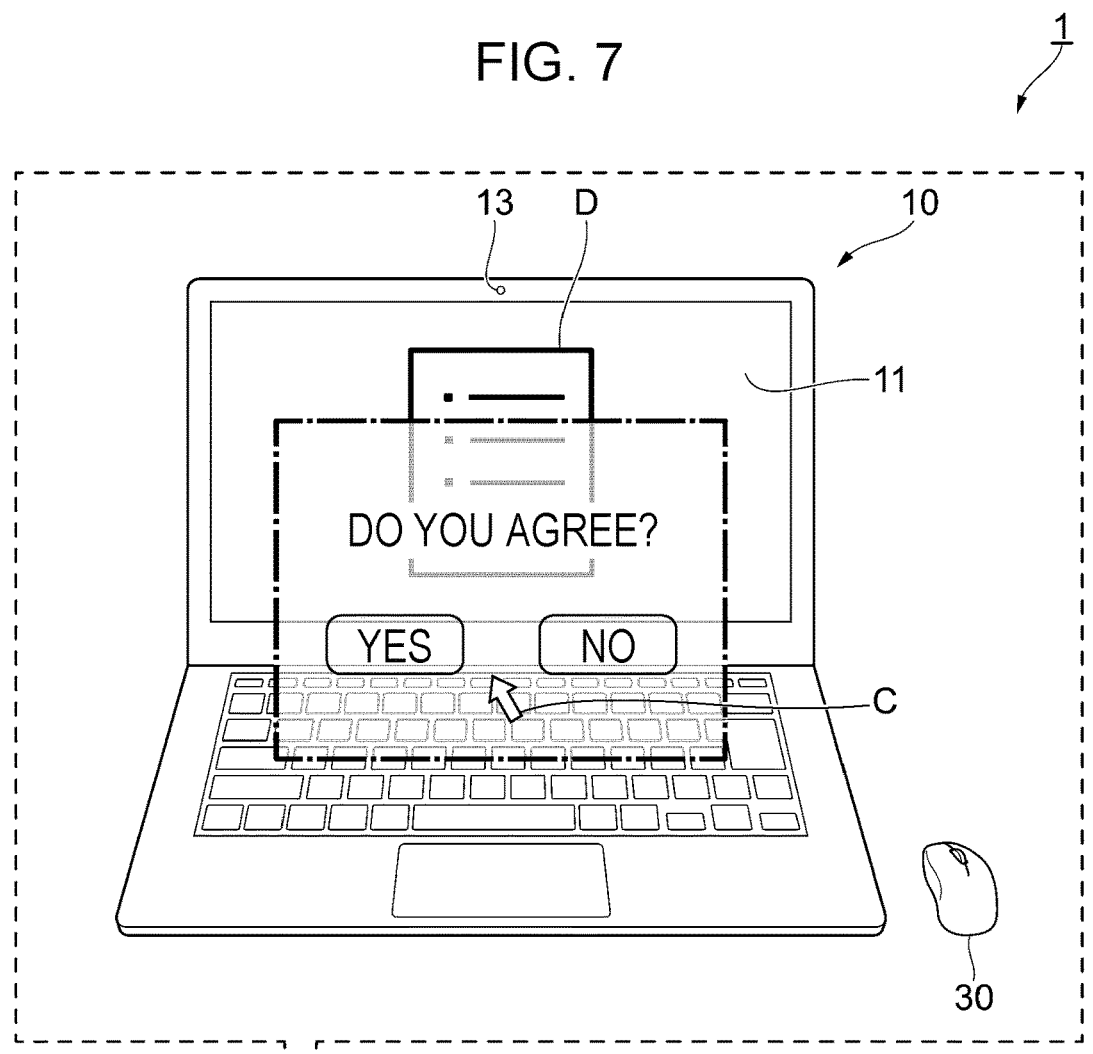
FIG. 7 is a diagram illustrating an example of presentation at a time when the mode in which an AR image is disposed in front of the display has been established.
Figure 7:
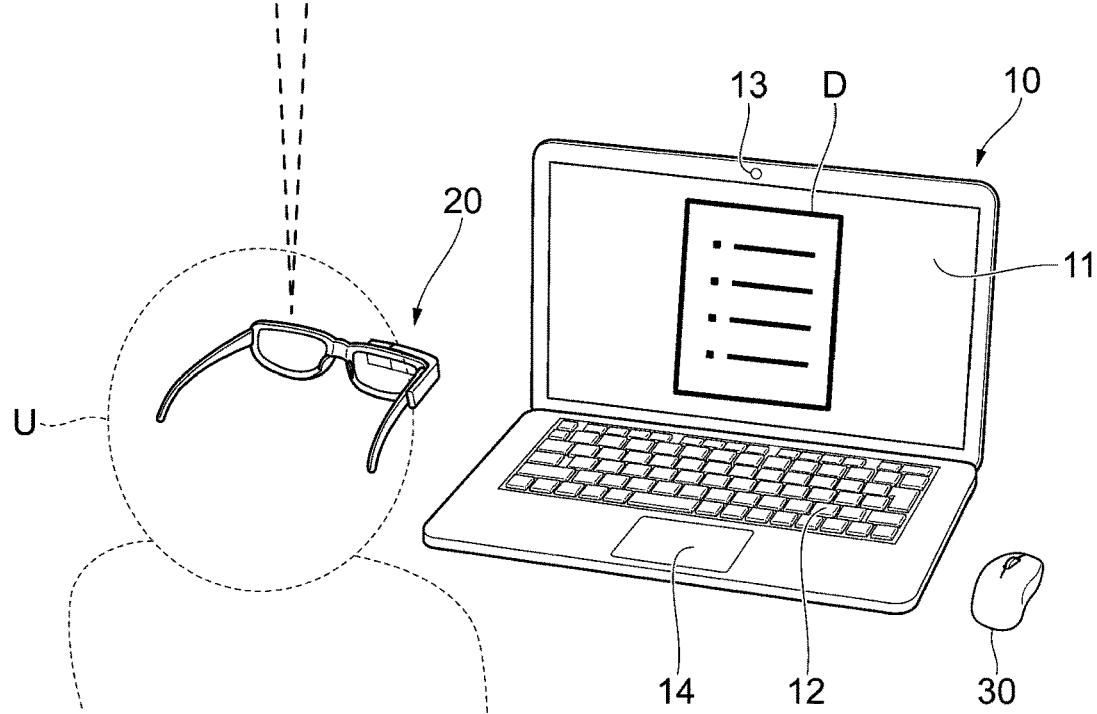

FIG. 7 is a diagram illustrating an example of presentation at a time when the mode in which an AR image is disposed in front of the display 11 has been established. In FIG. 7, the same components as in FIG. 6 are given the same reference numerals.

The presentation illustrated in FIG. 7 corresponds to a case where a positive result has been obtained in both step S1 (refer to FIG. 5) and S2 (refer to FIG. 5).

A balloon in FIG. 7 indicates how the user U wearing the XR device 20 recognizes the space in front thereof. In FIG. 7, the user U sees an AR image that does not exist in real space.

In FIG. 7, the AR image includes a message, "Do you agree?", a "Yes" button, a "No" button, and the cursor C. The AR image illustrated in FIG. 7 is an example of a dialog box including selection buttons.

The dialog box illustrated in FIG. 7 assumes, for example, a case where the display 11 displays a document D that requires consent between persons.

Since the cursor C has moved to the AR image in FIG. 7, the display 11 of the computer 10 does not display the cursor C.

When the user U uses the mouse 30 in FIG. 7, the cursor C in the AR image moves. The user left-clicks with the cursor C on the "Yes" or "No" button to cause the computer 10 to perform a process corresponding to the button.

Because the AR image is translucent in FIG. 7, the user U sees what the display 11 displays behind the AR image. That is, the user U sees the document D.

Depending on a method employed by the AR module 21 (refer to FIG. 3), however, the AR image can be made less transparent, instead, so that the user U does not see what the display 11 displays.

The AR image is presented until the user selects the "Yes" or "No" button.

By disposing the AR image closer to the user U than the screen of the display 11 is, it becomes possible to attract attention of the user U to the dialog box. In other words, it becomes less likely that the user U overlooks the dialog box.

Especially in the case of the AR image according to the present exemplary embodiment, which is disposed in the air closer to the user U than to the display 11, the user is likely to notice the dialog box.

In addition, since the AR image is disposed in front of the display 11 until the user U selects one of the buttons, it is unlikely that the user U forgets to select one of the buttons even when the user performs another operation before selecting one of the buttons. When the display 11 displays a dialog box, for example, the dialog box including a button to be selected might hind behind a window in which the user is performing another operation, and the user might forget to select the button.

In addition, when the AR image continues to be disposed in front of the display 11, the visibility of the display 11 decreases depending on a position and size of the AR image, which prompts the user U to select one of the buttons.

Second Example

Figure 8:
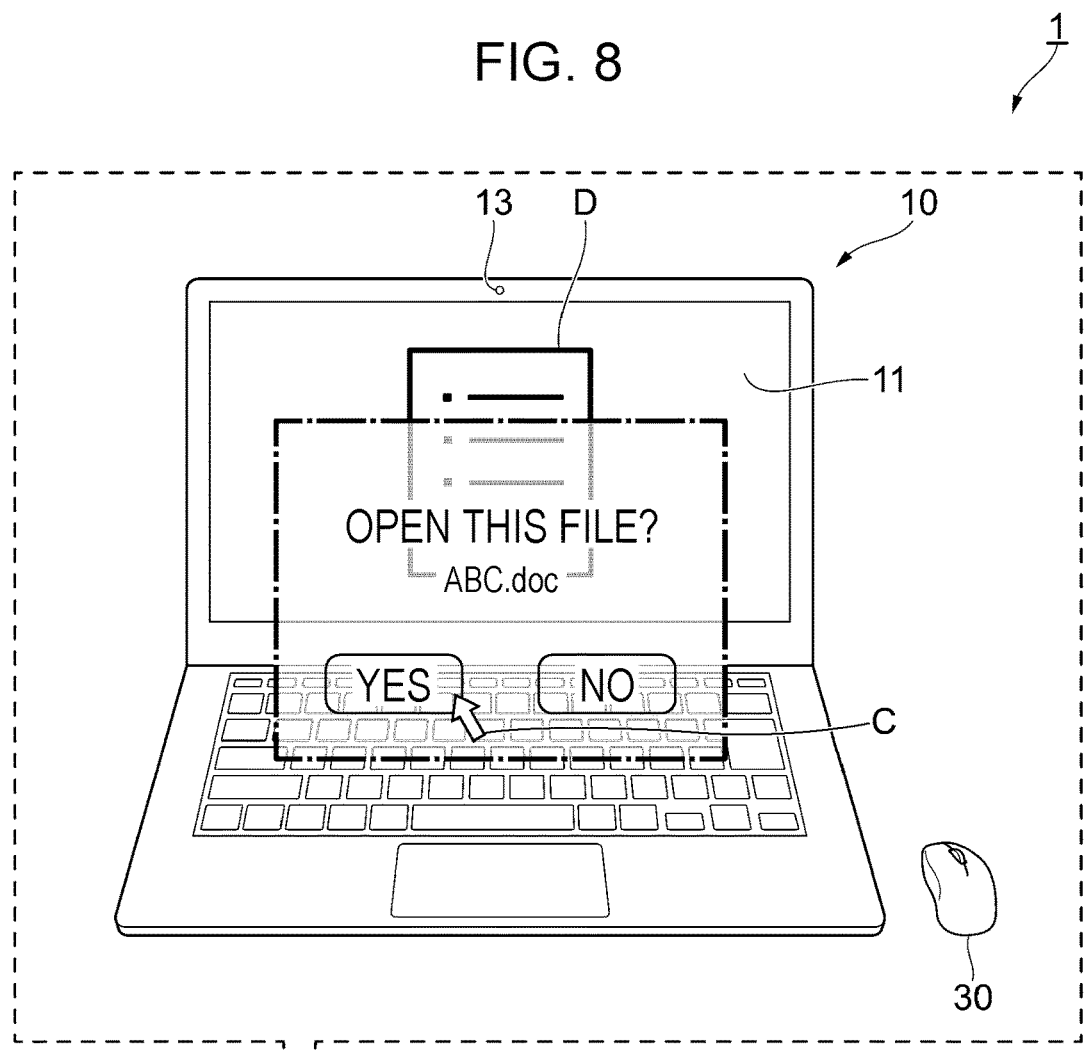
FIG. 8 is a diagram illustrating another example of the presentation at a time when the mode in which an AR image is disposed in front of the display has been established.
Figure 8:
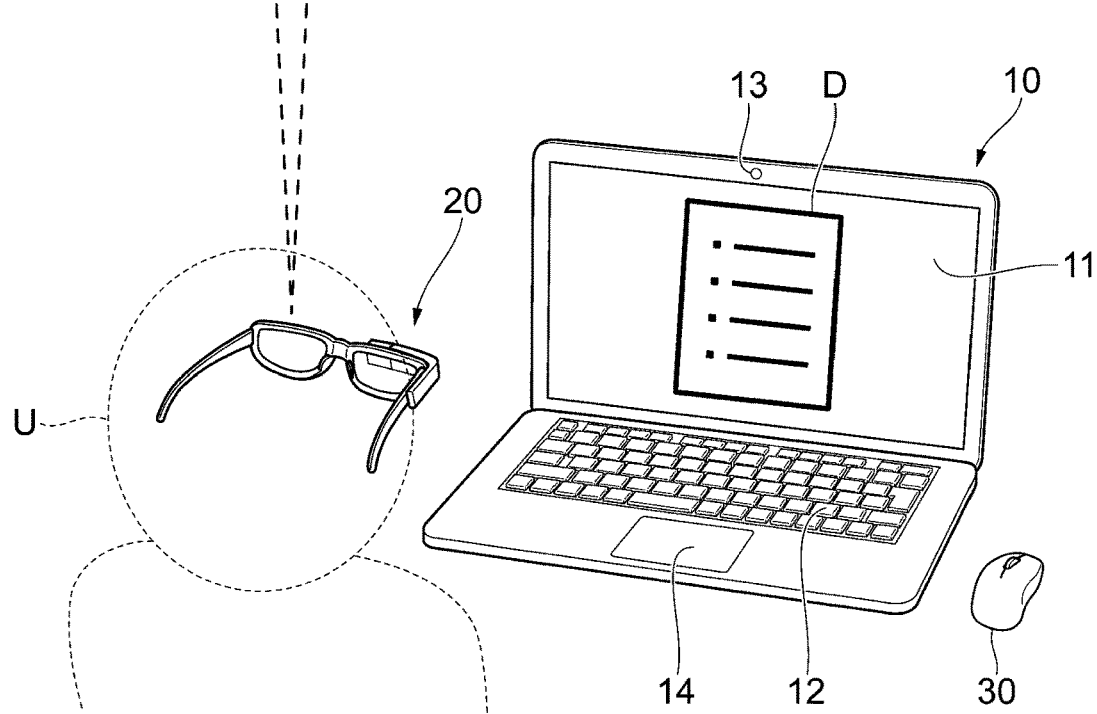

FIG. 8 is a diagram illustrating another example of the presentation at a time when the mode in which an AR image is disposed in front of the display 11 has been established. In FIG. 8, the same components as in FIG. 7 are given the same reference numerals.

A balloon in FIG. 8, too, indicates how the user U wearing the XR device 20 recognizes the space in front thereof.

In FIG. 8, the AR image includes a message, "Open this file?", a file name "ABC.doc", a "Yes" button, a "No" button, and the cursor C. The AR image illustrated in FIG. 8 is another example of the dialog box including buttons used for selection.

The dialog box illustrated in FIG. 8 is presented to the user U before the user U opens a file of the document D to be processed by the computer 10.

The document D according to the present exemplary embodiment may be a text document, a two-dimensional drawing generated by a drawing application, a two-dimensional or three-dimensional drawing generated by a computer-aided design (CAD) application, a photograph, a still image such as an image obtained by a scanner, a moving image such as a video, facsimile data, an email, log data, data regarding device settings, or the like.

Alternatively, the document D may be medical data such as an X-ray photograph or a computed tomography (CT) image, data regarding an application such as a video game, or map data.

Third Example

Figure 9:
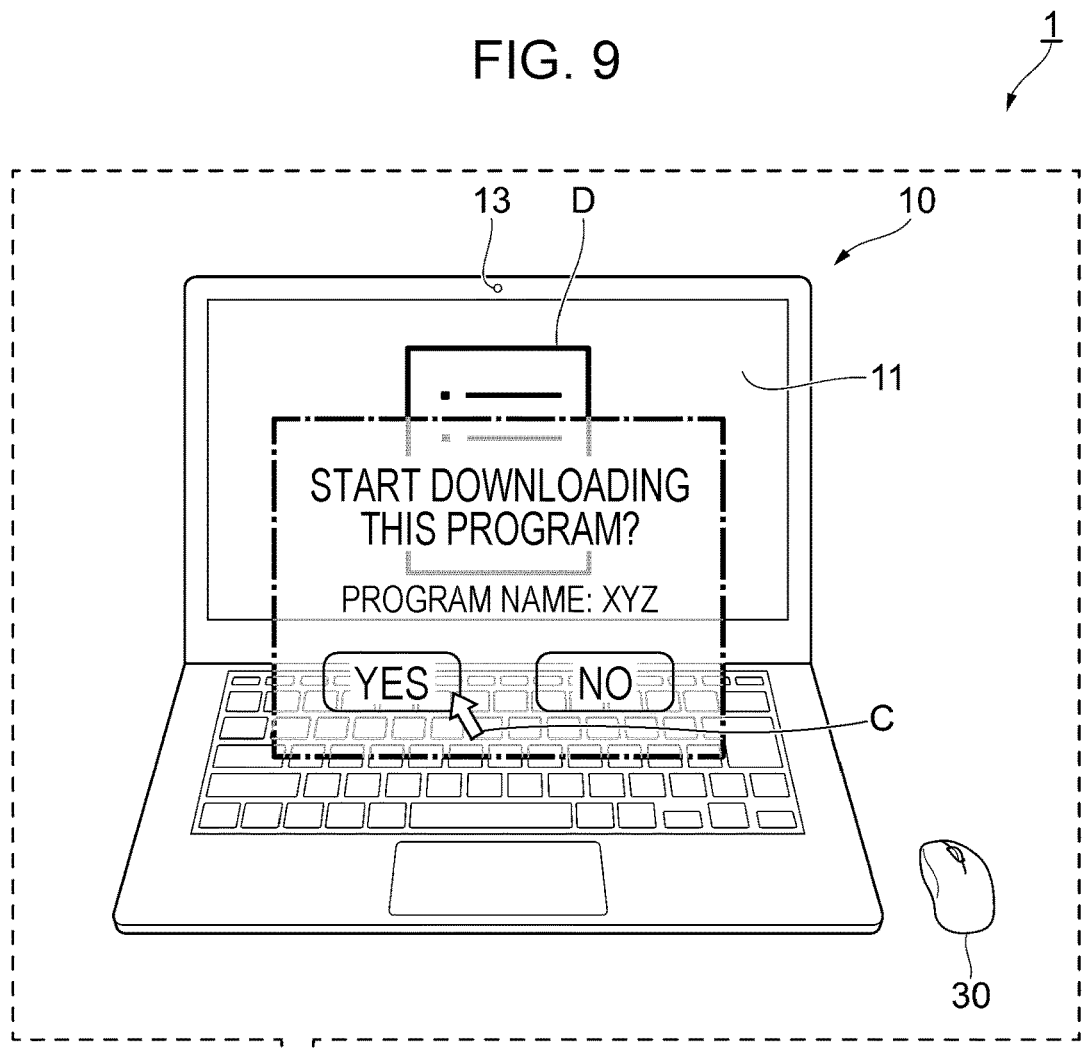
FIG. 9 is a diagram illustrating another example of the presentation at a time when the mode in which an AR image is disposed in front of the display has been established.
Figure 9:
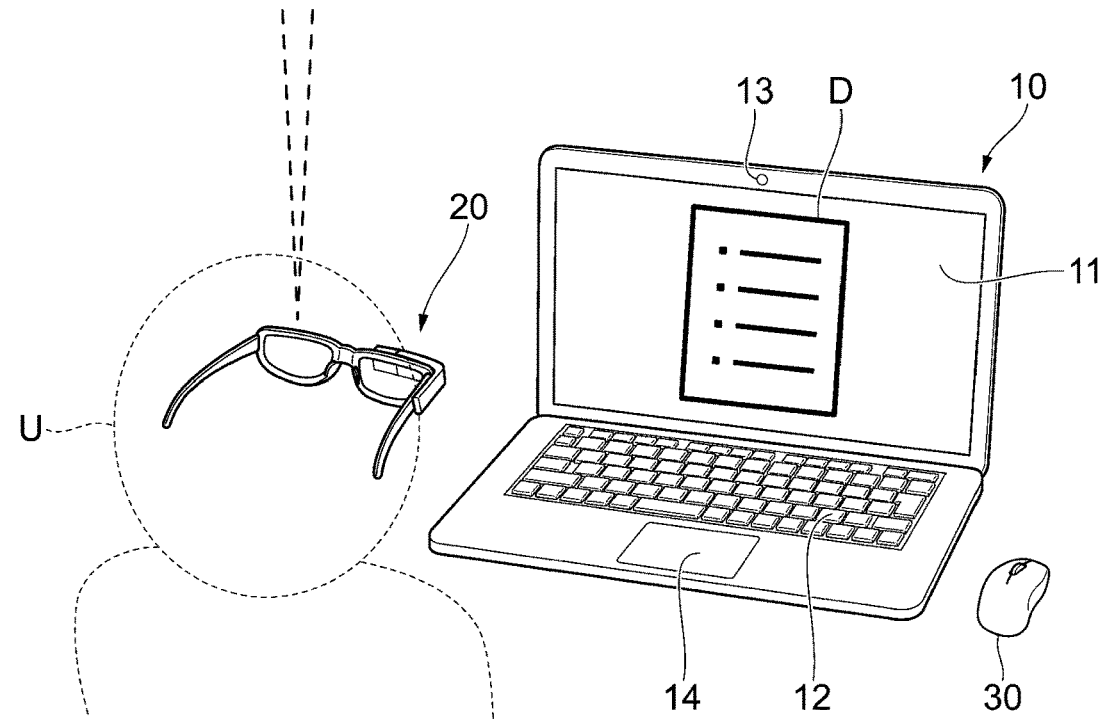

FIG. 9 is a diagram illustrating another example of the presentation at a time when the mode in which an AR image is disposed in front of the display 11 has been established. In FIG. 9, the same components as in FIG. 7 are given the same reference numerals.

A balloon in FIG. 9, too, indicates how the user U wearing the XR device 20 recognizes the space in front thereof.

In FIG. 9, the AR image includes a message, "Start downloading this program?", an item "Program name: XYZ", a "Yes" button, a "No" button, and the cursor C. The AR image illustrated in FIG. 9 is another example of the dialog box including buttons used for selection.

The dialog box illustrated in FIG. 9 is presented to the user U before downloading of a program starts.

The downloading of a program is an example of a preliminary operation that results in a change to the system configuration, because the program is supposed to be installed on the computer 10 after the downloading.

During the downloading, the user U can perform another operation using the computer 10. When the AR image including a button necessary to start the downloading is disposed in front of the display 11 to prompt the user U to use the button, therefore, the user U can perform another operation during the downloading.

If the user U notices that the user U has not started the downloading after completing another operation, on the other hand, the user U needs to start the downloading at this point in time, which wastes time.

Figure 10:
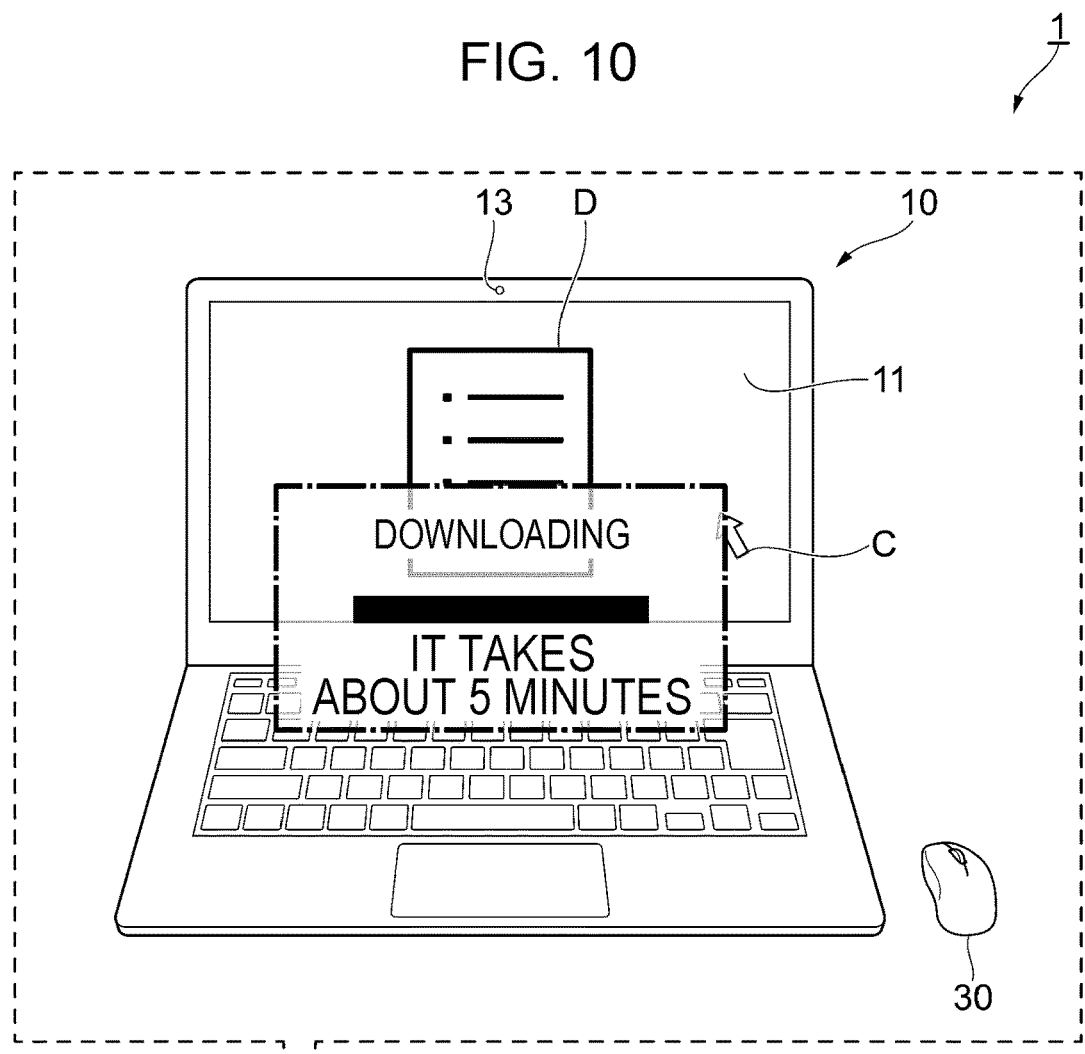
FIG. 10 is a diagram illustrating an example of an AR image disposed in relation to downloading.
Figure 10:
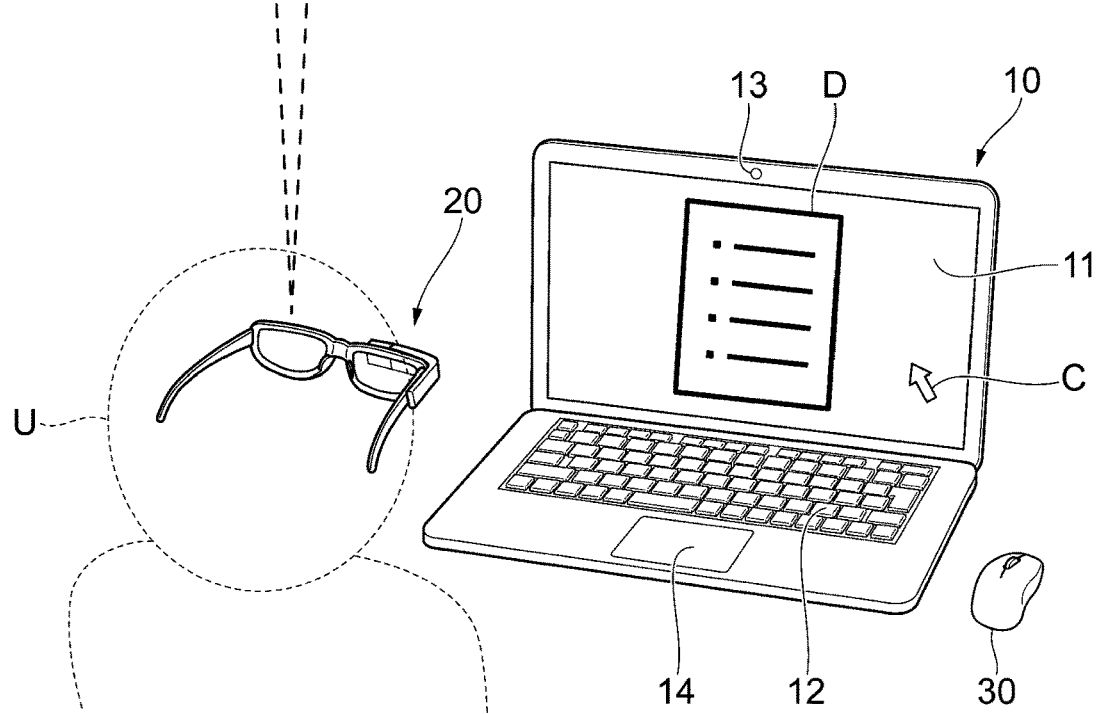

FIG. 10 is a diagram illustrating an example of an AR image disposed in relation to downloading. In FIG. 10, the same components as in FIG. 9 are given the same reference numerals.

In FIG. 10, the user U has already used the button, and the cursor C is displayed on the display 11.

In FIG. 10, the AR image includes a message, "Downloading", a bar indicating the progress of the downloading, and a message, "It takes about 5 minutes". Time shown in the AR image may be remaining time or overall time of the downloading. The time may be a rough estimate because communication speed varies depending on how busy a network is. The remaining time changes depending on the progress of the downloading and the communication speed.

The information shown in the dialog box illustrated in FIG. 10 is an example of information indicating the progress of an operation after the operation starts.

The AR image illustrated in FIG. 10 may be displayed on the display 11 as a dedicated dialog box, instead, but when the AR image is presented to the user U, less images overlap one another on the display 11, and the visibility of images displayed on the display 11 and workability improve.

When information regarding downloading is disposed in front of the display 11 as an AR image, the progress of the downloading can be easily checked.

Fourth Example

Figure 11:
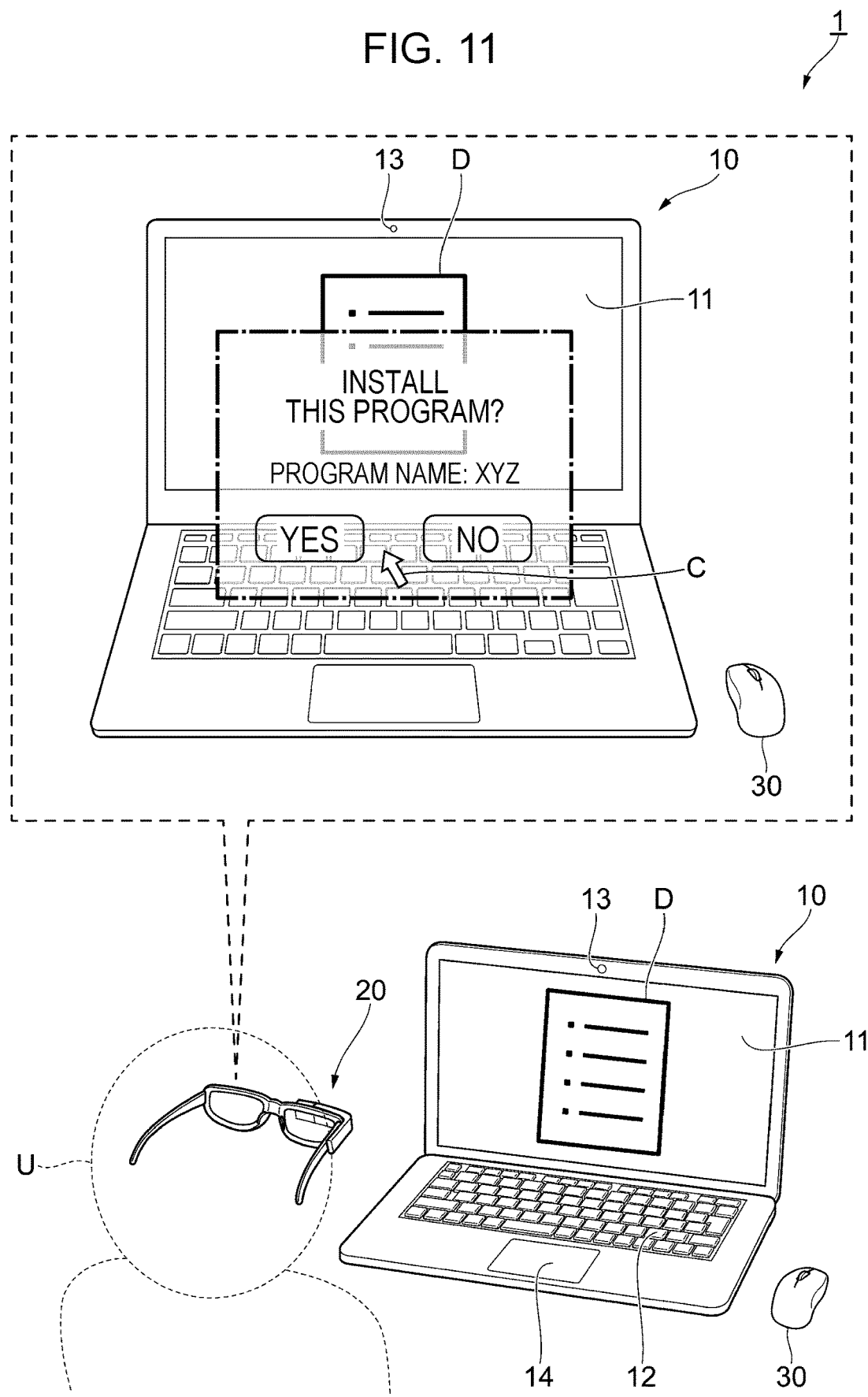
FIG. 11 is a diagram illustrating another example of the presentation at a time when the mode in which an AR image is disposed in front of the display has been established.

FIG. 11 is a diagram illustrating another example of the presentation at a time when the mode in which an AR image is disposed in front of the display 11 has been established. In FIG. 11, the same components as in FIG. 9 are given the same reference numerals.

A balloon in FIG. 11, too, indicates how the user U wearing the XR device 20 recognizes the space in front thereof.

Unlike FIG. 9, FIG. 11 illustrates an example in which the user U is asked whether to install a program. The installation of a program is an example of an operation that results in a change to the system configuration of the computer 10.

In FIG. 11, the AR image includes a message, "Install this program?", an item "Program name: XYZ", a "Yes" button, a "No" button, and the cursor C. The AR image illustrated in FIG. 11 is another example of the dialog box including buttons used for selection.

The dialog box illustrated in FIG. 11 is presented to the user U before the installation of the program starts.

In the case of installation of a program, as in the case of downloading, information such as a bar indicating the progress of the installation and remaining time of the installation may be presented after the installation starts.

Fifth Example

Figure 12:
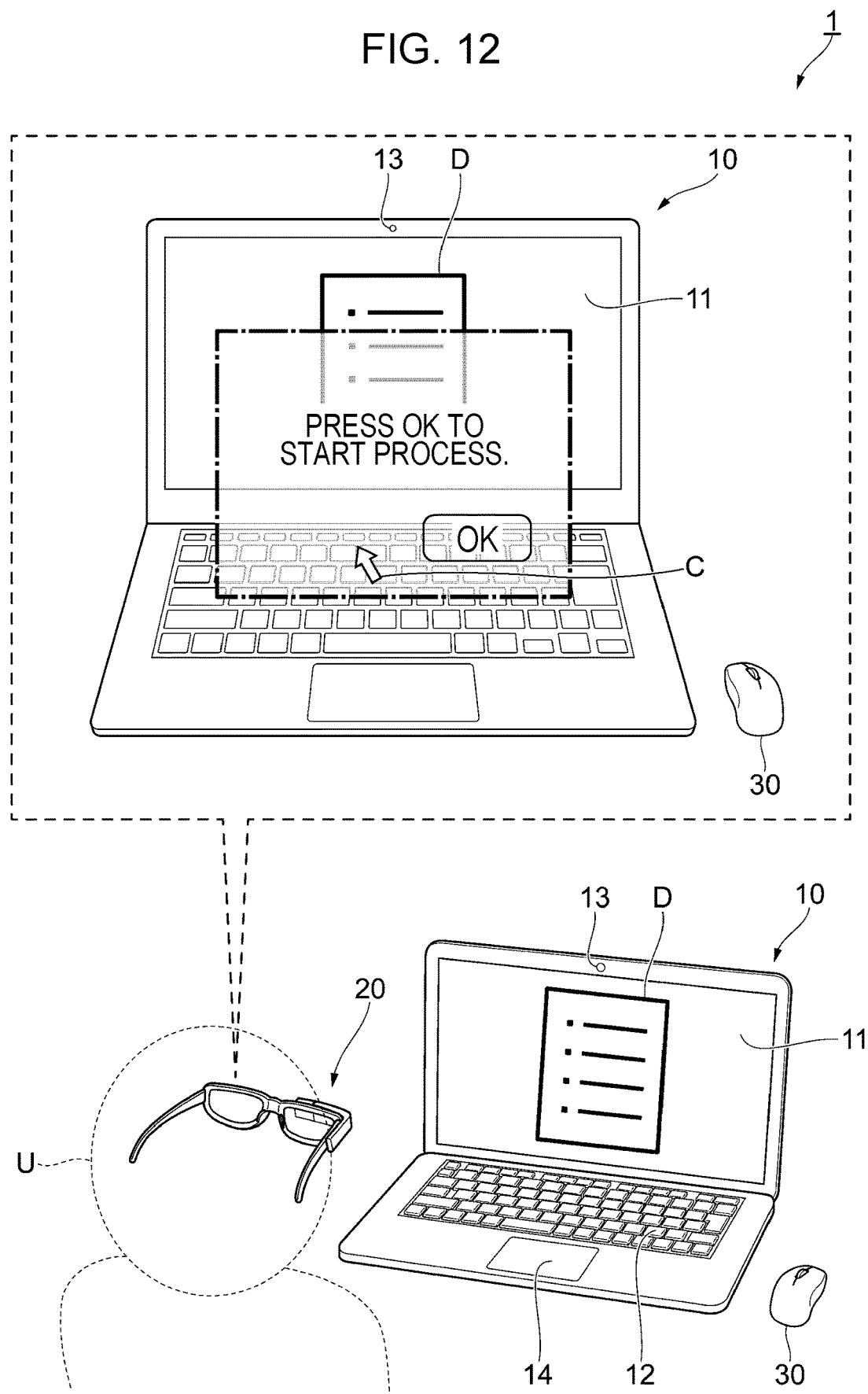
FIG. 12 is a diagram illustrating another example of the presentation at a time when the mode in which an AR image is disposed in front of the display has been established.

FIG. 12 is a diagram illustrating another example of the presentation at a time when the mode in which an AR image is disposed in front of the display 11 has been established. In FIG. 12, the same components as in FIG. 7 are given the same reference numerals.

A balloon in FIG. 12, too, indicates how the user U wearing the XR device 20 recognizes the space in front thereof.

In FIG. 12, the AR image includes a message, "Press OK to start process", an "OK" button, and the cursor C.

The AR image illustrated in FIG. 12 includes only one button. In other words, the AR image is an example of a dialog box including a determination button.

The dialog box illustrated in FIG. 12 is presented to the user U before, for example, the user U opens the file of the document D to be processed by the computer 10.

The AR image illustrated in FIG. 12 is the same as that in the fourth example in that the AR image is a dialog box to be presented to the user U before a target operation is performed.

The AR image in this example, however, is different from that in the fourth example, in which the "Yes" button and the "No" button are provided, in that the AR image in this example includes only one button for starting an operation.

Sixth Example

Figure 13:
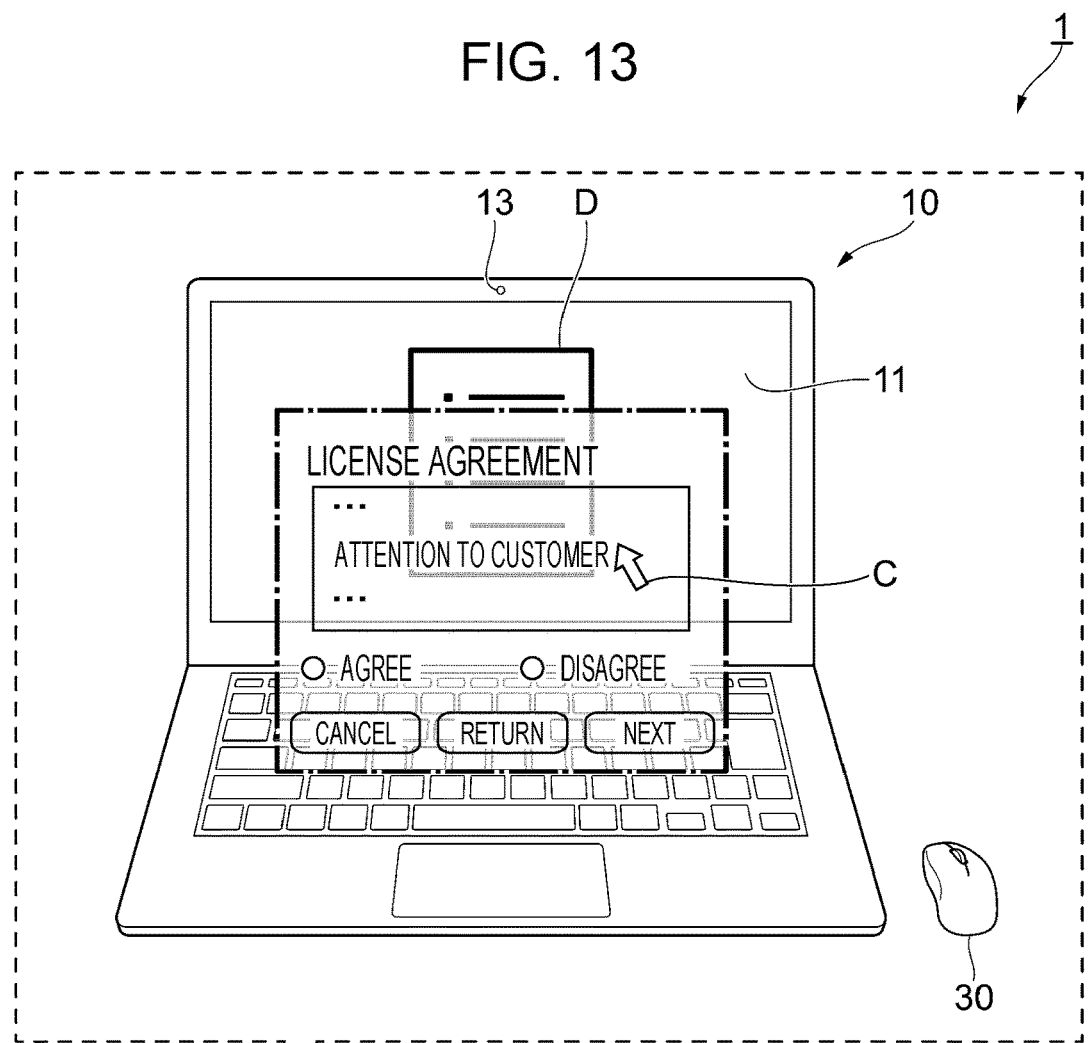
FIG. 13 is a diagram illustrating another example of the presentation at a time when the mode in which an AR image is disposed in front of the display has been established.
Figure 13:
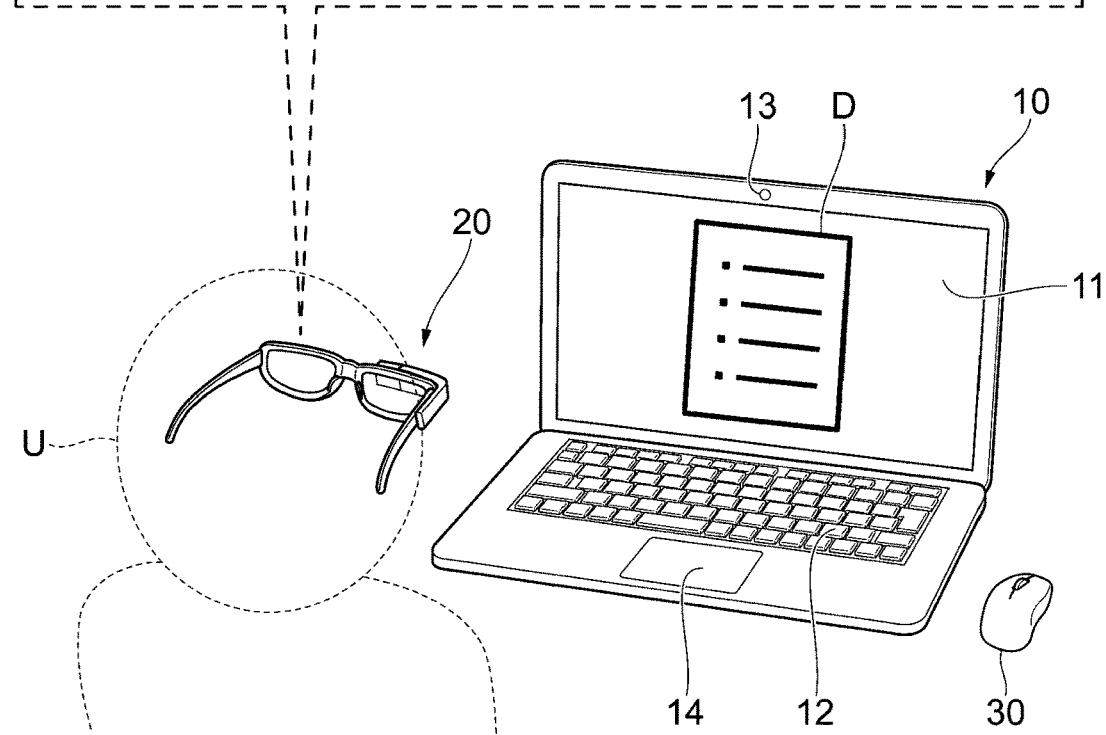

FIG. 13 is a diagram illustrating another example of the presentation at a time when the mode in which an AR image is disposed in front of the display 11 has been established. In FIG. 13, the same components as in FIG. 7 are given the same reference numerals.

A balloon in FIG. 13, too, indicates how the user U wearing the XR device 20 recognizes the space in front thereof.

In FIG. 13, the AR image includes a title "License Agreement", text including "Attention to Customer", a button associated with "Agree", a button associated with "Disagree", a "Cancel" button, a "Return" button, a "Next" button, and the cursor C.

In other words, the AR image illustrated in FIG. 13 includes buttons corresponding to agreement and disagreement on the text included in the document D and buttons corresponding to operations to be performed after selection of the agreement or the disagreement.

Although the document D is "License Agreement" in FIG. 13, the document D that requires agreement may be, for example, a written agreement, a document to be circulated, or a document that requires approval, instead.

A term "agreement" in the present exemplary embodiment also implies approval and acceptance.

Seventh Example

Figure 14:
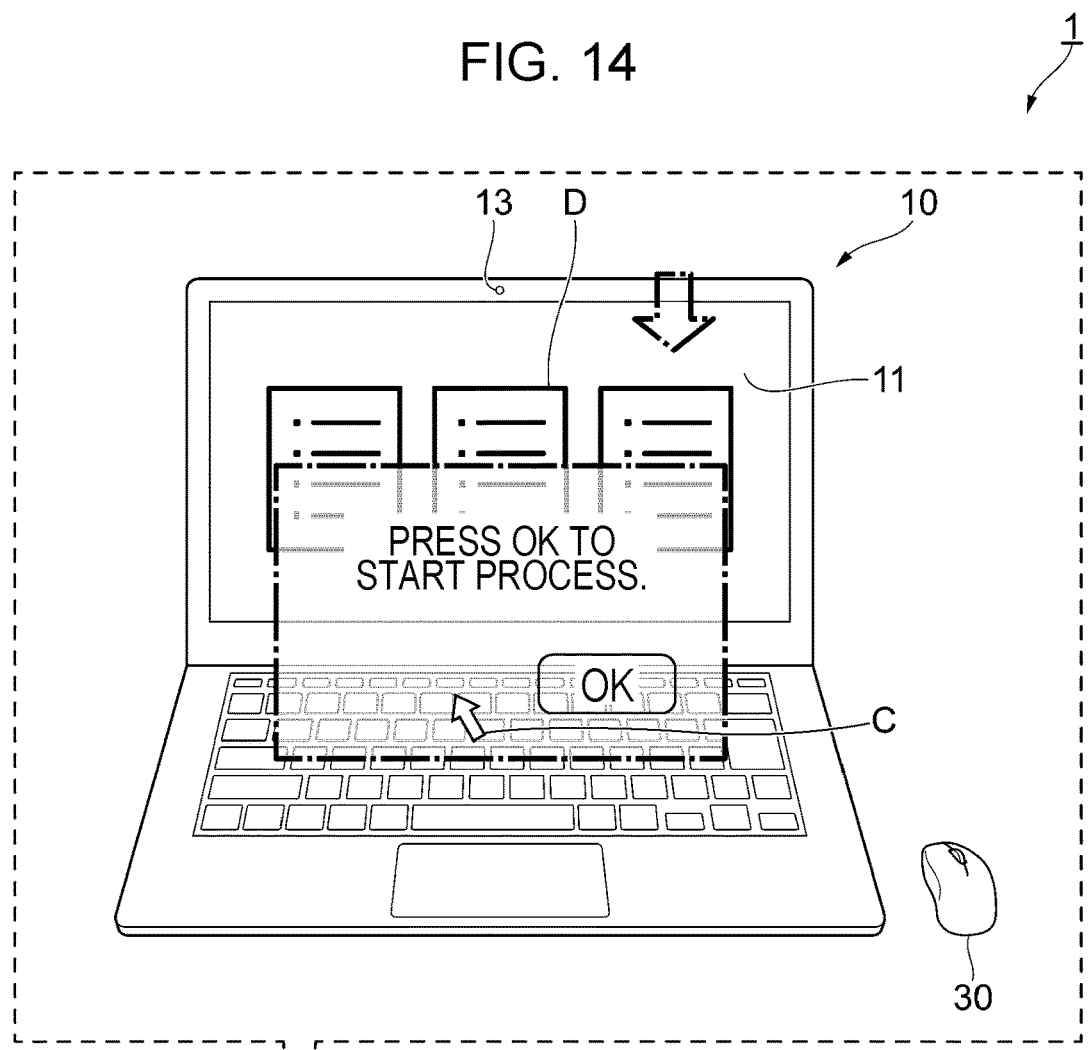
FIG. 14 is a diagram illustrating another example of the presentation at a time when the mode in which an AR image is disposed in front of the display has been established.
Figure 14:
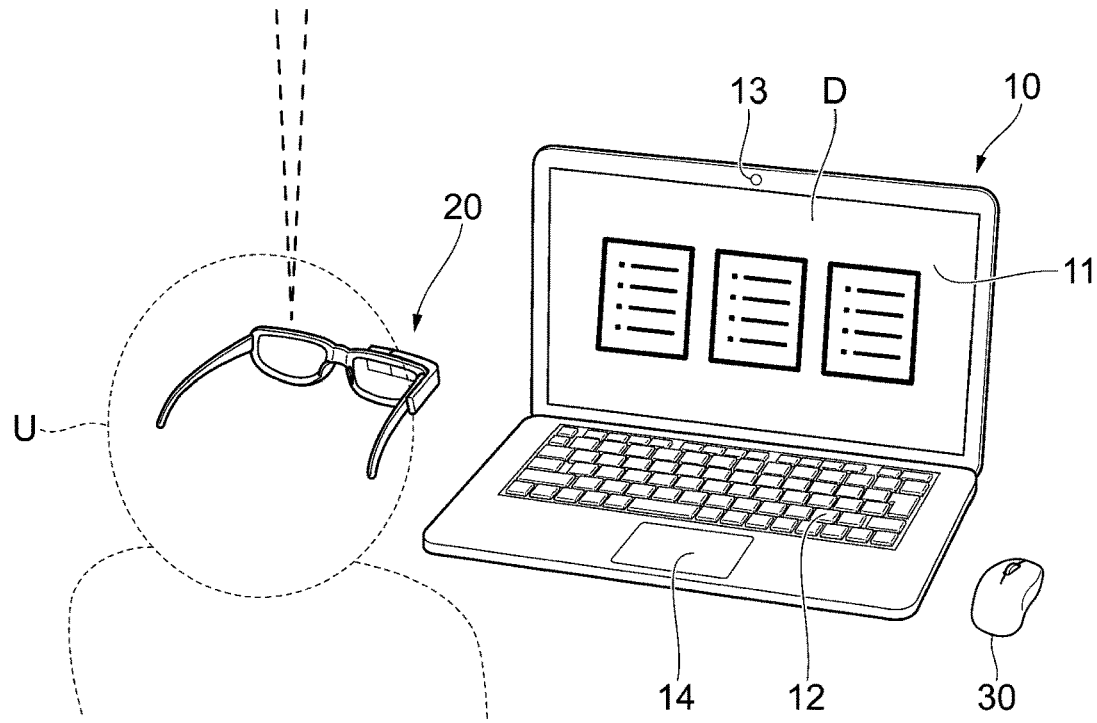

FIG. 14 is a diagram illustrating another example of the presentation at a time when the mode in which an AR image is disposed in front of the display 11 has been established. In FIG. 14, the same components as in FIG. 7 are given the same reference numerals.

A balloon in FIG. 14, too, indicates how the user U wearing the XR device 20 recognizes the space in front thereof.

It is assumed in the example illustrated in FIG. 14 that an AR image that requires agreement is displayed with plural documents D displayed on the display 11.

A request for agreement from the system is usually issued when the user U performs a certain operation on the document D, but when similar documents D are displayed, the user U might not be able to tell which of the documents D requires agreement.

In this example, an arrow indicating a document D that requires agreement is disposed as an AR image. The arrow is disposed, for example, above the document D.

In order to be able to dispose the arrow, the computer 10 gives information regarding the documents D displayed on the display 11 to the XR device 20 in this example. Methods for identifying a position of the target document D include, for example, a method based on order of arrangement in the display 11, a method based on a region on the display 11, and a method based on coordinates on the display 11.

In the case of the method based on order of arrangement, for example, the position of the target document D is identified as, for example, a "rightmost document", a "second rightmost document", or a "middle document".

In the case of the method based on regions, the position of the target document D is identified as, for example, "a document in an upper-middle region, when the display 11 is vertically divided into two parts and each part is horizontally divided into three regions".

In the case of the method based on coordinates, the position of the target document D is identified as, for example, "a document identified with upper-left coordinates (x, y)".

The arrow need not necessarily point downward, and may point upward, leftward, rightward, or in a diagonal direction, instead.

The target document D may be indicated by an indicator other than an arrow. For example, a sign such as a star or a double circle may be used, or the target document D may be framed, instead.

Alternatively, the arrow may be disposed outside the display 11. In FIG. 14, the arrow is disposed in such a way as to overlap a frame of the display 11.

The AR image may be disposed on the screen of the display 11. In this case, the user U recognizes the AR image as if the AR image is displayed on the display 11.

A method for indicating the document D that requires agreement is not limited to one in which an AR image is used. The display 11 of the computer 10 connected to the XR device 20 may display an indicator, instead. In the example illustrated in FIG. 14, an arrow may be displayed on the display 11 above a rightmost document D.

By separately presenting information indicating the document D that requires agreement as an AR image as in this example, the user U can easily identify the document D even when the display 11 displays plural documents D.

Eighth Example

In this example, a change in a position of an AR image at a time when the user U wearing the XR device 20 turns his/her face during operation.

Figure 15A:
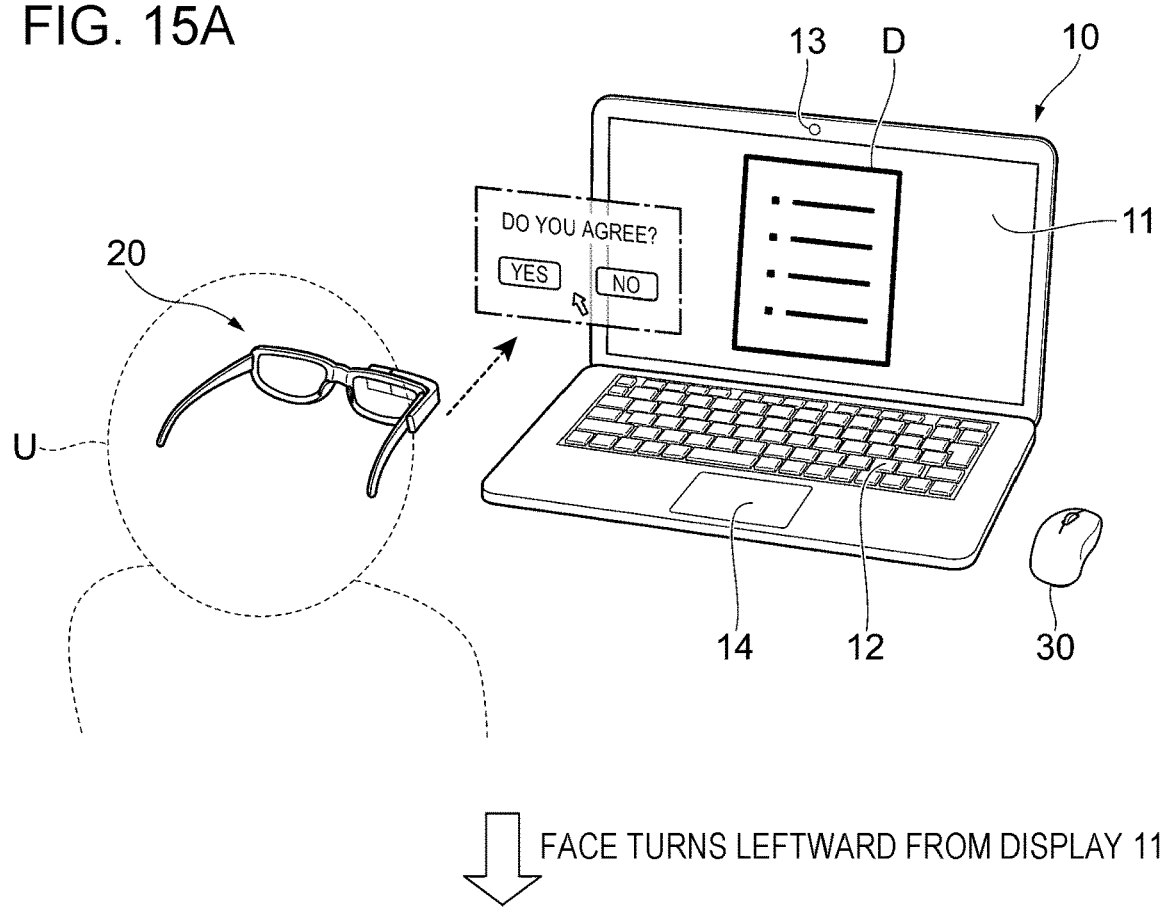
FIGS. 15A and 15B are diagrams illustrating a change in a position of an AR image at a time when a user has turned his/her face leftward from the display while using the computer.
Figure 15B:
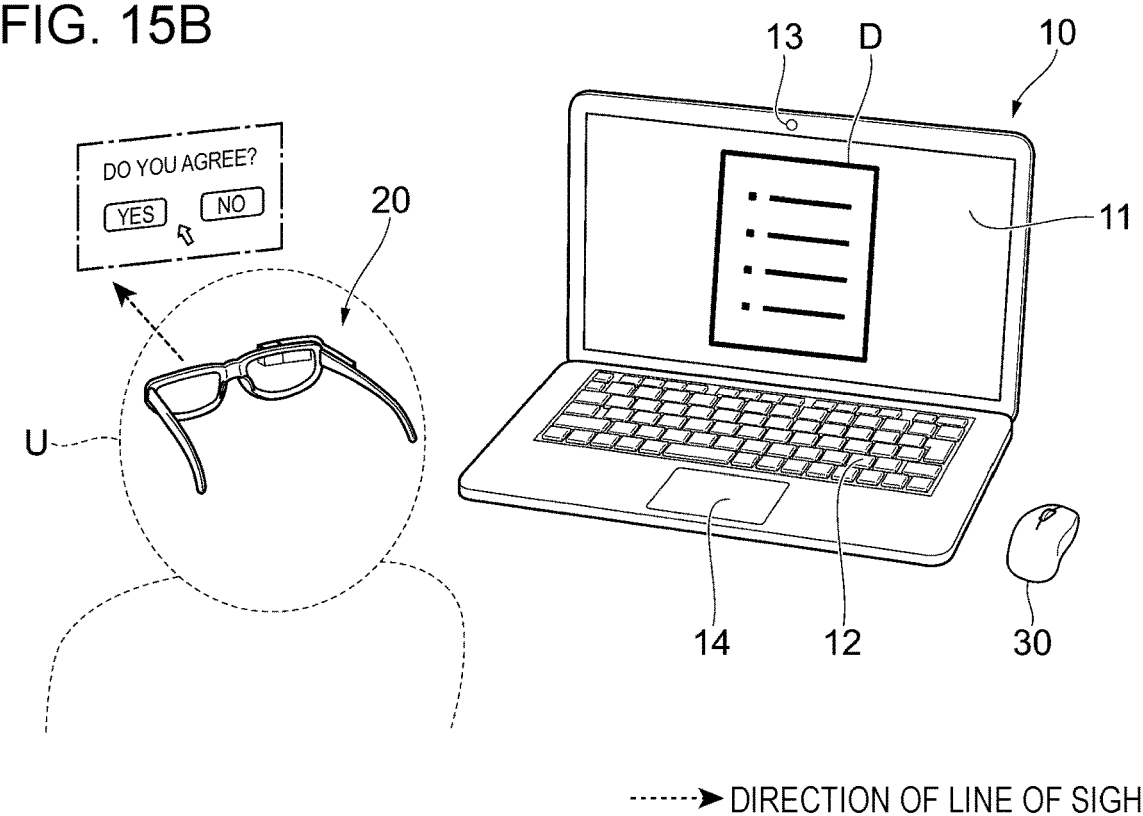

FIGS. 15A and 15B are diagrams illustrating a change in the position of an AR image at a time when the user U has turned his/her face leftward from the display 11 while using the computer 10. FIG. 15A illustrates a position at a time when the user U is looking at the display 11, and FIG. 15B illustrates a position at a time when the user U is looking leftward from the display 11.

In FIGS. 15A and 15B, the same components as in FIG. 6 are given the same reference numerals.

In the present exemplary embodiment, the position of the AR image is not fixed and depends on the direction of the line of sight of the user U. If the user U turns his/her face during operation, therefore, the AR image also moves in a direction in which the user U has turned his/her face.

In FIGS. 15A and 15B, the AR image moves to a position at which the AR image does not overlap the display 11. In other words, the AR image floats in the air where the display 11 does not exist.

Figure 16A:
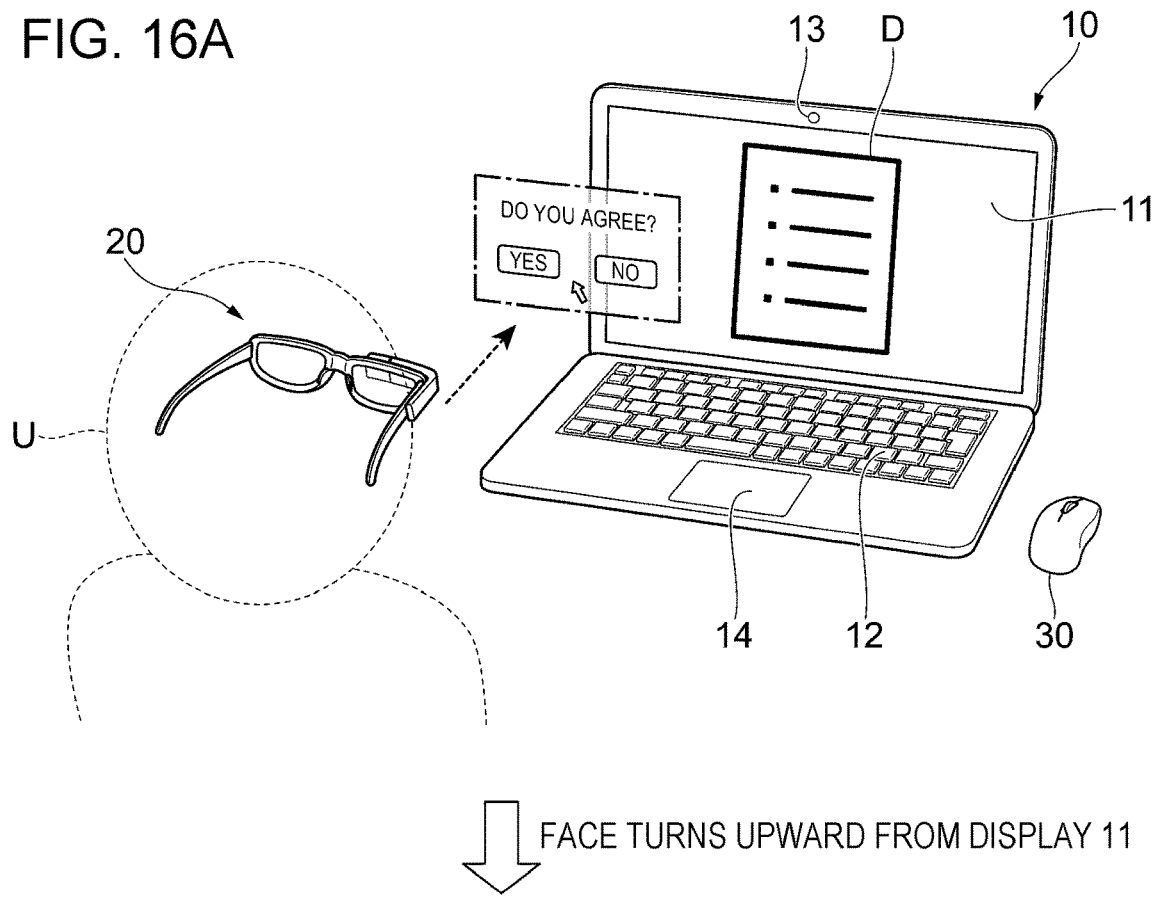
FIGS. 16A and 16B are diagrams illustrating a change in the position of an AR image at a time when the user has turned his/her face upward from the display while using the computer.
Figure 16B:
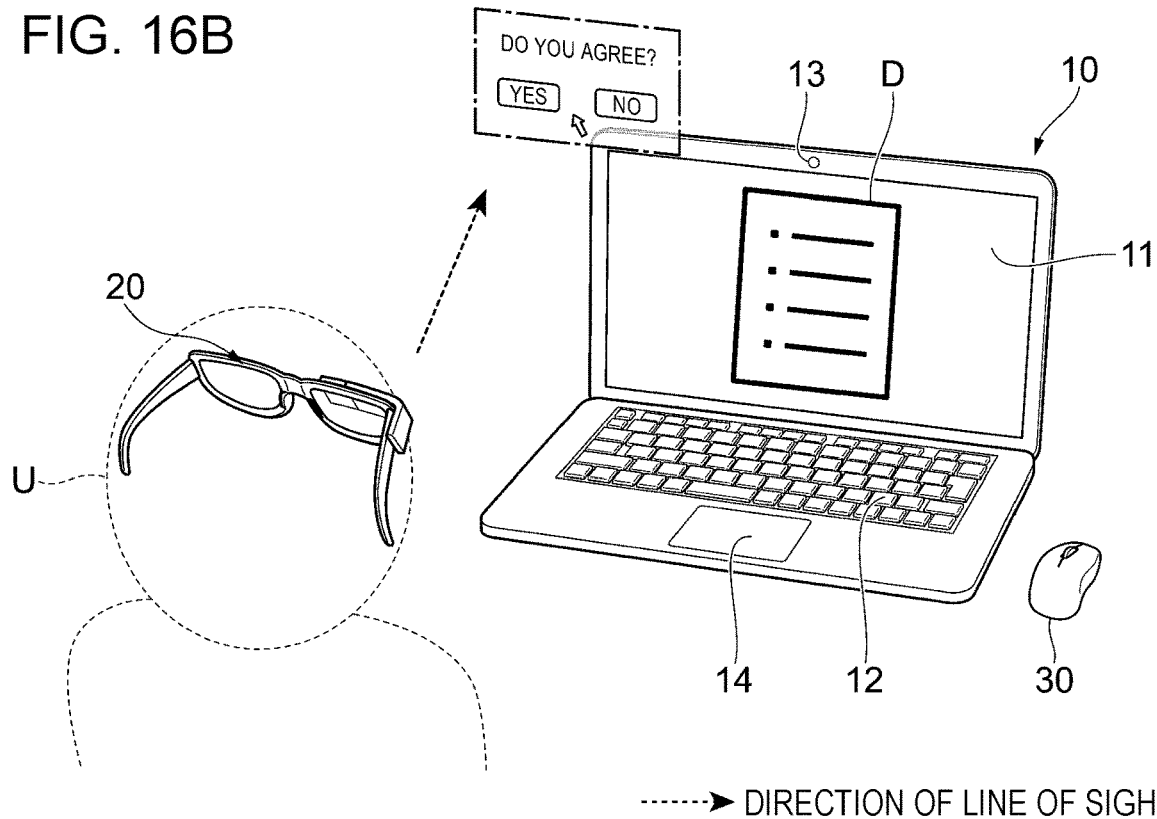

FIGS. 16A and 16B are diagrams illustrating a change in the position of an AR image at a time when the user U has turned his/her face upward from the display 11 while using the computer 10. FIG. 16A illustrates a position at a time when the user U is looking at the display 11, and FIG. 16B illustrates a position at a time when the user U is looking upward from the display 11.

In FIGS. 16A and 16B, too, the AR image moves to a position at which the AR image does not overlap the display 11. In other words, the AR image floats in the air where the display 11 does not exist.

As illustrated in FIGS. 15A to 16B, when the AR image moves in accordance with the direction of the line of sight of the user U, the user U easily notices the AR image, and it becomes less likely for the user U to forget to perform an operation involving selection, agreement, or the like.

In other words, even if the user U overlooks the AR image or forgets a need to perform an operation during another operation for reasons such as the AR image being too small, for example, the user U is likely to notice the AR image after turning his/her face. As a result, it becomes less likely for the user U to forget to perform an operation involving selection, agreement, or the like.

Second Exemplary Embodiment

In a second exemplary embodiment, removal of an AR image or movement of an AR image to a different position is permitted under a certain condition.

The configuration of an information processing system 1 used in the second exemplary embodiment is the same as that of the information processing system 1 illustrated in FIG. 1.

Figure 17A:
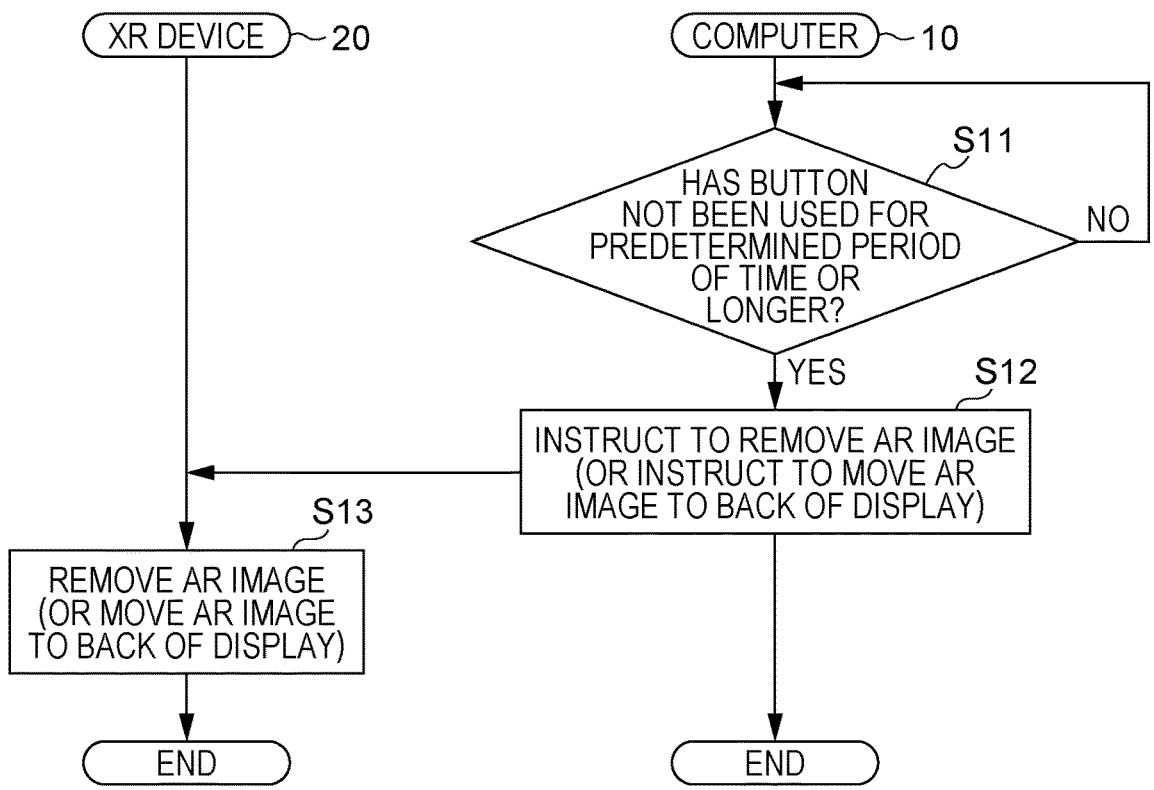
FIGS. 17A and 17B are diagrams illustrating an example of a process used in a second exemplary embodiment and a change in an AR image.
Figure 17B:
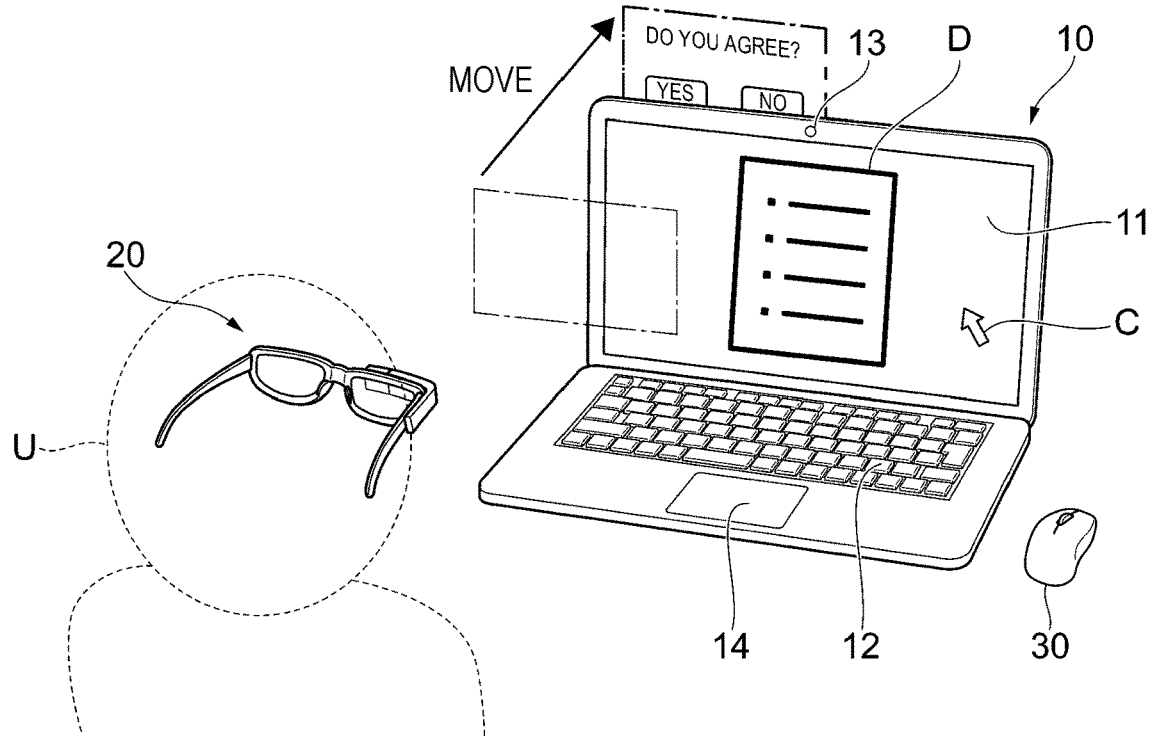

FIGS. 17A and 17B are diagrams illustrating an example of a process used in the second exemplary embodiment and a change in an AR image. FIG. 17A illustrates an example of a process cooperatively performed by the computer 10 and the XR device 20, and FIG. 17B illustrates movement of the AR image. In FIG. 17B, the same components as in FIG. 6 are given the same reference numerals.

The process illustrated in FIG. 17A is performed independently of the process illustrated in FIG. 5. Alternatively, the process illustrated in FIG. 17A may be performed while a negative result is obtained in step S6 (refer to FIG. 5).

The computer 10 determines whether a button has not been used for a predetermined period of time or longer (step S11). The button refers to a button included in an AR image.

If a negative result is obtained in step S11, the computer 10 repeatedly makes the determination in step S11. In the example where step S11 is performed, the process returns to step S6 if a negative result is obtained in step S11.

The predetermined period of time may be set as an initial value or set by the user U as desired. The predetermined period of time is, for example, 3 minutes.

Although whether the predetermined period of time has elapsed is determined in step S11 in FIG. 17A, whether a predetermined operation has been performed may be determined if the user U desires to reserve an operation such as selection. The predetermined operation is, for example, an operation performed on a certain icon displayed on the display 11.

If a positive result is obtained in step S11, the computer 10 instructs the XR device 20 to remove the AR image (step S12). As illustrated in FIG. 17B, however, the computer 10 may instruct the XR device 20 to move the AR image to the back of the display 11, instead.

Upon being instructed, the XR device 20 removes the AR image (step S13). In this case, the AR image disappears from a real space in front of the display 11. As a result, the user U can view the display 11 clearly.

When instructed to move the AR image in step S12, the XR device 20 moves the AR image to the back of the display 11 as illustrated in FIG. 17B. If the entirety of the AR image overlaps the display 11 at this time, the user U does not see the AR image. As a result, the user U can easily focus on his/her work.

In the example illustrated in FIG. 17B, however, an upper part of the AR image protrudes from an upper edge of the display 11. The user U, therefore, does not forget presence of the AR image including buttons that require selection, agreement, or the like while focusing on his/her work.

The user U can therefore resume an operation performed on the AR image after finishing his/her work.

It is difficult to use the buttons included in the AR image when the AR image is located behind the display 11. The AR image, therefore, may be presented again or move to the front of the display 11, instead, if the user U inputs a predetermined operation.

The predetermined operation is, for example, an operation performed on an icon for presenting the AR image again or an icon for moving the AR image displayed on the display 11, double clicking of the mouse 30 with the cursor C in an area in which the document D is displayed, or the like.

If the AR image is removed or the entirety of the AR image is hidden behind the display 11 in the process illustrated in FIG. 17A, the user U might not notice the AR image.

Even if the AR image is removed, therefore, the AR image may be disposed in front of the display 11 again, without an instruction from the user U, when a predetermined period of time has elapsed since the AR image was removed.

In addition, when the user U finishes an operation performed on the document D, such as saving of the document D, the AR image may be disposed in front of the display 11 again.

Third Exemplary Embodiment

In a third exemplary embodiment, a case where the cursor C moves between an AR image and the display 11 in accordance with instructions from the user U will be described.

Figure 18A:
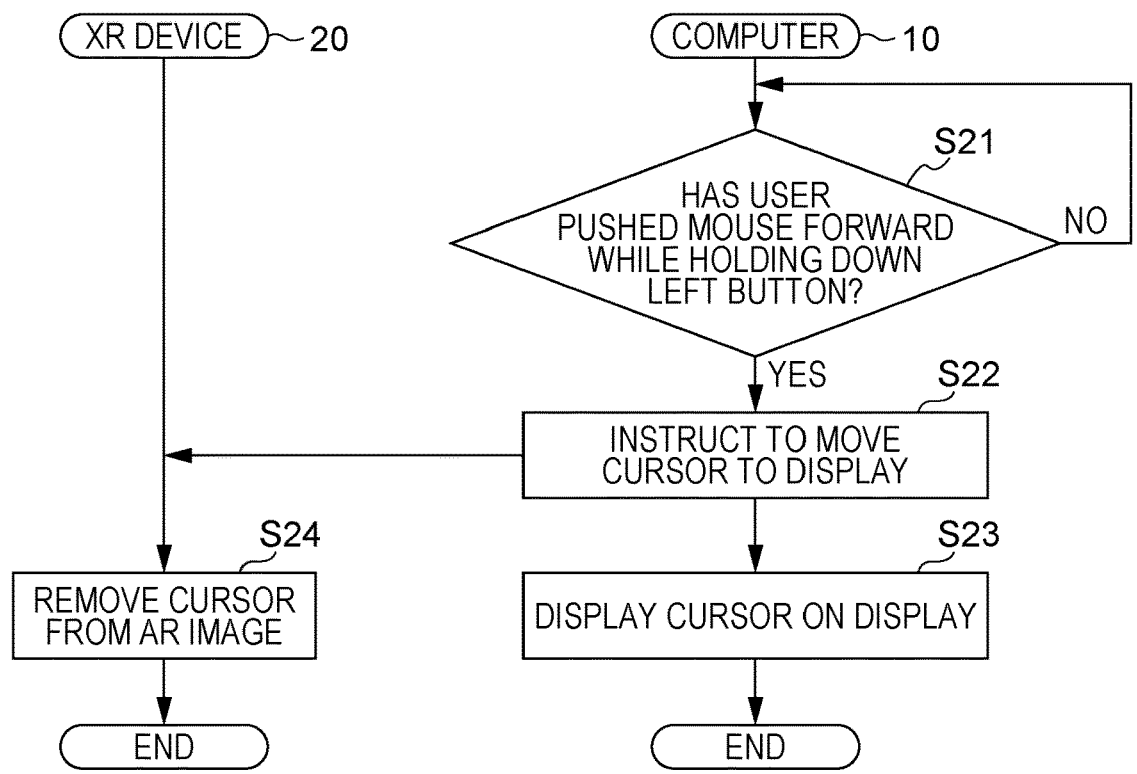
FIGS. 18A and 18B are diagrams illustrating an example of a process used in a third exemplary embodiment and a change in an AR image.
Figure 18B:
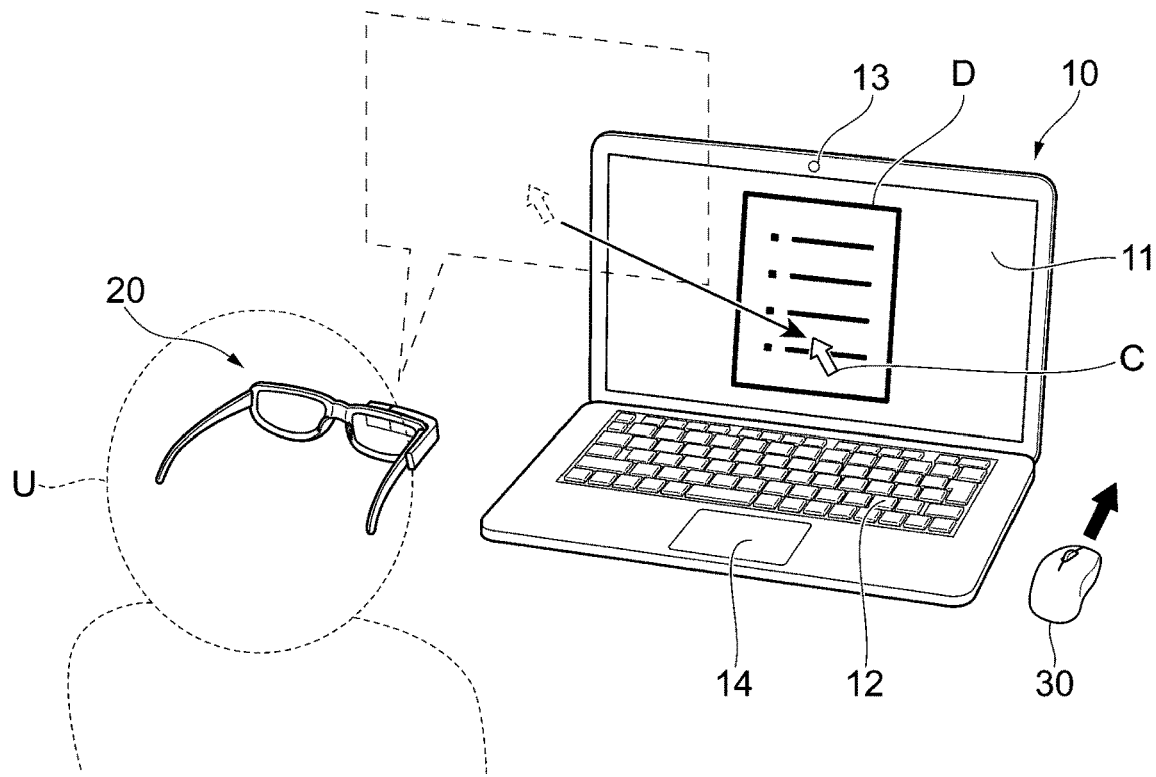

FIGS. 18A and 18B are diagrams illustrating an example of a process used in the third exemplary embodiment and a change in an AR image. FIG. 18A illustrates an example of a process for moving the cursor C in the AR image to the display 11, and FIG. 18B illustrates an example of an operation performed by the user U. In FIG. 18B, the same components as in FIG. 6 are given the same reference numerals.

The process illustrated in FIG. 18A is performed independently of the process illustrated in FIG. 5.

In FIG. 18A, the computer 10 determines whether the user U has pushed the mouse 30 forward while holding down a left button (step S21). A term "forward" refers to a direction from an AR image to the display 11, that is, a farther direction from the user U. In other words, the term "forward" refers to a direction away from the user U.

In order to differentiate from an operation performed on the document D displayed on the display 11, the user U needs to push the mouse 30 forward while holding down the left button of the mouse 30 in step S21.

The holding down of the left button is an example, and the mouse 30 may be pushed forward at the same time as a certain keyboard operation, instead.

Alternatively, certain keys on the keyboard 12 (refer to FIG. 1) may just be pressed. For example, an up arrow key may be pressed with a shift key held down.

Alternatively, in step S21, whether the user U has instructed the computer 10 to reserve or reexamine an operation, such as selection, corresponding to buttons included in the AR image may be determined.

A condition used in the determination in step S21 is an example of a predetermined second condition.

While a negative result is obtained in step S21, the computer 10 repeatedly makes the determination in step S21.

If a positive result is obtained in step S21, the computer 10 instructs the XR device 20 to move the cursor C to the display 11 (step S22).

The computer 10 displays the cursor C on the display 11 (step S23).

The XR device 20, on the other hand, removes the cursor C from the AR image on the basis of the instruction from the computer 10 (step S24).

The process illustrated in FIG. 18B corresponds to steps S23 and S24.

After the cursor C moves from the AR image to the display 11, the user U can resume an operation performed on the document D displayed on the display 11. For example, the user U can perform an operation on the document D while reserving an operation to be performed on the buttons included in the AR image.

Figure 19A:
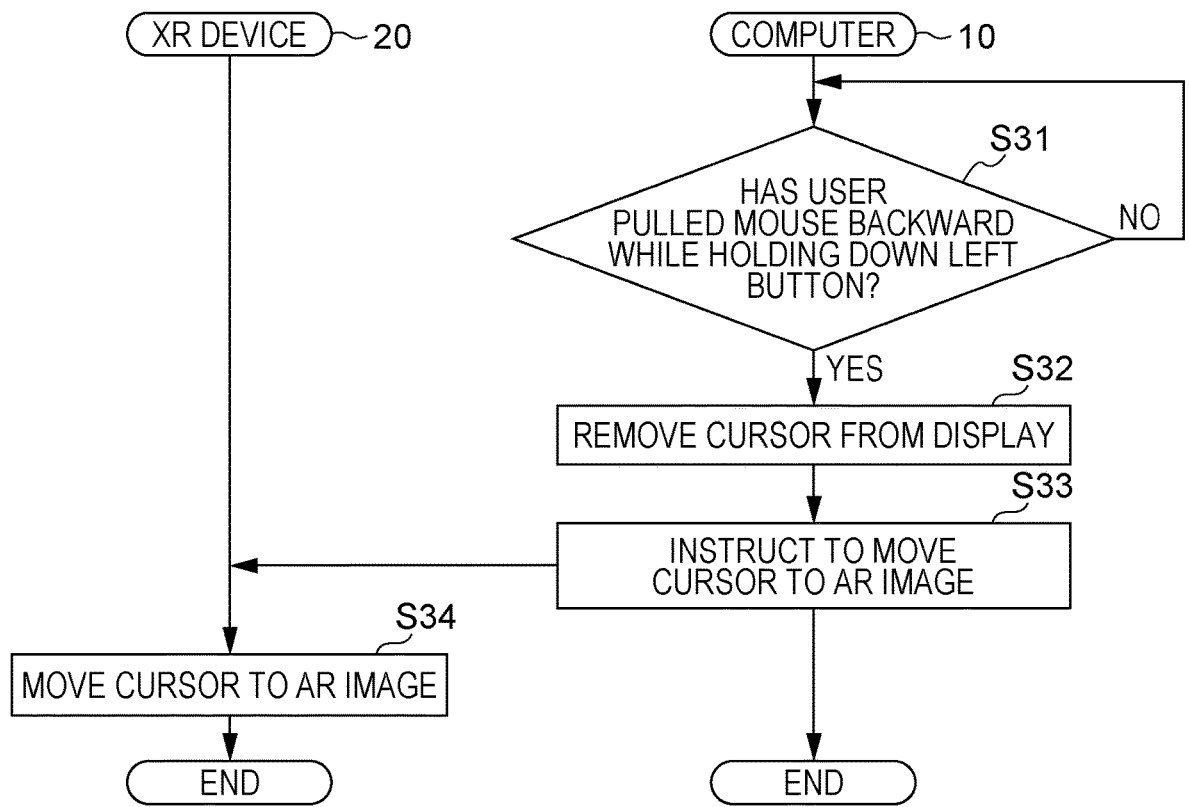
FIGS. 19A and 19B are diagrams illustrating another example of the process used in the third exemplary embodiment and the change in the AR image.
Figure 19B:
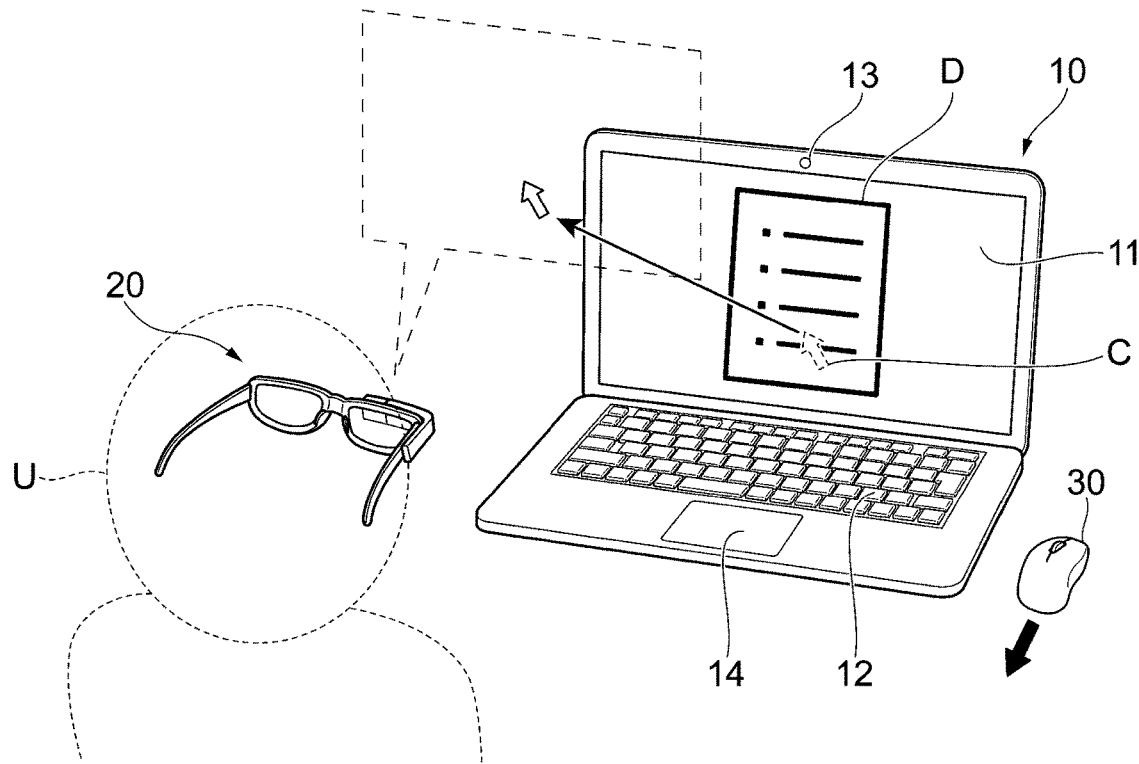

FIGS. 19A and 19B are diagrams illustrating another example of the process used in the third exemplary embodiment and the change in the AR image. FIG. 19A illustrates another example of the process for moving the cursor C displayed on the display 11 to the AR image, and FIG. 19B illustrates another example of the operation performed by the user U. In FIG. 19B, the same components as in FIG. 6 are given the same reference numerals.

The process illustrated in FIG. 19A is performed independently of the process illustrated in FIG. 5.

In FIG. 19A, the computer 10 determines whether the user U has pulled the mouse 30 backward while holding down the left button (step S31). A term "backward" refers to a direction from the display 11 to an AR image, that is, a closer direction to the user U. In other words, the term "backward" refers to a direction toward the user U.

In order to differentiate from an operation performed on the document D displayed on the display 11, the user U needs to pull the mouse 30 backward while holding down the left button of the mouse 30 in step S31.

The holding down of the left button is an example, and the mouse 30 may be pulled backward at the same time as a certain keyboard operation, instead.

Alternatively, certain keys on the keyboard 12 (refer to FIG. 1) may just be pressed. For example, a down arrow key may be pressed with a shift key held down.

Alternatively, in step S31, whether the user U has instructed the computer 10 to resume an operation, such as selection, corresponding to buttons included in the AR image may be determined.

A condition used in the determination in step S31 is an example of a predetermined first condition.

While a negative result is obtained in step S31, the computer 10 repeatedly makes the determination in step S31.

If a positive result is obtained in step S31, the computer 10 removes the cursor C from the display 11 (step S32).

The computer 10 then instructs the XR device 20 to move the cursor C to the AR image (step S33).

The XR device 20, on the other hand, moves the cursor C to the AR image on the basis of the instruction from the computer 10 (step S34).

The process illustrated in FIG. 19B corresponds to steps S33 and S34.

After the cursor C moves from the display 11 to the AR image, the user U can resume an operation performed on the buttons included in the AR image as desired.

The cursor C need not necessarily be moved in accordance with an instruction from the user U as illustrated in FIGS. 18A to 19B.

Figure 20A:
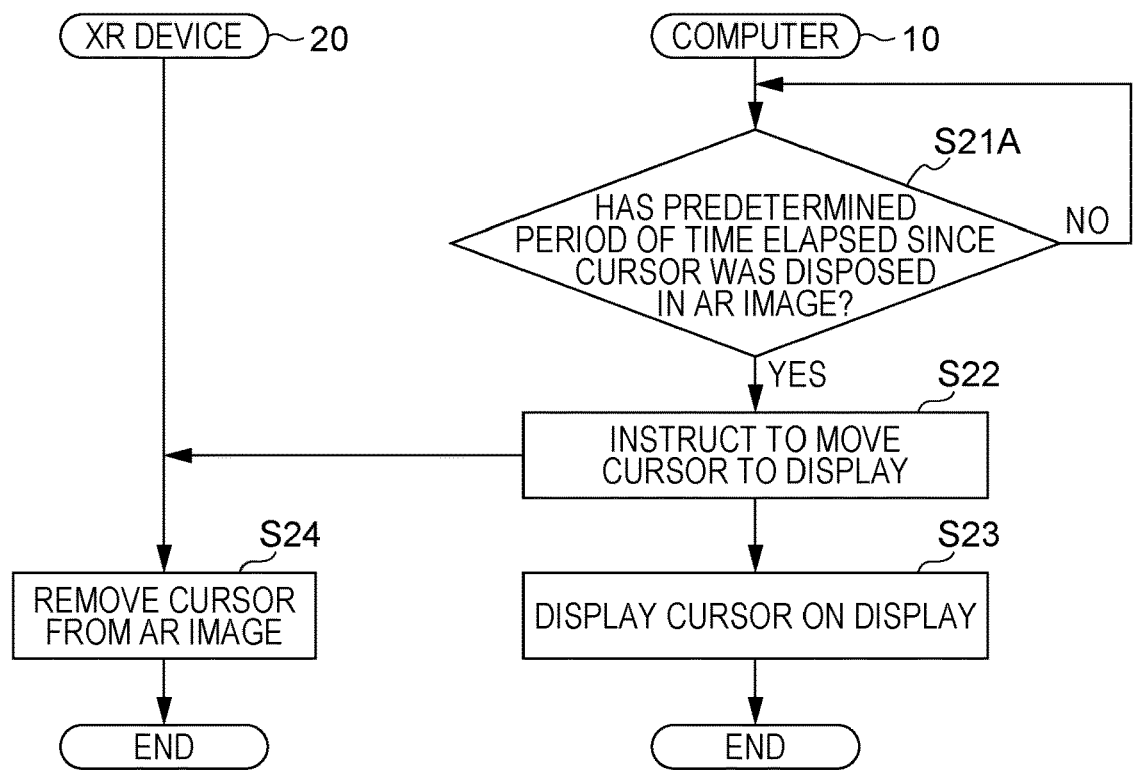
FIGS. 20A and 20B are diagrams illustrating another example of the process used in the third exemplary embodiment and the change in the AR image.
Figure 20B:
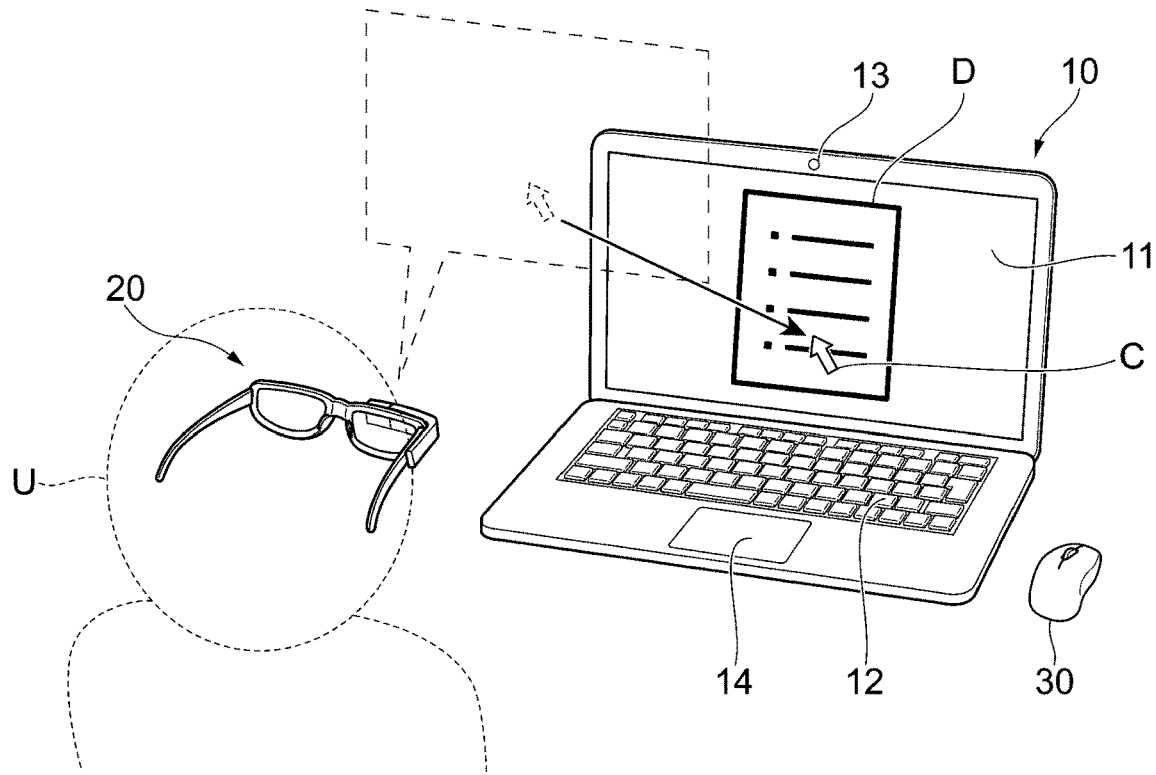

FIGS. 20A and 20B are diagrams illustrating another example of the process used in the third exemplary embodiment and the change in the AR image. FIG. 20A illustrates another example of the process for moving the cursor C in the AR image to the display 11, and FIG. 20B illustrates another example of the operation performed by the user U. In FIGS. 20A and 20B, the same components as in FIGS. 18A and 18B are given the same reference numerals. In FIG. 20B, the same components as in FIG. 6 are given the same reference numerals.

In FIG. 20A, step S21A is performed instead of step S21 (refer to FIG. 18). In step S21A, whether a predetermined period of time has elapsed since the cursor C was disposed in the AR image is determined.

The predetermined period of time is, for example, 3 minutes. Although an AR image is removed in the second exemplary embodiment, only movement of the cursor C is assumed in the present exemplary embodiment.

If an operation by the user U has not been detected for an extended period of time after an AR image pops up, there might be some reason that the user U becomes hesitant to use buttons included in the AR image. Such a situation can occur, for example, when the user U is wondering which button to use or there is another operation of a higher priority.

After the cursor C moves to the display 11 of the computer 10, the user U can perform an operation on a screen displayed on the display 11 while reserving an operation to be performed on the buttons included in the AR image.

Fourth Exemplary Embodiment

In a fourth exemplary embodiment, a case where buttons included in an AR image are used through a voice will be described.

Figure 21:
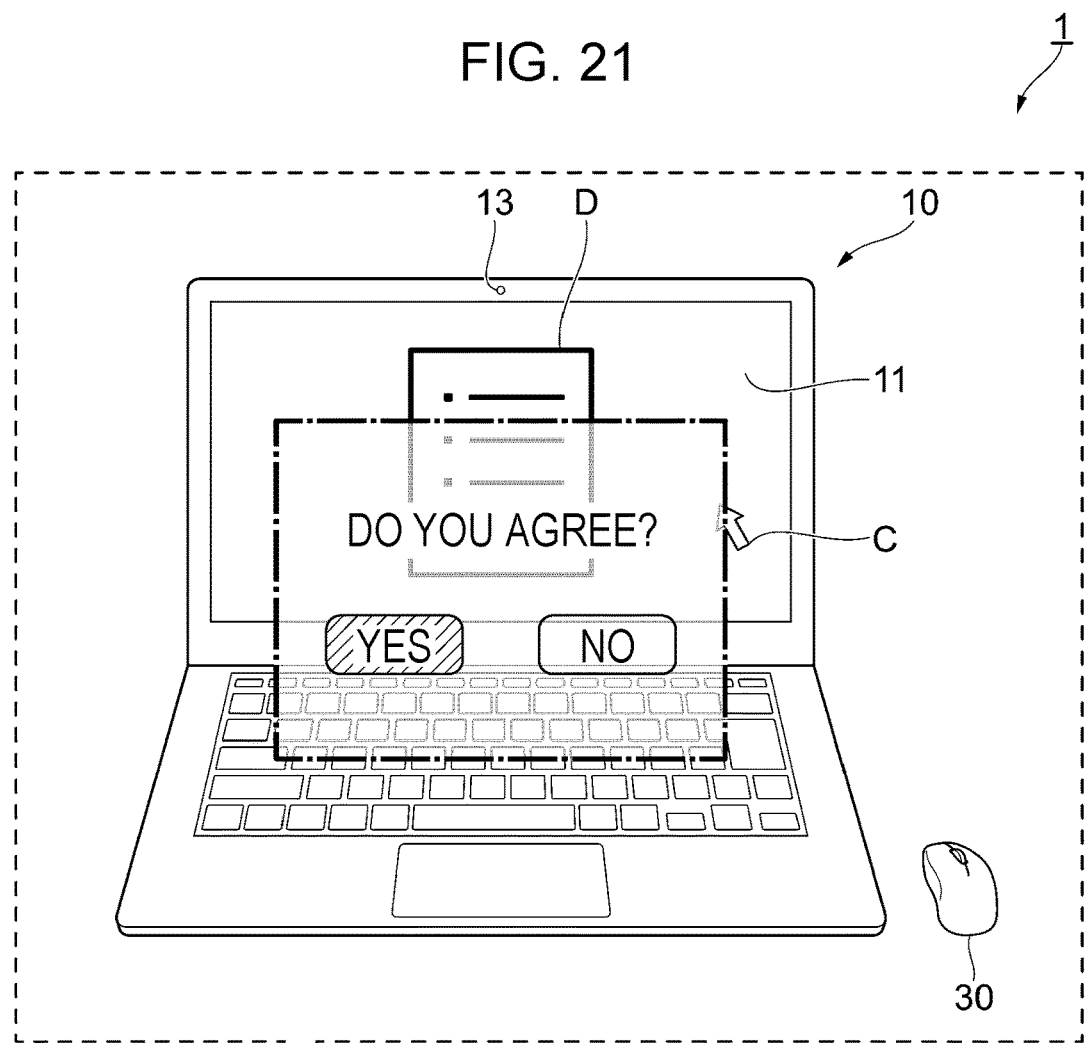
FIG. 21 is a diagram illustrating an example of an instruction assumed in a fourth exemplary embodiment.
Figure 21:
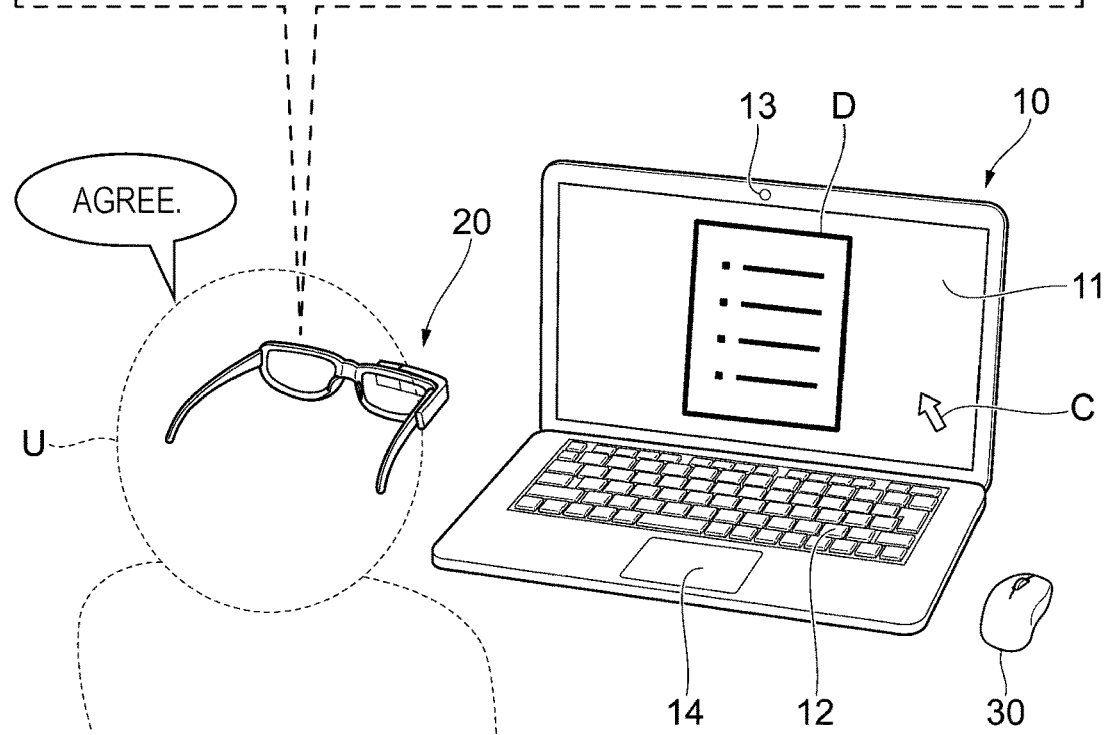

FIG. 21 is a diagram illustrating an example of an instruction assumed in the fourth exemplary embodiment. In FIG. 21, the same components as in FIG. 6 are given the same reference numerals.

In FIG. 21, the user U utters, "Agree". This utterance is obtained by the microphone 16 (refer to FIG. 2) of the computer 10 or the microphone 23 (refer to FIG. 3) of the XR device 20. The utterance is analyzed using a known voice recognition technique.

Inputting of an instruction to an electronic device through a voice has already been put into practice as speakers having an artificial intelligence (AI) assistance function (so-called "smart speakers"), smartphones, and the like. In the case of an instruction based on a voice, the user U need not move the cursor C onto a button or stop performing an operation.

In the present exemplary embodiment, the user U can input an instruction without moving the cursor C displayed on the display 11 to the AR image.

Fifth Exemplary Embodiment

In a fifth exemplary embodiment, a case where buttons included in an AR image are used through a gesture will be described.

Figure 22:
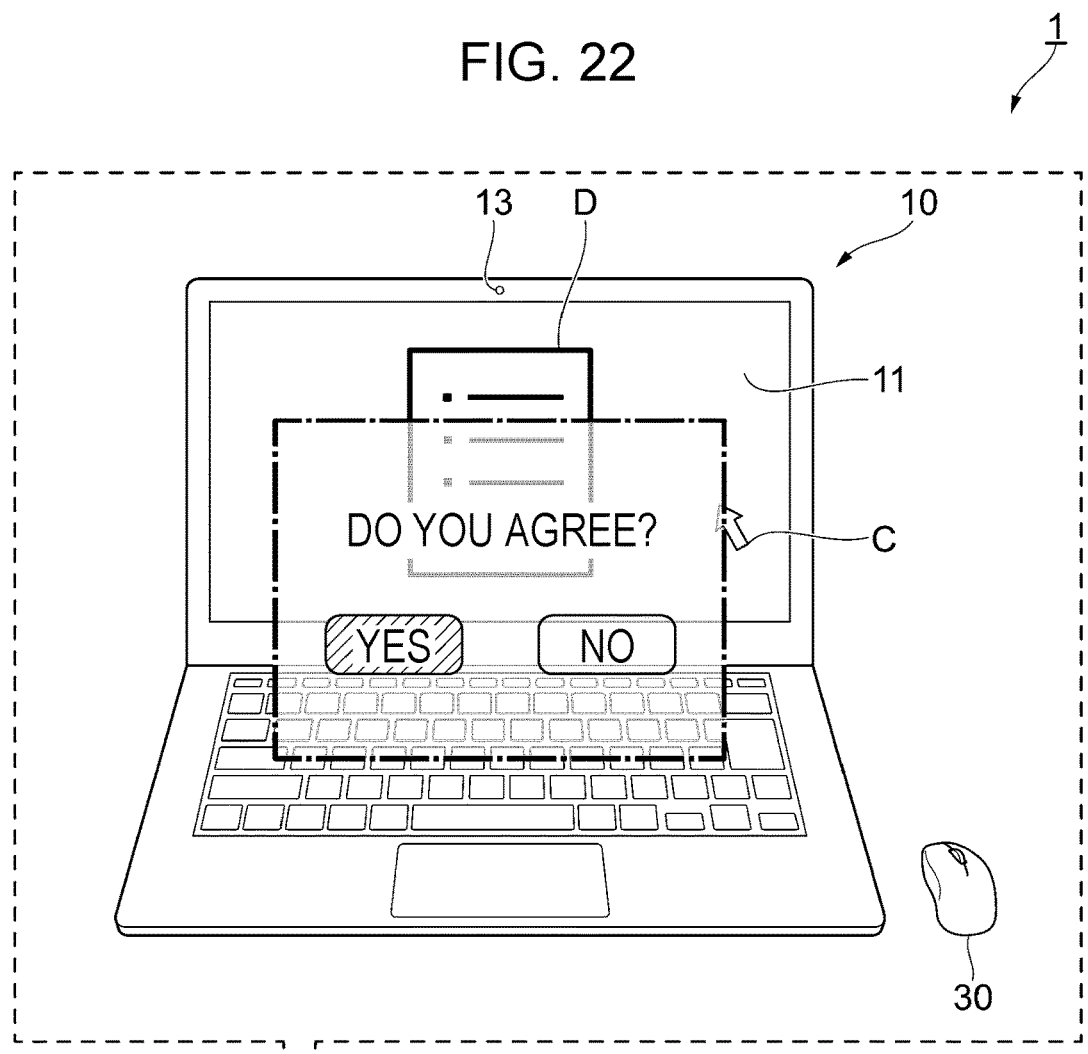
FIG. 22 is a diagram illustrating an example of an instruction assumed in a fifth exemplary embodiment.
Figure 22:
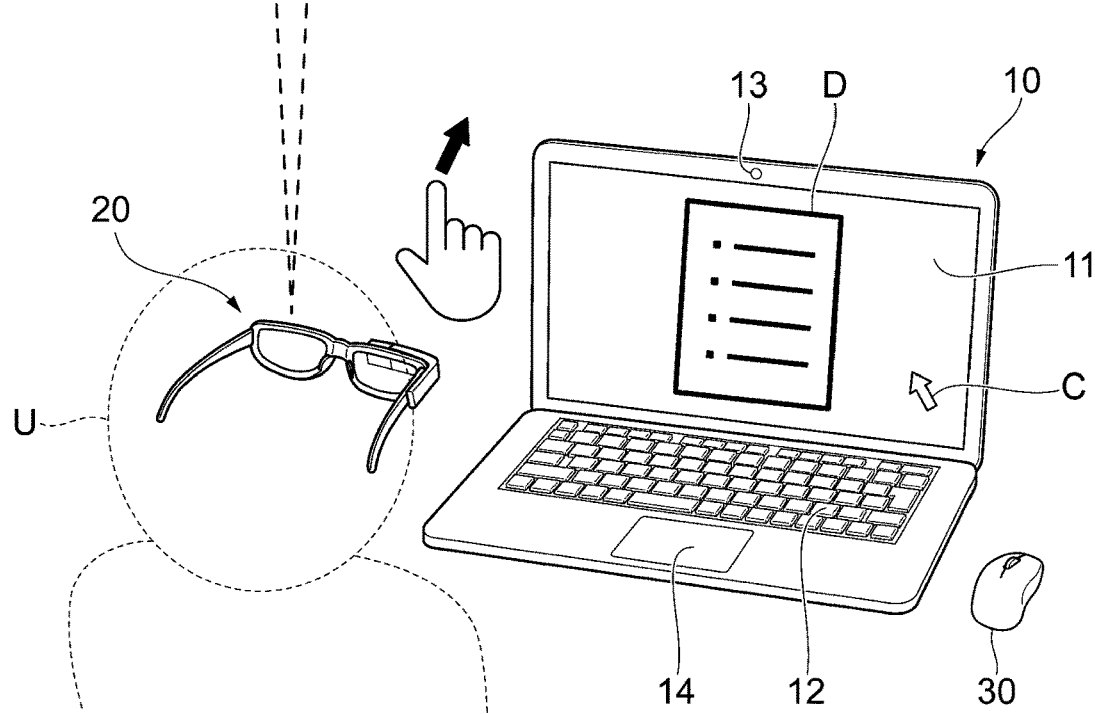

FIG. 22 is a diagram illustrating an example of an instruction assumed in the fifth exemplary embodiment. In FIG. 22, the same components as in FIG. 6 are given the same reference numerals.

In FIG. 22, the user U moves a finger thereof to use a button disposed in the air. More specifically, the user U moves his/her right index finger in such a way as to tap the button disposed in the air. In other words, the user U moves his/her right index finger away from himself/herself.

When the right index finger is not specified as a condition for accepting an operation based on a gesture, the user U may use another finger, a writing tool such as a pencil or a ballpoint pen, or another stick-shaped item such as a pointer to use a button. It is needless to say that an object used to give an instruction is not limited to the above examples.

The user U need not necessarily use a button by tapping the button. For example, the user U may keep a finger thereof still at a position of the button for a certain period of time or longer, double-tap the button, swipe the button in a particular direction, or make a gesture involving plural fingers, instead.

In the present exemplary embodiment, a relationship between coordinates of a finger in the air and coordinates of buttons disposed in the air is identified or use of one of the buttons is detected by analyzing an image captured by the camera 22 provided for the XR device 20. Alternatively, a distance between the XR device 20 and a tip of a finger or coordinates of the tip of the finger may be measured using a three-dimensional scanner typified by lidar, and use of a button may be detected on the basis of a result of the measurement.

Insofar as a gesture made by the user U and a certain button can be associated with each other, detection of coordinates and matching of coordinates in a strict sense are not necessary.

When the XR device 20 gives the computer 10 information regarding a position of an AR image disposed in the air and positions of buttons included in the AR image, a relationship between coordinates of a tip of a finger in the air and coordinates of one of the buttons disposed in the air may be identified and use of the button may be detected by analyzing an image captured by the camera 13 provided for the computer 10.

In the present exemplary embodiment, buttons disposed in the air can be used in various manners.

Sixth Exemplary Embodiment

In a sixth exemplary embodiment, a case where a button for instructing the computer 10 (refer to FIG. 1) to perform an operation is an icon for notifying the user U of reception of messages in a message app will be described.

Figure 23:
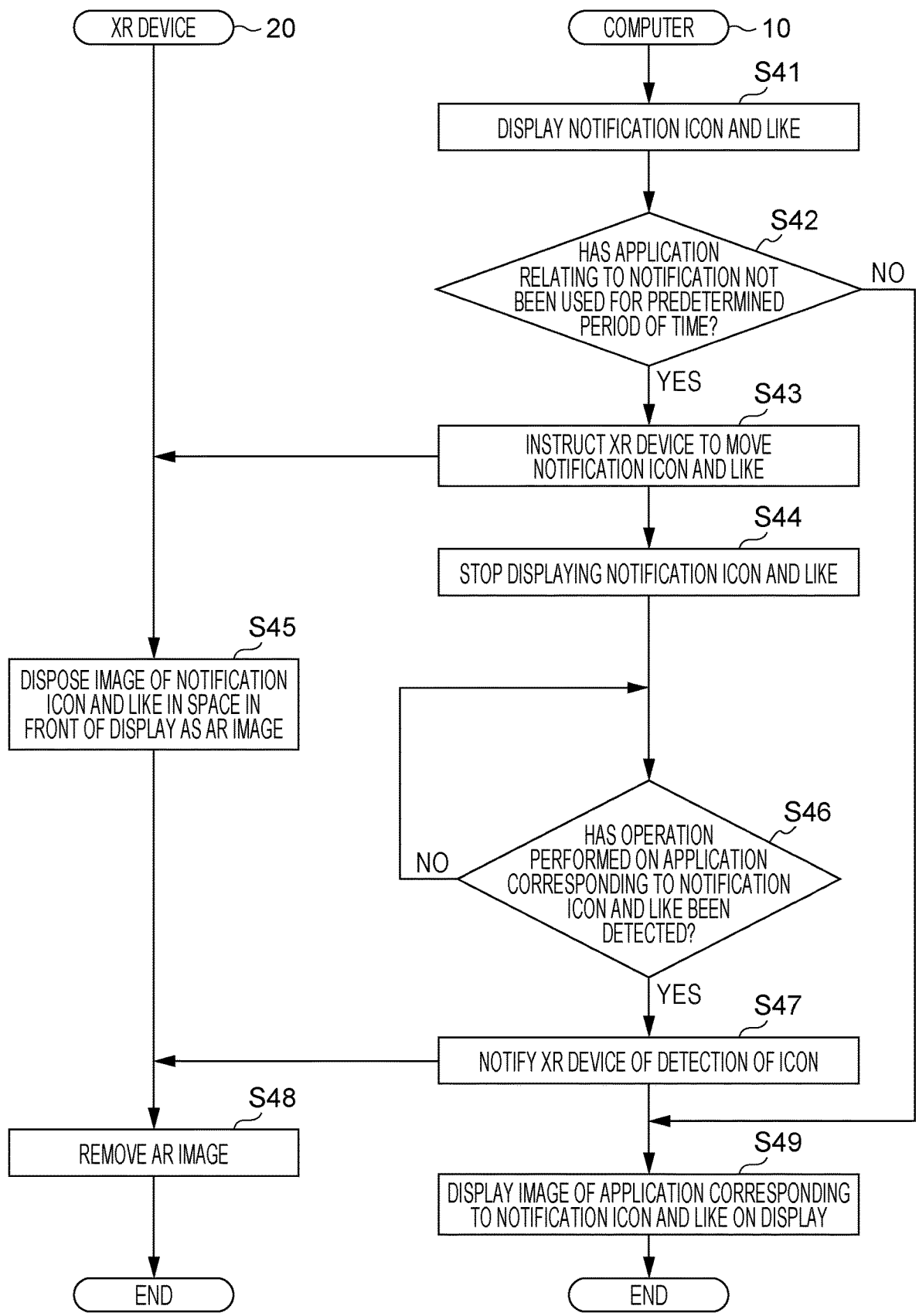
FIG. 23 is a diagram illustrating an example of a process cooperatively performed by the computer and the XR device according to a sixth exemplary embodiment.

FIG. 23 is a diagram illustrating an example of a process cooperatively performed by the computer 10 and the XR device 20 according to the sixth exemplary embodiment.

First, when an event is detected, the processor 101 (refer to FIG. 2) of the computer 10 displays a notification icon and the like on the display 11 (refer to FIG. 2) (step S41). As described above, in the present exemplary embodiment, an icon for notifying the user U of reception of messages in a message app is assumed as the notification icon. In other words, the notification icon is an icon indicating that messages have not been read. The notification icon may be text displayed in a popup window. In the present exemplary embodiment, text used to receive messages is an example of an icon.

Next, the computer 10 determines whether an application relating to notification has not been used for a predetermined period of time (step S42). In the present exemplary embodiment, the length of time for which the message app has not been used is measured, and the determination in step S42 is made on the basis of the measured length of time.

If a negative result is obtained in step S42, the computer 10 displays an image of the application corresponding to the notification icon and the like on the display 11 (step S49). In this case, the notification icon and the like are not displayed in the air as an AR image, and the user U checks messages using the application displayed on the display 11.

If a positive result is obtained in step S42, on the other hand, the computer 10 instructs the XR device 20 to move the notification icon and the like (step S43) and stops displaying the notification icon and the like (step S44).

Upon receiving the instruction from the computer 10, the XR device 20 dispose an image of the notification icon and the like in the space in front of the display 11 as an AR image (step S45).

Empirically speaking, if the user U is focusing on work or not looking at the display 11 when the notification icon and the like pop up, the user U might not notice the notification icon and the like.

When the AR image appears in the air, however, the user U is likely to notice the AR image since the AR image is more evident than when displayed on the display 11.

The computer 10 then determines whether an operation performed on the application corresponding to the notification icon and the like has been detected (step S46).

While a negative result is obtained in step S46, the computer 10 repeatedly makes the determination in step S46.

If a positive result is obtained in step S46, on the other hand, the computer 10 notifies the XR device 20 of the detection of the operation (step S47) and displays an image of the application corresponding to the notification icon and the like (step S49).

Upon being notified, the XR device 20 removes the AR images (step S48).

Although the computer 10 performs steps S41 and S42 when reception of a message is detected in the example illustrated in FIG. 23, the computer 10 may immediately perform step S43 when reception of a message is detected. That is, an icon indicating reception of a message and the like may be disposed in the air as an AR image at the same time as the reception of the message. In this case, step S44 is also unnecessary.

In this case, the user U can notice reception of a message at the same time as the reception of the message.

Figure 24:
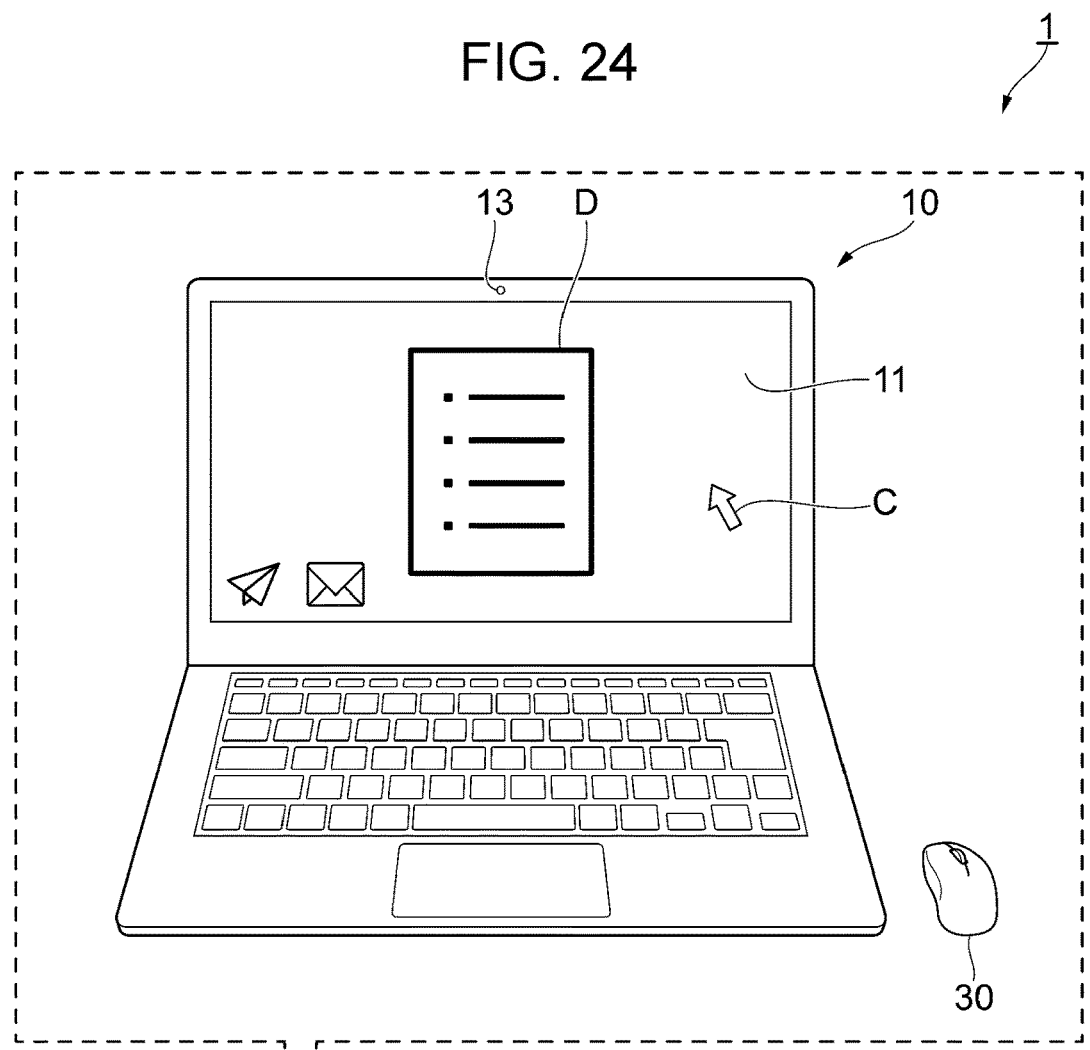
FIG. 24 is a diagram illustrating an example of user interfaces at a time when a negative result has been obtained in step S42.
Figure 24:
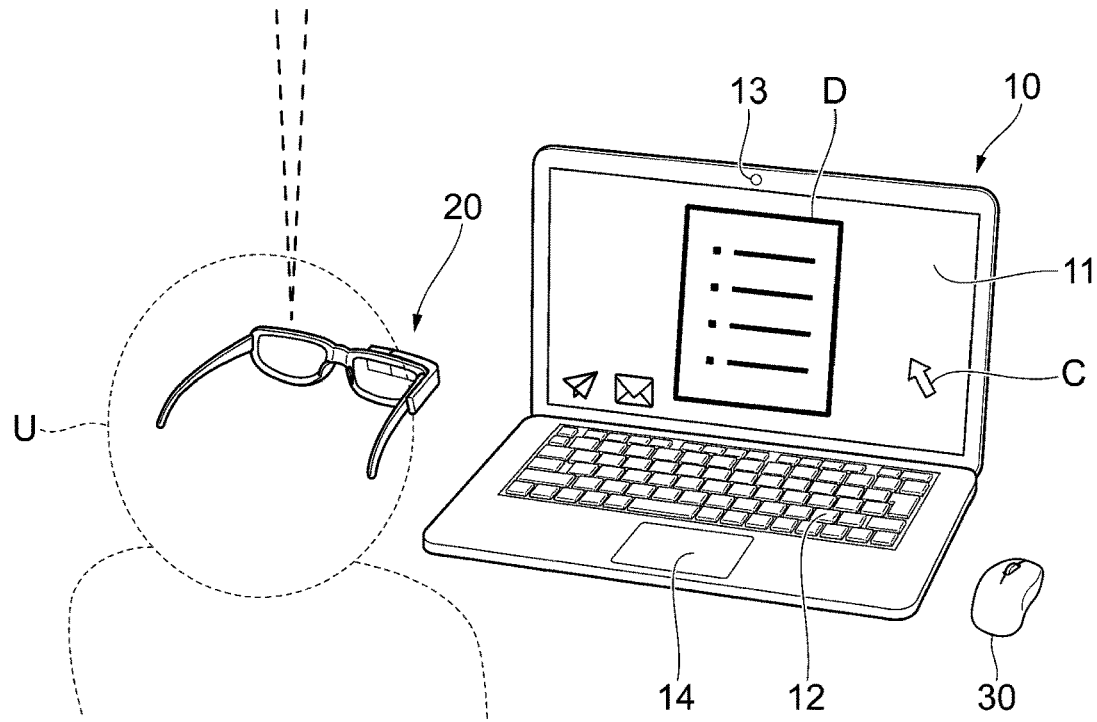
Figure 25:
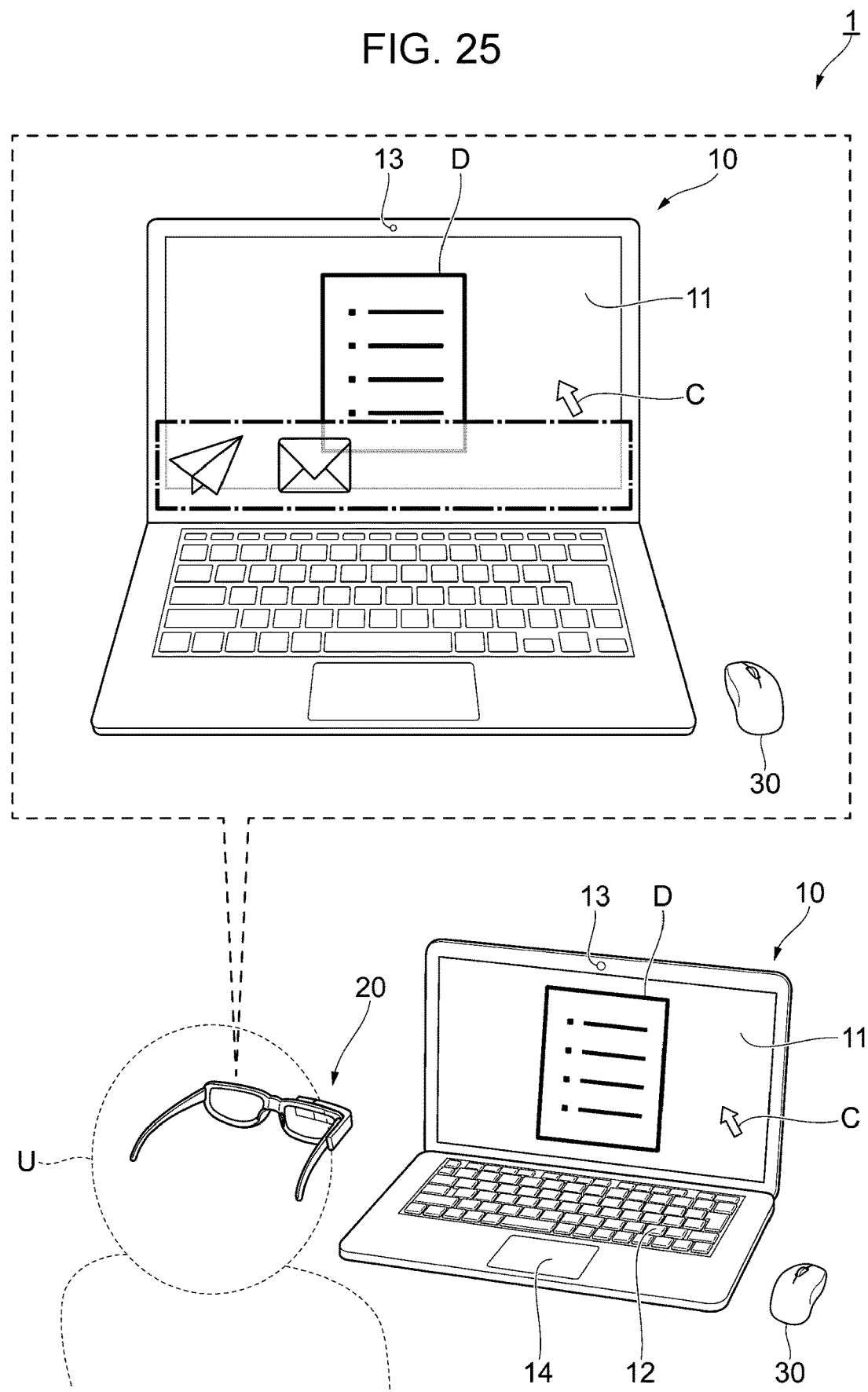
FIG. 25 is a diagram illustrating an example of user interfaces at a time when a positive result has been obtained in step S42.

FIGS. 24 and 25 illustrate changes in user interfaces in the present exemplary embodiment.

FIG. 24 is a diagram illustrating an example of user interfaces at a time when a negative result has been obtained in step S42 (refer to FIG. 23). FIG. 25 is a diagram illustrating an example of user interfaces at a time when a positive result has been obtained in step S42 (refer to FIG. 23). In FIGS. 24 and 25, the same components as in FIG. 6 are given the same reference numerals.

Since the user U has not noticed icons having shapes of a paper airplane and an envelope in the example illustrated in FIG. 24, an image recognized by the user U wearing the XR device 20 and an image displayed on the display 11 match.

In the example illustrated in FIG. 25, on the other hand, an AR image pop up from the display 11. The user, therefore, is more likely to notice appearance of the icons. As a result, the user U does not overlook the icons.

Seventh Exemplary Embodiment

In a seventh exemplary embodiment, user interfaces used when the XR device 20 is turned off with an AR image disposed in the air.

Figure 26A:
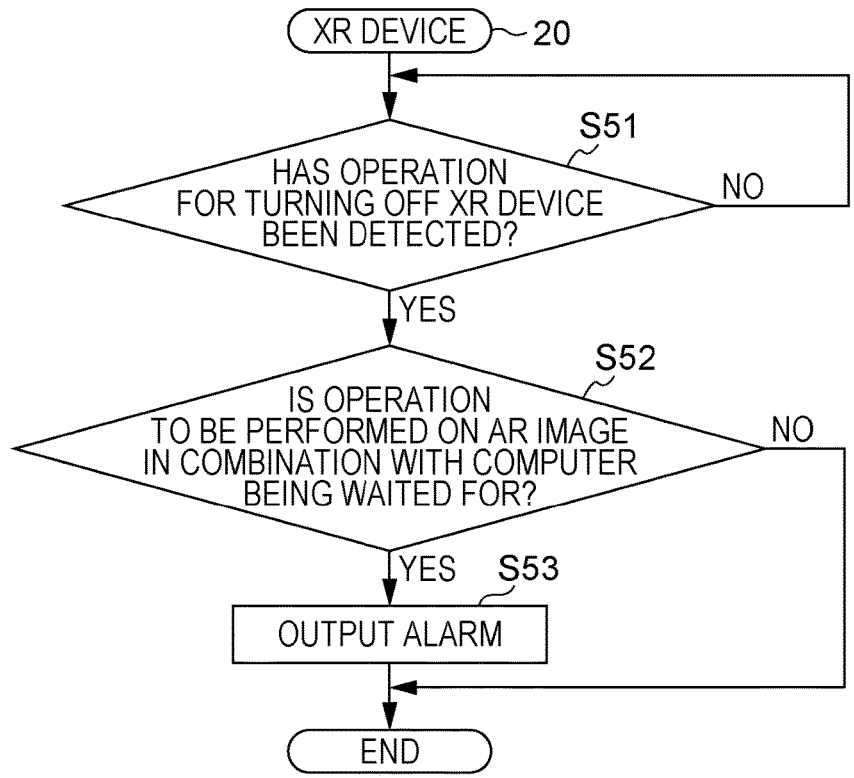
FIGS. 26A and 26B are diagrams illustrating an example of a process used in a seventh exemplary embodiment.
Figure 26B:
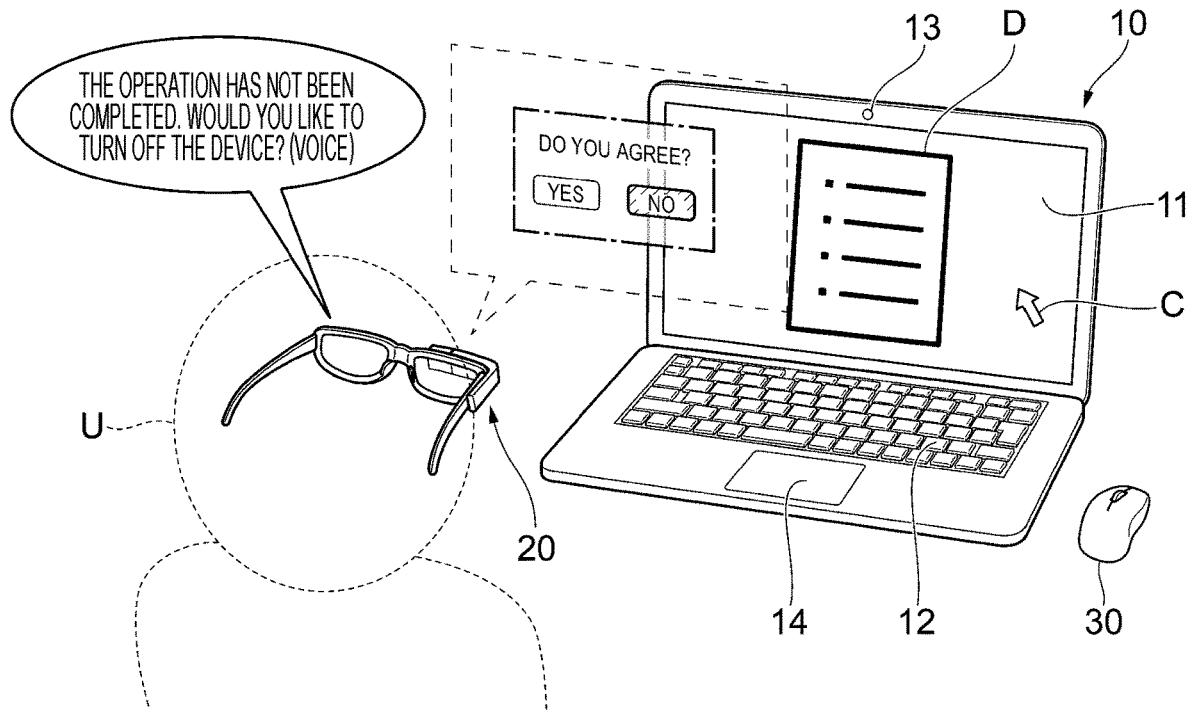

FIGS. 26A and 26B are diagrams illustrating an example of a process used in the seventh exemplary embodiment. FIG. 26A illustrates an example of a process performed when the XR device 20 is turned off, and FIG. 26B illustrates an example of an output alarm.

In FIG. 26A, the XR device 20 determines whether an operation for turning off the XR device 20 has been detected (step S51). The operation for turning off the XR device 20 is an example of a predetermined event.

Although the operation for turning off the XR device 20 is detected in the example illustrated in FIG. 26, an operation for turning off the computer 10, with which the XR device 20 cooperates, may be detected or an operation for turning off either the XR device 20 or the computer 10 may be detected, instead.

While a negative result is obtained in step S51, the XR device 20 repeatedly makes the determination in step S51.

If a positive result is obtained in step S51, the XR device 20 determines whether an operation to be performed on the AR image in combination with the computer 10 is being waited for (step S52). In other words, the XR device 20 determines whether an AR image including buttons for instructing the computer 10 to perform operations is displayed.

If a negative result is obtained in step S52, the XR device 20 turns off.

If a positive result is obtained in step S52, on the other hand, the XR device 20 outputs an alarm (step S53).

The alarm is output in order to notify the user U of presence of an event to be processed and gives the user U an opportunity to cancel the operation for turning off the XR device 20.

The alarm may be output using a method employing a sound, a method employing a vibration, a method employing a voice, a method in which a new AR image is added, a method in which text is added to an existing AR image, a method in which luminance or tone of an existing AR image is changed, a method obtained by combining together some of these methods, or the like.

FIG. 26B illustrates an example in which an alarm is output using a voice. The speaker 24 (refer to FIG. 3) of the XR device 20 plays back a voice, "The operation has not been completed. Would you like to turn off the device?"

When such an alarm is output, the user U can notice presence of an event to be processed even if the user U has performed an operation for turning off the XR device 20 without processing the event. The user U can also cancel the operation for turning off the XR device 20, if still possible.

Although the XR device 20 performs both steps S51 and S52 in FIGS. 26A and 26B, the computer 10 may perform step S51 and/or step S52, instead.

Eighth Exemplary Embodiment

Another example in which an alarm is output will be described in an eight exemplary embodiment.

Figure 27A:
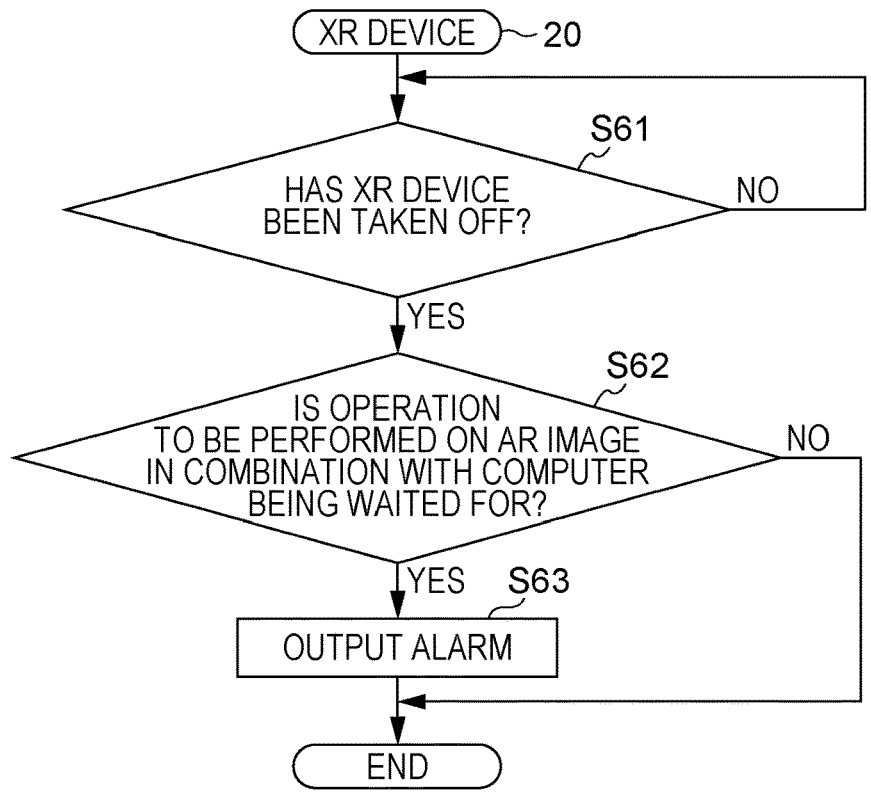
FIGS. 27A and 27B are diagrams illustrating an example of a process used in an eighth exemplary embodiment.
Figure 27B:
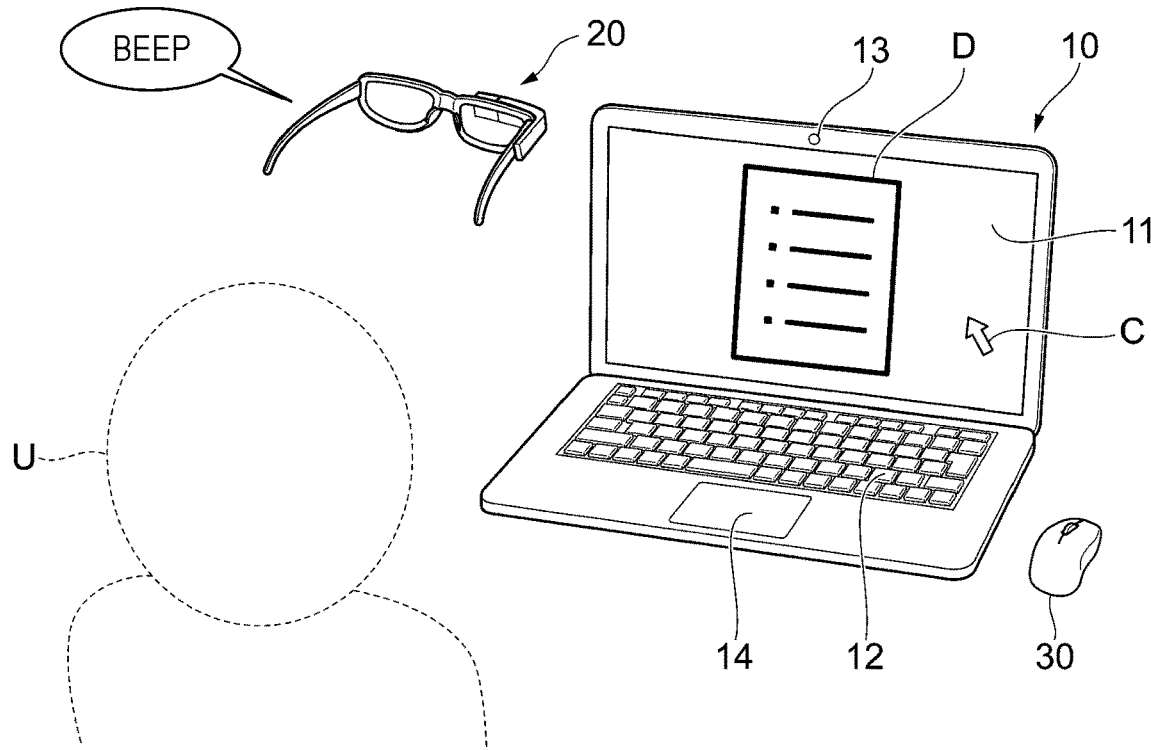

FIGS. 27A and 27B are diagrams illustrating an example of a process used in the eighth exemplary embodiment. FIG. 27A illustrates an example of a process performed when the user U takes off the XR device 20, and FIG. 27B illustrates an example of an output alarm.

In FIG. 27A, the XR device 20 determines whether the user U has taken off the XR device 20 (step S61). In the present exemplary embodiment, the user U takes off the XR device 20 from his/her head. The taking off of the XR device 20 is another example of the predetermined event.

If a negative result is obtained in step S61, the XR device 20 repeatedly makes the determination in step S61. A negative result is obtained in step S61 when the XR device 20 is worn on the head of the user U and the user U recognizes an AR image.

Whether the user U wears the XR device 20 is determined by a sensor disposed at a part of the XR device 20 in contact with a temple or a root of a nose of the user U. The sensor may be, for example, a pressure sensor that detects pressure or a temperature sensor that detects body temperature.

If a positive result is obtained in step S61, the XR device 20 determines whether an operation to be performed on the AR image in combination with the computer 10 is being waited for (step S62). A positive result is obtained in step S61 when the XR device 20 has been taken off from the head of the user U and the user U does not recognize an AR image.

Step S62 is the same as step S52 illustrated in FIG. 26A.

If a negative result is obtained in step S62, the XR device 20 does not output an alarm. The connection between the computer 10 and the XR device 20 is maintained. When the user U takes off the XR device 20, however, the computer 10 and the XR device 20 may be temporarily disconnected from each other.

If a positive result is obtained in step S62, on the other hand, the XR device 20 outputs an alarm (step S63). The alarm is output in order to notify the user U of presence of an event to be processed and encourage the user U to put on the XR device 20.

The alarm may be output using a method employing a sound, a method employing a vibration, a method employing a voice, a method in which a new AR image is added, a method in which text is added to an existing AR image, a method in which luminance or tone of an existing AR image is changed, a method obtained by combining together some of these methods, or the like.

FIG. 27B illustrates an example in which an alarm sound, "Beep", is output. The output alarm may be a voice, instead of an alarm sound. When the user U wears another wearable terminal connected to the XR device 20 and the computer 10, the alarm may be output by vibrating the other wearable terminal.

When the user U wears wireless earphones, an alarm sound may be played back for the user U through the wireless earphones. When such an alarm is output, the user U can notice presence of an event to be processed even if the user U takes off the XR device 20 by mistake.

Although the XR device 20 performs both steps S61 and S62 in FIGS. 27A and 27B, the computer 10 may perform step S61 and/or step S62, instead.

Ninth Exemplary Embodiment

Another example in which an alarm is output will be described in a ninth exemplary embodiment.

Figure 28A:
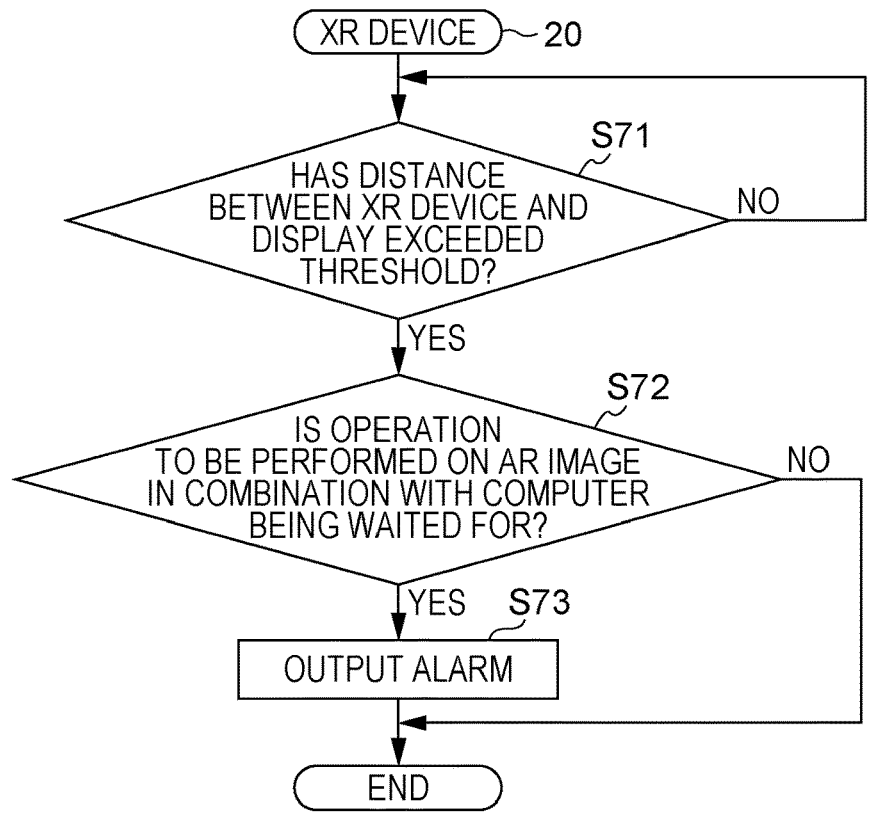
FIGS. 28A and 28B are diagrams illustrating an example of a process used in a ninth exemplary embodiment.
Figure 28B:
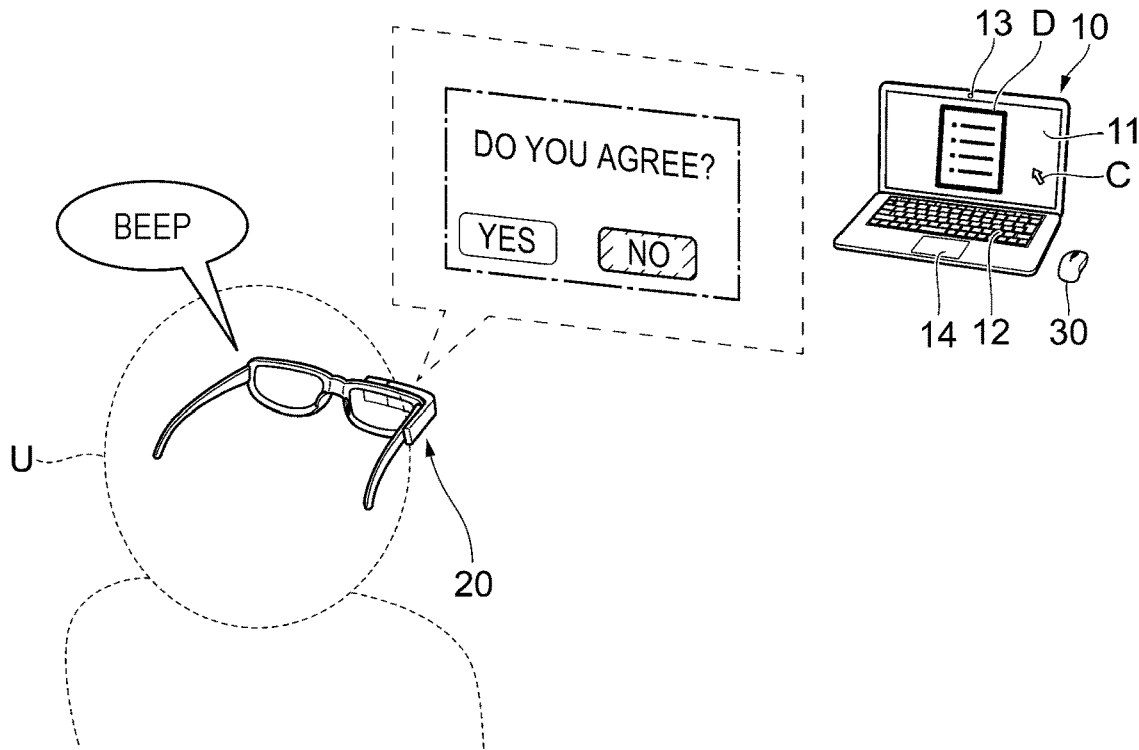

FIGS. 28A and 28B are diagrams illustrating an example of a process used in the ninth exemplary embodiment. FIG. 28A illustrates an example of a process performed when a positional relationship between the XR device 20 and the computer 10 satisfies a predetermined condition, and FIG. 28B illustrates an example of an output alarm.

In FIG. 28A, the XR device 20 determines whether a distance between the XR device 20 and the display 11 has exceeded a threshold (step S71).

A distance to be measured may be a distance between the XR device 20 and the computer 10, instead. The distance between the XR device 20 and the display 11 of the computer 10 may be measured by lidar or by analyzing an image captured by the camera 22 (refer to FIG. 3). The distance, however, need not be measured strictly.

Alternatively, an image captured by the camera 13 (refer to FIG. 2) of the computer 10 may be used to measure the distance.

The threshold is determined in advance, and may be specified or adjusted by the user U. The threshold is 1 m, for example, although the threshold depends on dimensions of the display 11.

The distance between the XR device 20 and the computer 10 being greater than the threshold is another example of the predetermined event. In step S71, however, whether a space in which an AR image is disposed falls out of a position in front of the display 11 may be determined, instead, as illustrated in FIGS. 15A to 16B. An AR image not being disposed in front of the display 11 is another example of the predetermined event.

If a negative result is obtained in step S71, the XR device 20 repeatedly makes the determination in step S71. A negative result is obtained in step S71 when the distance between the XR device 20 and the display 11 of the computer 10 is smaller than or equal to the threshold.

If a positive result is obtained in step S71, the XR device 20 determines whether an operation to be performed on the AR image in combination with the computer 10 is being waited for (step S72).

Step S72 is the same as step S52 illustrated in FIG. 26A.

If a negative result is obtained in step S72, the XR device 20 does not output an alarm. The connection between the computer 10 and the XR device 20 is maintained.

If a positive result is obtained in step S72, on the other hand, the XR device 20 outputs an alarm (step S73).

The alarm is output in order to notify the user U of presence of an event to be processed and give the user U an opportunity to get closer to the display 11.

The alarm may be output using a method employing a sound, a method employing a vibration, a method employing a voice, a method in which a new AR image is added, a method in which text is added to an existing AR image, a method in which luminance or tone of an existing AR image is changed, a method obtained by combining together some of these methods, or the like.

FIG. 28B illustrates an example in which an alarm sound, "Beep", is output. The output alarm may be a vibration, a voice, a new AR image added to an existing AR image, text added to an existing AR image, a change in luminance or tone of an existing AR image, or a combination of these, instead of an alarm sound.

When such an alarm is output, the user U can notice presence of an event to be processed.

Although the XR device 20 performs both steps S71 and S72 in FIGS. 28A and 28B, the computer 10 may perform step S71 and/or step S72, instead.

Figure 29A:
Figure 29B:
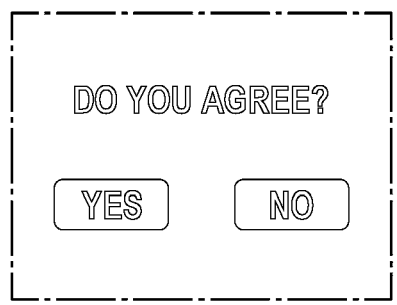
Figure 29D:

FIGS. 29A to 29D are diagrams illustrating an example of changes in an output AR image according to the ninth exemplary embodiment. FIG. 29A illustrates an example of an AR image output when the distance between the XR device 20 and the computer 10 is smaller than the threshold, and FIGS. 29B to 29D illustrate how the AR image fades out as the XR device 20 and the computer 10 become farther from each other.

In FIG. 29A, where the XR device 20 is used within a distance of 1 m from the computer 10, the AR image is most clearly recognized within a range of settings. A state in which the AR image is most clearly recognized does not imply an upper limit of performance of the XR device 20. The state refers to an upper limit within the range of settings.

When the XR device 20 is 1 m or more away from the computer 10, the AR image gradually becomes more transparent or an output decreases as illustrated in FIG. 29B. That is, as the XR device 20 becomes farther from the computer 10, the AR image gradually becomes thinner.

Furthermore, when the distance between the XR device 20 and the computer 10 becomes greater than or equal to 2 m, the AR image becomes even more transparent or the output further decreases as illustrated in FIG. 29C. As a result, the visibility of the AR image gradually decreases.

When an alarm is output after the distance between the XR device 20 and the computer 10 becomes greater than or equal to 2 m, the AR image is no longer output as illustrated in FIG. 29D. FIG. 29D illustrates a voice, "The AR image is no longer output", as an example of the alarm. The alarm indicates removal of the AR image.

Although the AR image recognized by the user U fades out in accordance with the distance between the XR device 20 and the computer 10 in the example illustrated in FIGS. 29A to 29D, the AR image may become thinner stepwise, instead.

Although dimensions of the AR image remain the same in the example illustrated in FIGS. 29A to 29D, the AR image may become smaller as the distance increases, instead.

Alternatively, when a predetermined distance is exceeded, the AR image may be removed, not fades out as illustrated in FIGS. 29A to 29D.

The distances illustrated in FIGS. 29A to 29D are examples of a predetermined condition. Whether to output an alarm before removing the AR image may be determined as desired. That is, the AR image may be removed without outputting an alarm.

Even after the predetermined condition is satisfied, the AR image may continue to be disposed if the user U has disabled a fade-out function or excluded the AR image as a target of the fade-out function. This applies to a case where information whose level of importance has been set high, such as information regarding agreement or installation, has been received and a case where the user U has been notified of a message or a call from a certain person.

The mode illustrated in FIGS. 29A to 29D in which an AR image is output may be employed when, as illustrated in FIGS. 15A to 16B, the user U looks away from the display 11. More specifically, an AR image may fade out as the AR image becomes farther from the display 11 in a vertical or horizontal direction.

An effect of gradually reducing an AR image in size may also be used, or an AR image may be reduced only in size while maintaining the same thickness. Furthermore, when an AR image is gradually reduced in size, the AR image may become smaller toward the center thereof or one of four corners thereof. The center of the AR image may be the same as the center of the display 11.

Figure 30A:
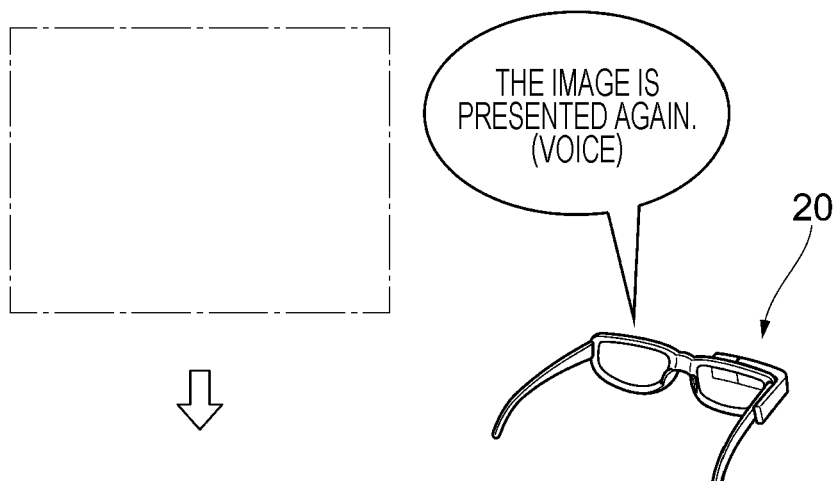
FIGS. 30A to 30D are diagrams illustrating another example of the changes in the output AR image according to the ninth exemplary embodiment.
Figure 30B:
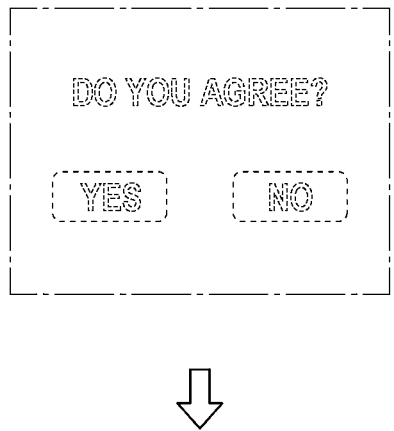
Figure 30C:
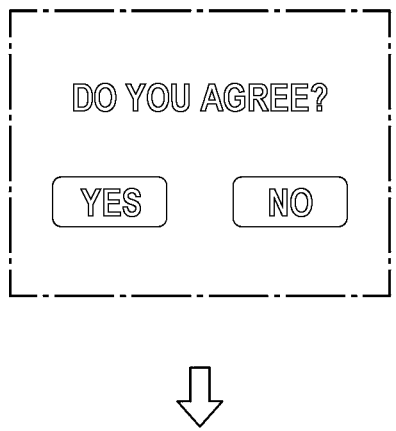
Figure 30D:
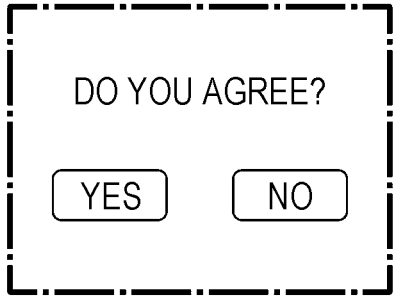

FIGS. 30A to 30D are diagrams illustrating another example of the changes in the output AR image according to the ninth exemplary embodiment. FIG. 30A illustrates an example of an output AR image at a time when the distance between the XR device 20 and the computer 10 is greater than the threshold, and FIGS. 30B to 30D illustrate how the AR image fades in as the XR device 20 and the computer 10 become closer to each other.

In FIG. 30A, where the XR device 20 is used 2 m or more away from the computer 10, the AR image is not output in the air.

When the XR device 20 is within 2 m from the computer 10, presentation of the AR image resumes. In the example illustrated in FIG. 30B, the AR image is output after a voice, "The image is presented again", is output. Although the user U recognizes the AR image in FIG. 30B, transparency or an output level of the AR image is low.

When the distance between the XR device 20 and the computer 10 becomes smaller than 2 m but greater than or equal to 1 m, the AR image gradually becomes less transparent or the output gradually increases as illustrated in FIG. 30C. That is, as the XR device 20 becomes closer to the computer 10, the AR image gradually becomes thicker.

Lastly, as illustrated in FIG. 30D, when the distance between the XR device 20 and the computer 10 becomes smaller than 1 m, the AR image becomes most clearly recognized within the range of settings. As described above, the state in which the AR image is most clearly recognized does not imply the upper limit of the performance of the XR device 20. The state refers to the upper limit within the range of settings.

Although the AR image recognized by the user U fades in in accordance with the distance between the XR device 20 and the computer 10 in the example illustrated in FIGS. 30A to 30D, the AR image may become thinner stepwise, instead.

Although dimensions of the AR image remain the same in the example illustrated in FIGS. 30A to 30D, the AR image may become larger as the distance decreases, instead.

Alternatively, when a predetermined distance is exceeded, the AR image may appear, not fades in as illustrated in FIGS. 30A to 30D.

The distances illustrated in FIGS. 30A to 30D are examples of the predetermined condition. Whether to output a voice before disposing the AR image may be determined as desired. That is, the AR image may be disposed without outputting a voice.

Even after the predetermined condition is satisfied, the AR image may continue to be removed if the user U has disabled a fade-in function or excluded the AR image as a target of the fade-in function. This applies to a case where information whose level of importance has been set low, such as a notification about reception of a message, has been received and a case where the user U has been notified of an event having high immediacy, such as a call.

The mode illustrated in FIGS. 30A to 30D in which an AR image is output may be employed when, as illustrated in FIGS. 15A to 16B, the user U turns his/her line of sight to the display 11.

More specifically, an AR image may fade in as the AR image becomes closer to the display 11 in the vertical or horizontal direction.

An effect of gradually increasing in size an AR image that has not been disposed after the AR image appears in the air as a dot or a small image may also be used, or an AR image that has not been disposed may be increased only in size while maintaining the same thickness after the AR image appears as a dot or a small image. Furthermore, when an AR image that has not been disposed is gradually increased in size after appearing in the air as a dot or a small image, the AR image may become larger from a point where the AR image has appeared, the point being the center of the AR image or one of four corners of the AR image. The point may be one of four corners of the screen of the display 11.

Tenth Exemplary Embodiment

In a tenth exemplary embodiment, user interfaces used when an event of waiting for use of buttons included in an AR image is detected after the connection between the computer 10 and the XR device 20 resumes will be described.

Disconnection of the computer 10 and the XR device 20 from each other, which is a premise of the present exemplary embodiment, occurs, for example, when either the computer 10 or the XR device 20 has been turned off, the user U has requested the disconnection, the distance between the computer 10 and the XR device 20 exceeds a communicable range, or the computer 10 and the XR device 20, even within the communicable range, no longer satisfy a predetermined condition. The turning off of the computer 10 or the XR device 20 includes establishment of a sleep state.

Figure 31A:
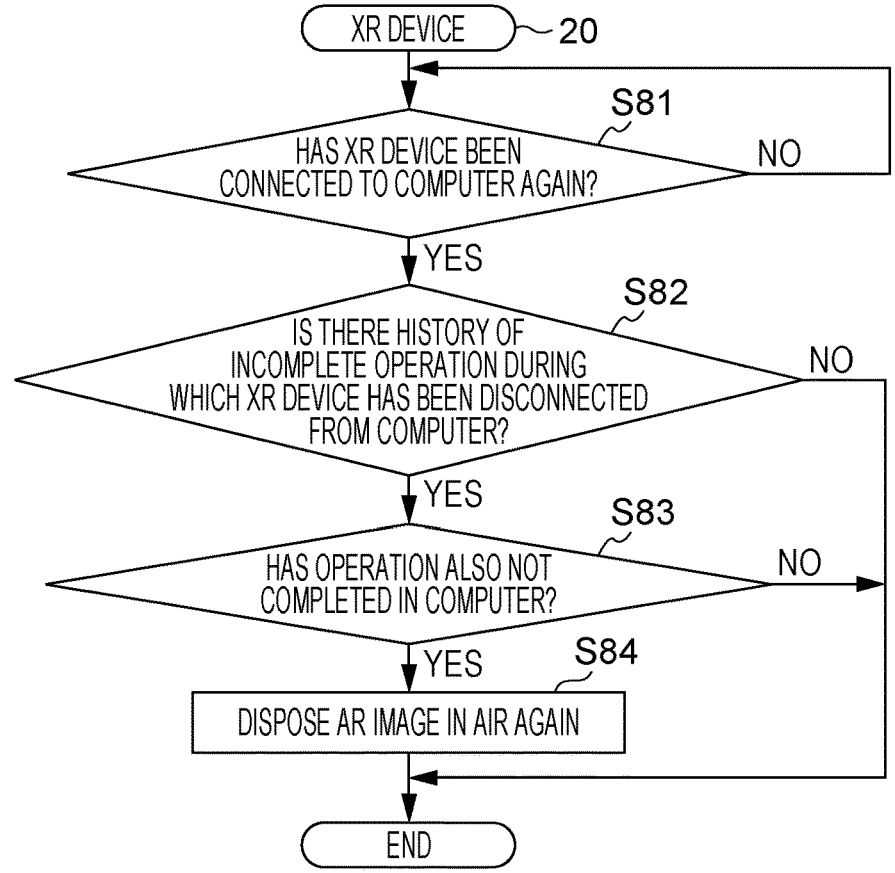
FIGS. 31A and 31B are diagrams illustrating an example of a process used in a tenth exemplary embodiment.
Figure 31B:
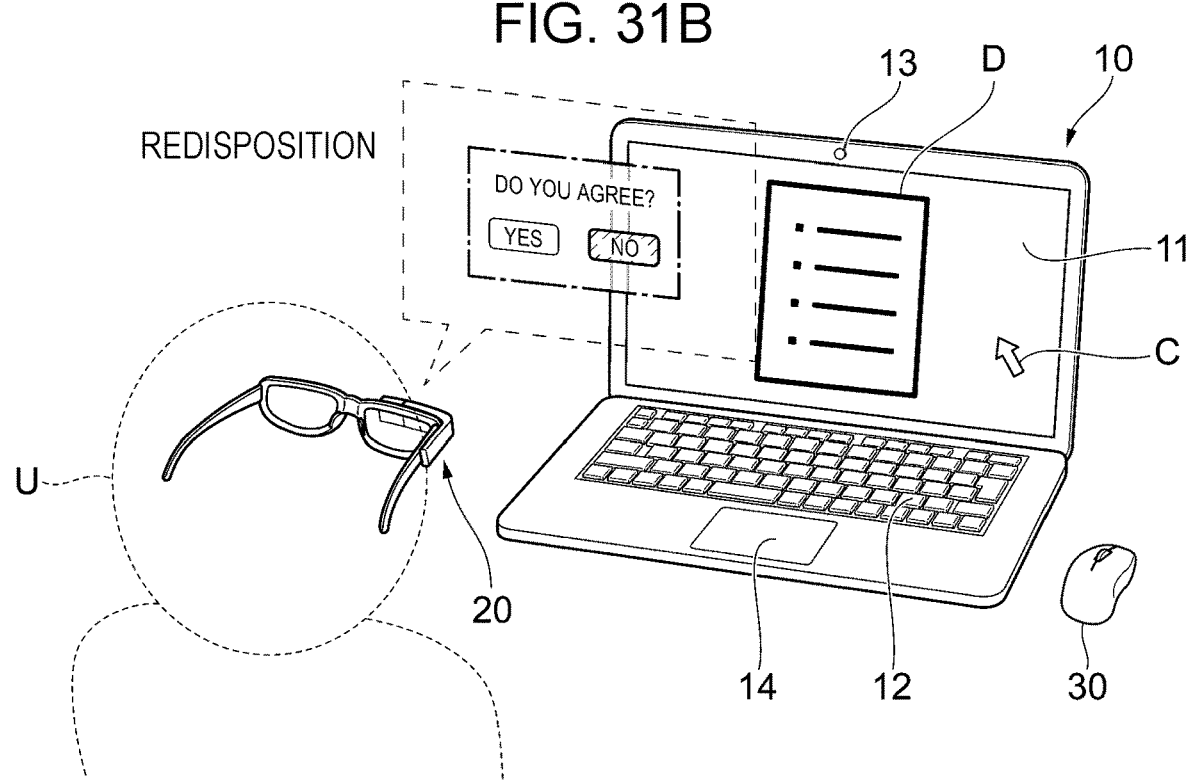

FIGS. 31A and 31B are diagrams illustrating an example of a process used in the tenth exemplary embodiment. FIG. 31A illustrates an example of a process performed when the XR device 20 connects to the computer 10 again, and FIG. 31B illustrates a possible scene.

In FIG. 31A, the XR device 20 determines whether the XR device 20 has connected to the computer 10 again (step S81).

The XR device 20 connects to the computer 10 again when, contrary to the disconnection of the computer 10 and the XR device 20 from each other, either the computer 10 or the XR device 20 has been turned on and, as a result, both the computer 10 and the XR device 20 have been turned on, either the computer 10 or the XR device 20 has woken up from a sleep state, the user U has requested reconnection between the computer 10 and the XR device 20, the distance between the computer 10 and the XR device 20 has fallen within the communicable range again, or the computer 10 and the XR device 20, within the communicable range, have satisfied the predetermined condition again.

While a negative result is obtained in step S81, the XR device 20 repeatedly makes the determination in step S81. When the computer 10 or the XR device 20 is turned on or wakes up from the sleep state, however, an event is identified after an application for achieving a function in the present exemplary embodiment becomes available.

If a positive result is obtained in step S81, on the other hand, the XR device 20 determines whether there is a history of an incomplete operation during which the XR device 20 has been disconnected from the computer 10 (step S82).

If a negative result is obtained in step S82, the XR device 20 ends the process, which accompanies the reconnection.

If a positive result is obtained in step S82, the XR device 20 determines whether the operation has also not been completed in the computer 10 (step S83). The determination is made in order to find a discrepancy between a history of operation in the XR device 20 and a history of operation in the computer 10. This is because, for example, the user U might have used a button using the computer 10 after the computer 10 and the XR device 20 are disconnected from each other.

If a negative result is obtained in step S83, the XR device 20 ends the process, which accompanies the reconnection.

If a positive result is obtained in step S83, on the other hand, the XR device 20 disposes, again in the air, the AR image including the buttons to be used (step S84).

In FIG. 31B, the AR image is disposed again in front of the display 11 as described in the first exemplary embodiment. In other words, the AR image appears in the air at the same time as the reconnection. As a result of the appearance of the AR image, the user U notices that there is an operation to be performed, and can complete the operation.

Eleventh Exemplary Embodiment

In an eleventh exemplary embodiment, a case where buttons for instructing the computer 10 (refer to FIG. 1) to perform operations are directly presented as an AR image without being displayed on the display 11 (refer to FIG. 1).

Figure 32:
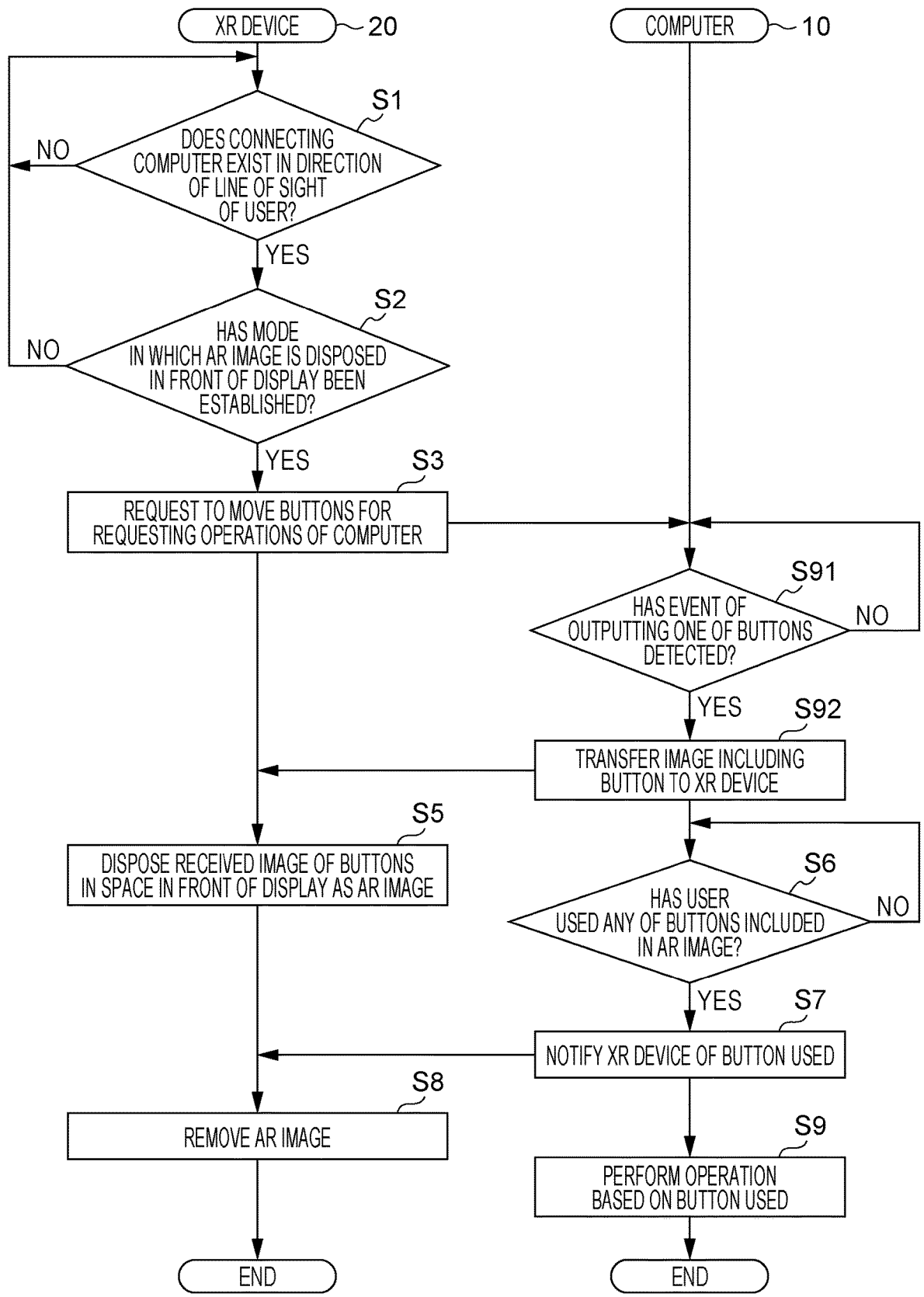
FIG. 32 is a diagram illustrating an example of a process cooperatively performed by the computer and the XR device according to an eleventh exemplary embodiment.

FIG. 32 is a diagram illustrating an example of a process cooperatively performed by the computer 10 and the XR device 20 according to the eleventh exemplary embodiment. In FIG. 32, the same steps as in FIG. 5 are given the same reference numerals.

In FIG. 32, too, the XR device 20 performs steps S1 to S3. That is, the XR device 20 first confirms that the user is looking at the computer 10 to which the XR device 20 is connected and that a mode in which the computer 10 and the XR device 20 cooperatively disposes an AR image has been established. Next, the XR device 20 requests the computer 10 to move buttons for requesting operations of the computer 10.

Upon receiving the request in step S3, the computer 10 determines whether an event of outputting one of the buttons has been detected (step S91). The event is, for example, an event that requires selection or agreement from the user U.

While a negative result is obtained in step S91, the computer 10 repeatedly makes the determination in step S91.

If a positive result is obtained in step S91, on the other hand, the computer 10 transfers an image including the button to the XR device 20 (step S92).

Since the computer 10 does not display the buttons on the display 11 in the present exemplary embodiment, the computer 10 does not remove the buttons as in FIG. 5.

Subsequent steps are the same as in FIG. 5.

Twelfth Exemplary Embodiment

In a twelfth exemplary embodiment, a case where a dialog box including predetermined buttons is presented to the user U using both the display 11 (refer to FIG. 1) and an AR image will be described.

Figure 33:
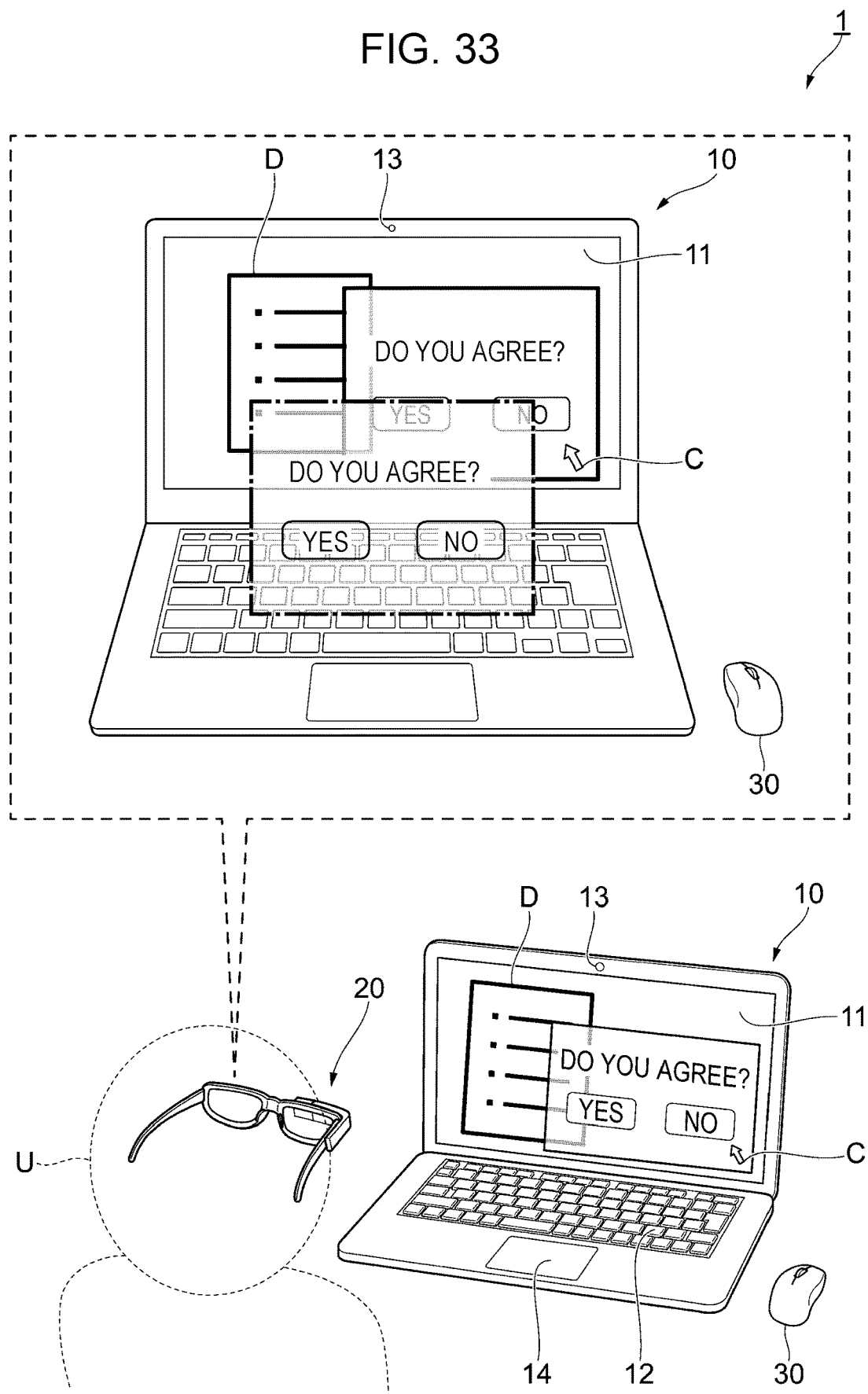
FIG. 33 is a diagram illustrating an example of presentation of a dialog box according to a twelfth exemplary embodiment.

FIG. 33 is a diagram illustrating an example of presentation of the dialog box according to the twelfth exemplary embodiment. In FIG. 33, the same components as in FIG. 6 are given the same reference numerals.

FIG. 33, the display 11 displays, on the display 11, a dialog box such that the dialog box overlaps the document D and, at the same time, disposes the same dialog box in the air as an AR image.

Dimensions of the dialog box displayed on the display 11 and dimensions of the AR image are the same in the example illustrated in FIG. 33. When the dialog box displayed on the display 11 is hidden behind another image, for example, the user U is less likely to overlook the dialog box since the dialog box is disposed in the air as the AR image.

Thirteenth Exemplary Embodiment

In a thirteenth exemplary embodiment, a case where predetermined buttons are constantly disposed in the air as an AR image will be described.

Figure 34:
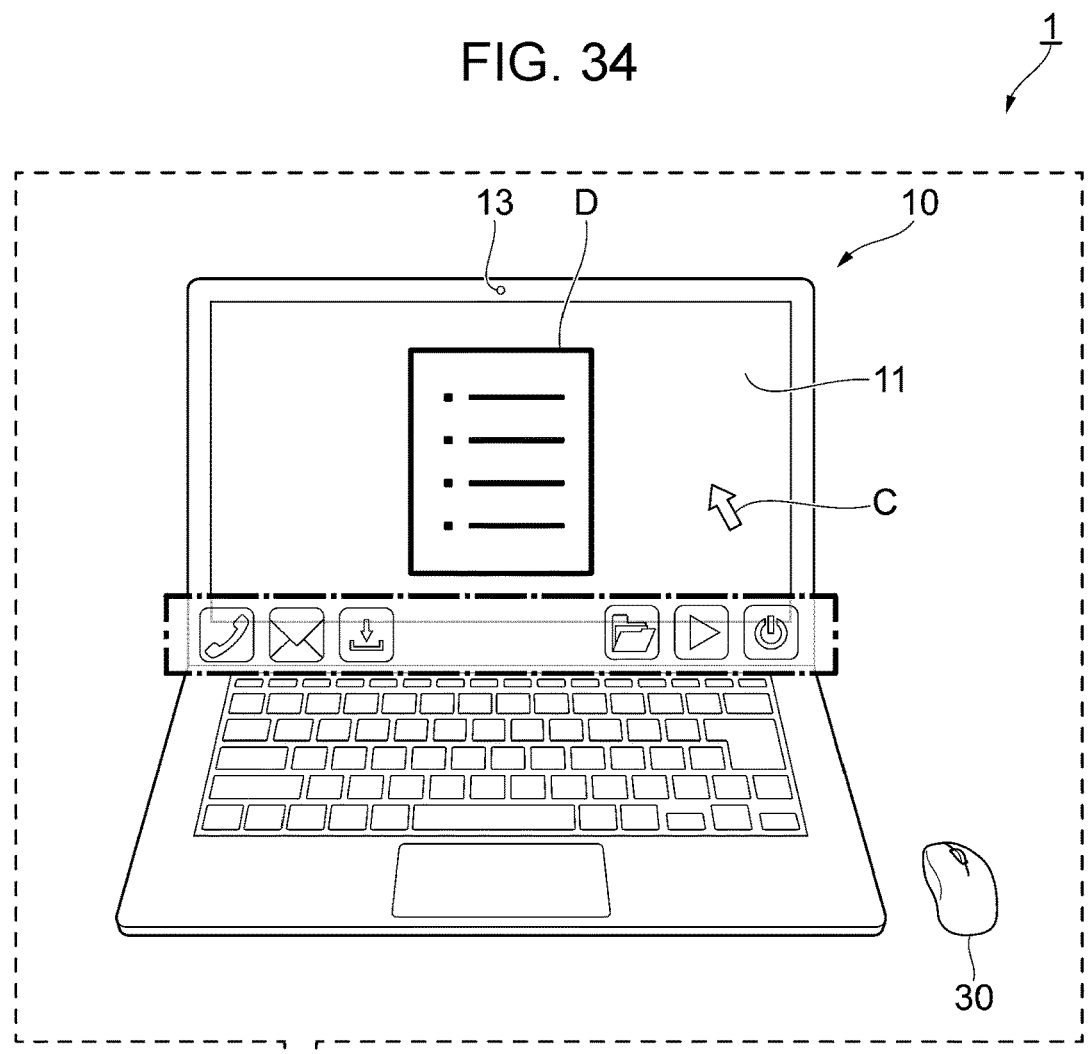
FIG. 34 is a diagram illustrating an example of presentation of a dialog box according to a thirteenth exemplary embodiment.
Figure 34:
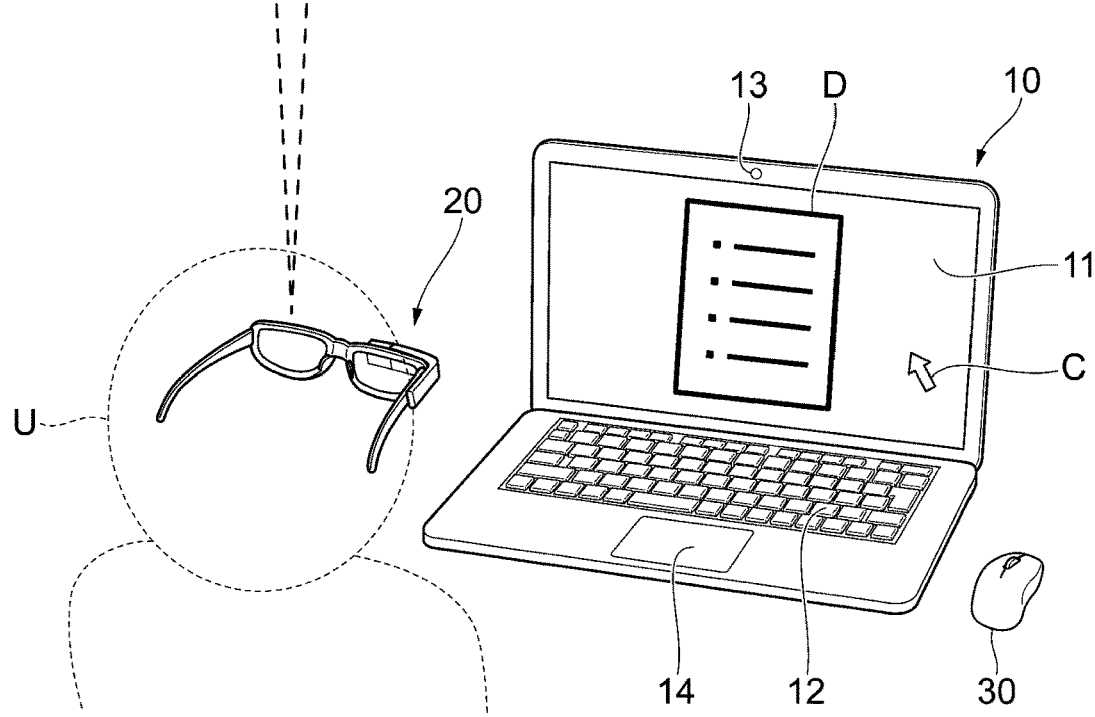

FIG. 34 is a diagram illustrating an example of presentation of a dialog box according to the thirteenth exemplary embodiment. In FIG. 34, the same components as in FIG. 6 are given the same reference numerals.

In FIG. 34, an AR image including predetermined buttons is constantly disposed at a position that does not interfere with operations performed using the display 11.

The predetermined buttons include, for example, icons used to activate frequently used applications and icons indicating activated applications. The icons used to activate applications are also called "shortcut keys".

In FIG. 34, the icons as the AR image are disposed along a lower edge of the screen of the display 11. A position at which the icons as the AR image is to be disposed, however, is not limited to the periphery of the screen of the display 11, and may be in a space outside the display 11.

Fourteenth Exemplary Embodiment

In a fourteenth exemplary embodiment, a function achieved by the camera 22 (refer to FIG. 3) of the XR device 20 will be described.

Figure 35A:
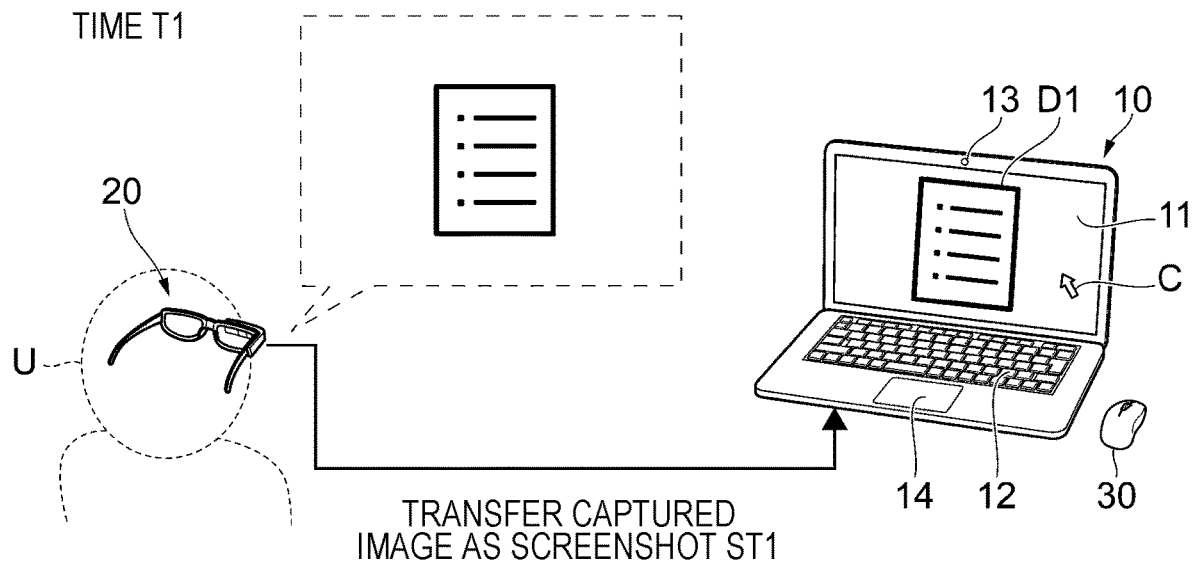
FIGS. 35A and 35B are diagrams illustrating an example of use of the XR device according to a fourteenth exemplary embodiment.
Figure 35A:
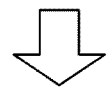
Figure 35B:
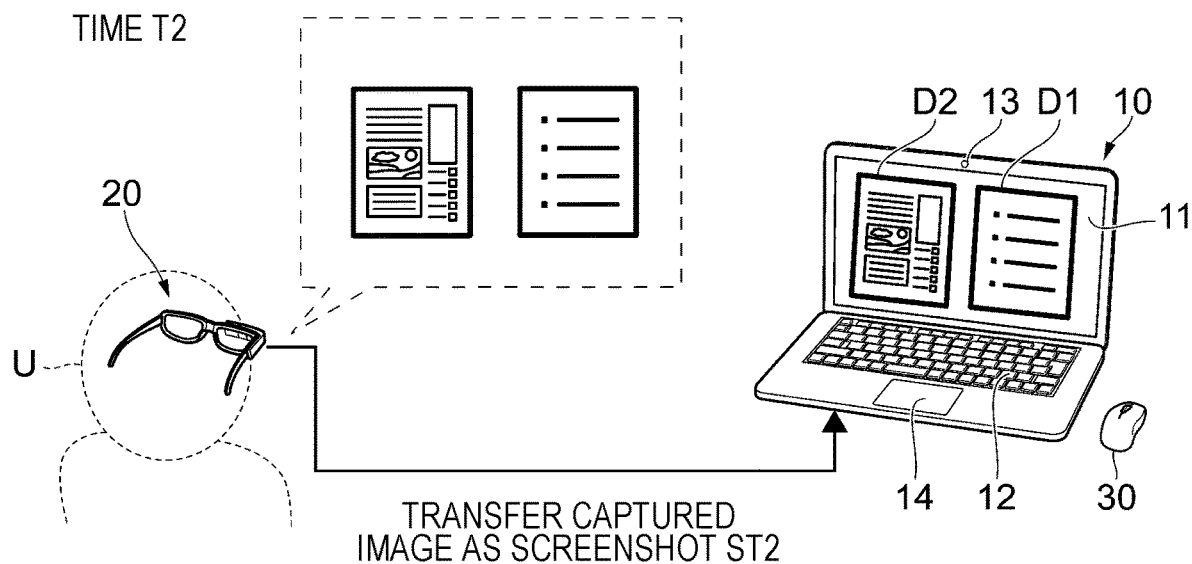

FIGS. 35A and 35B are diagrams illustrating an example of use of the XR device 20 according to the fourteenth exemplary embodiment. FIG. 35A illustrates an example of a screenshot ST1 at a time T1, and FIG. 35B illustrates an example of a screenshot ST2 at a time T2.

In order to identify a positional relationship with the display 11, the XR device 20 captures an image of a space in front of the user U using the camera 22. In the present exemplary embodiment, this function of capturing an image achieved by the camera 22 is used to obtain screenshots of the display 11.

In FIG. 35A, for example, an image of a document D1 displayed on the display 11 is captured as the screenshot ST1 and transferred to the computer 10. The screenshot ST1, however, may be stored in the XR device 20, instead.

In FIG. 35B, images of the document D1 and a document D2 displayed on the display 11 are captured as the screenshot ST2 and transferred to the computer 10.

Screenshots may be obtained at predetermined time intervals, namely every 1 minute, for example, or at timings specified by the user U. Alternatively, screenshots may be obtained when a change in the document D displayed on the display 11 is detected.

The computer 10 backs up each of documents D, but in the case of screenshots, the computer 10 can also record states of operations relating to the documents D.

Fifteenth Exemplary Embodiment

In a fifteenth exemplary embodiment, cooperation between plural computers 10 and the XR device 20 will be described.

Figure 36:
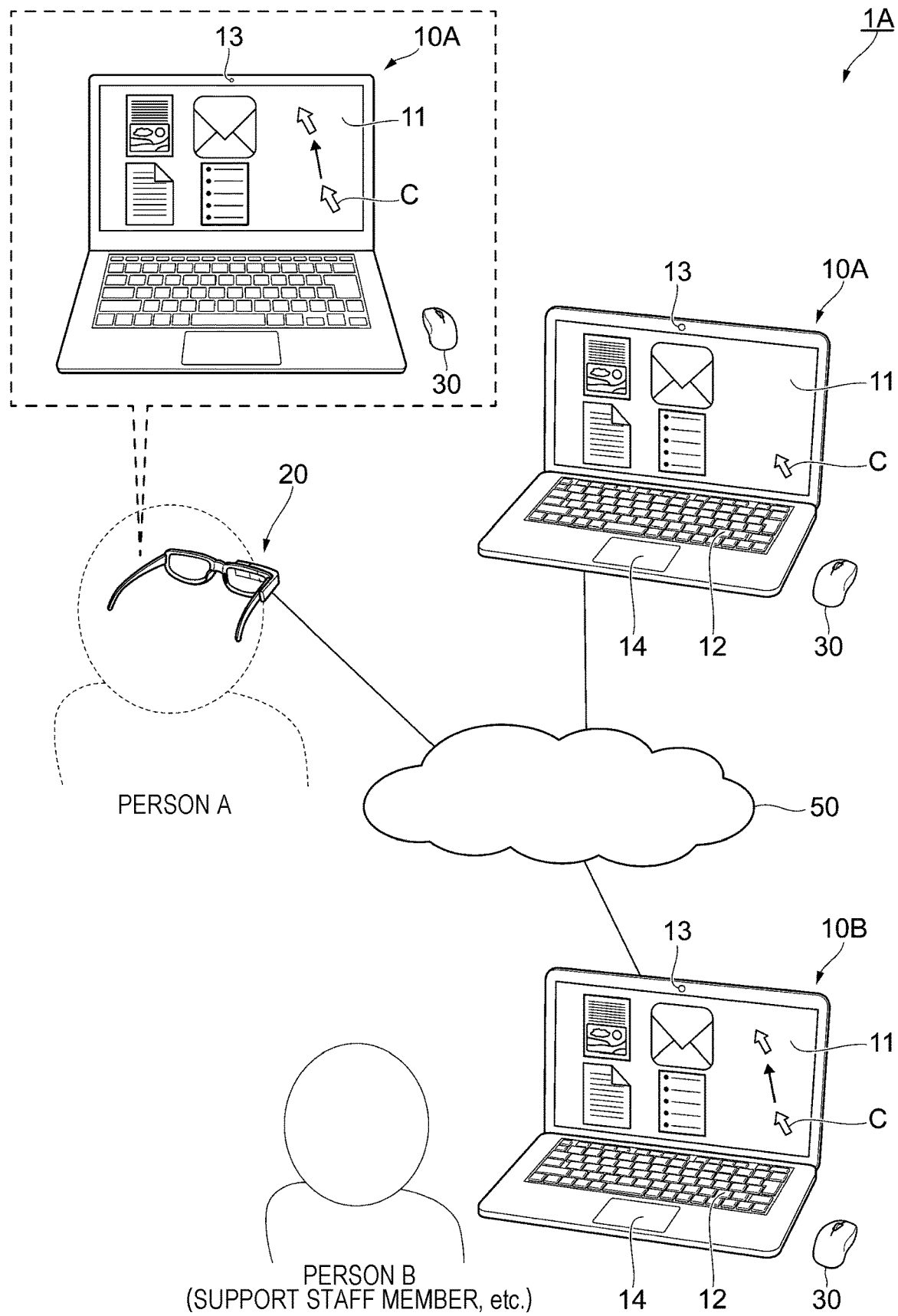
FIG. 36 is a diagram illustrating an example of use of an information processing system according to a fifteenth exemplary embodiment.

FIG. 36 is a diagram illustrating an example of use of an information processing system 1A according to the fifteenth exemplary embodiment. In FIG. 36, the same components as in FIG. 1 are given the same reference numerals.

In FIG. 36, a person A wearing the XR device 20 is operating a computer 10A. A person B, who is a support staff member, is operating a computer 10B.

In FIG. 36, the computers 10A and 10B are connected to each other through a network 50.

The network 50 is, for example, the Internet or a local area network (LAN).

In FIG. 36, the person B instructs the person A in the operation of a screen displayed on the display 11. In FIG. 36, the screen displayed on the display 11 of the computer 10A is not synchronized with a screen displayed on the display 11 of the computer 10B operated by the person B.

When the person B moves the cursor C on the display 11 of the computer 10B, the XR device 20 worn by the person A presents the movement of the cursor C as an AR image in front of the computer 10A operated by the person A. That is, the person B moves the cursor C in the AR image.

The person A recognizes the movement of the cursor C as an example of an operation that the person A should perform. The person A then moves the cursor C on the computer 10A using the mouse 30 or the like.

With this method, a learning effect is expected to improve compared to when the person A passively watches how the person B moves the cursor C. This is because the person A actively performs an operation on the computer 10A.

In addition, because the person B who is operating the computer 10B checks, over the network 50, the operation performed by the person A on the computer 10A, the person B can give feedback to the person A. For example, the person B can point out an incorrect operation. The feedback is also effective in improving the learning effect of the person A.

Sixteenth Exemplary Embodiment

In a sixteenth exemplary embodiment, too, cooperation between plural computers 10 and the XR device 20 will be described.

Figure 37:
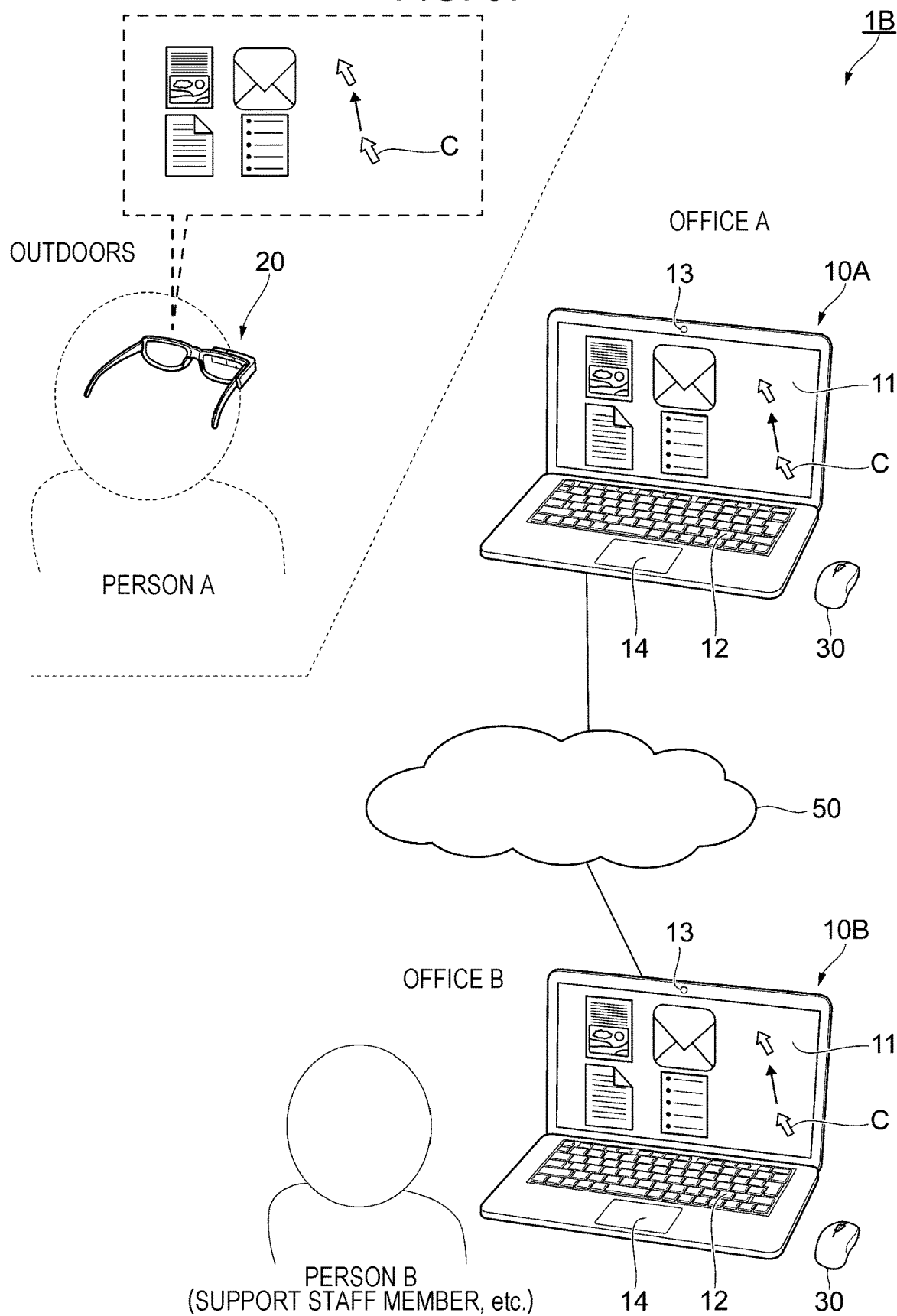
FIG. 37 is a diagram illustrating an example of use of an information processing system according to a sixteenth exemplary embodiment.

FIG. 37 is a diagram illustrating an example of use of an information processing system 1B according to the sixteenth exemplary embodiment. In FIG. 37, the same components as in FIG. 36 are given the same reference numerals.

It is assumed in the example illustrated in FIG. 37 that the person A who is outdoors permits the person B in an office B to operate the computer 10A in an office A. The person B operates the computer 10A of the person A using the computer 10B.

The person A illustrated in FIG. 37 checks an operation performed on the computer 10A on an AR image presented in the air by the XR device 20 worn thereby.

Seventeenth Exemplary Embodiment

In a seventeenth exemplary embodiment, cooperation between the XR device 20 and a computer 10 at a remote location will be described.

Figure 38:
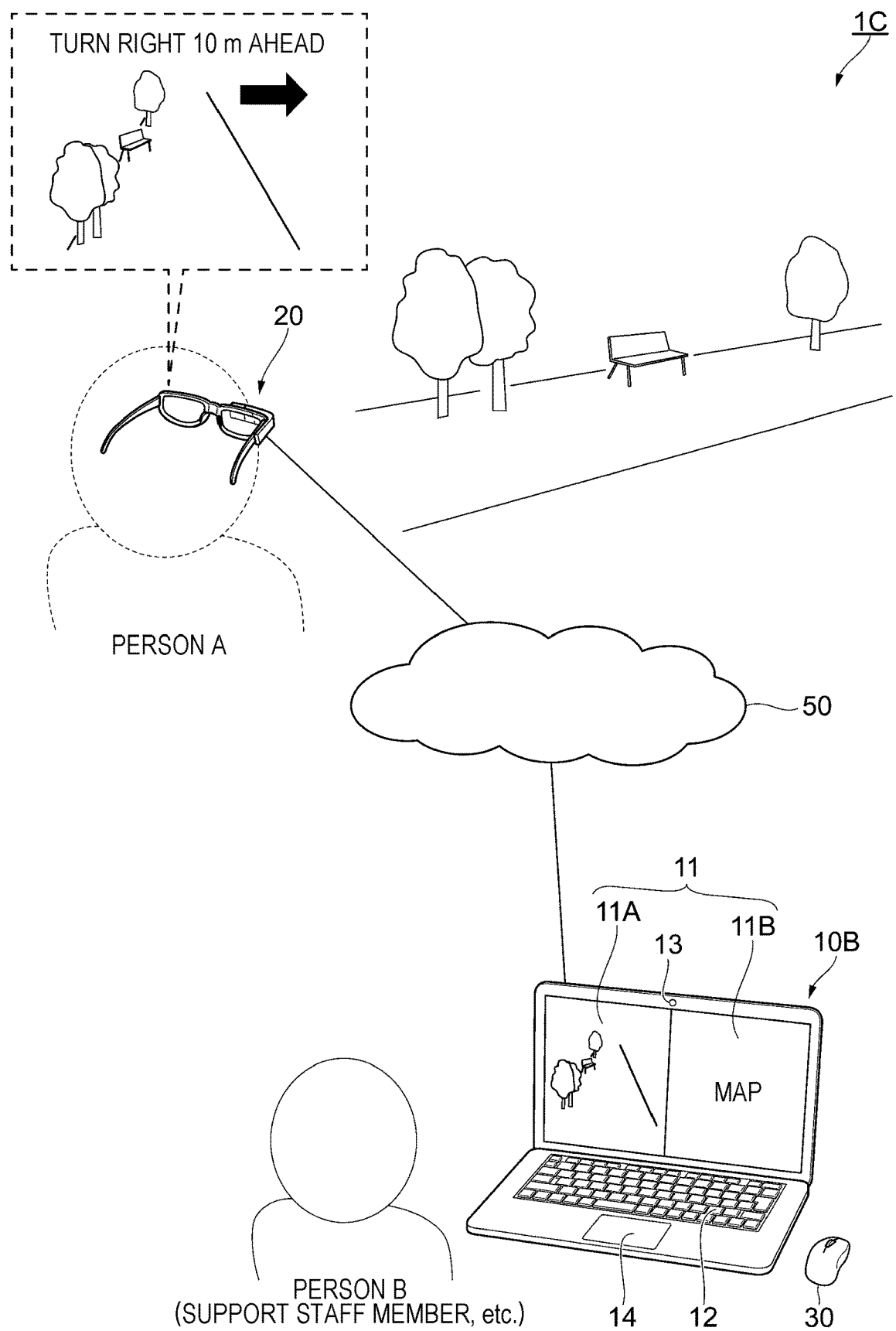
FIG. 38 is a diagram illustrating an example of an information processing system according to a seventeenth exemplary embodiment.

FIG. 38 is a diagram illustrating an example of an information processing system 1C according to the seventeenth exemplary embodiment. In FIG. 38, the same components as in FIG. 36 are given the same reference numerals.

It is assumed in the example illustrated in FIG. 38 that the person B guides the person A from a remote location. In the present exemplary embodiment, a left half of the display 11 of the computer 10B operated by the person B displays an image captured by the XR device 20 in real-time, and a right half of the display 11 displays a map around the person A.

The position sensor 26 (refer to FIG. 3) of the XR device 20 outputs information regarding a position of the person A to the computer 10B over the network 50.

If the person B inputs a sentence, "Turn right 10 m ahead", to the computer 10B, the same sentence appears in front of the person A as an AR image. The sentence may be output from navigation software executed on the computer 10B, instead. Similarly, instructions from the person B and arrows based on instructions from the navigation software are recognized by the person A as AR images.

Although the display 11 of the computer 10B operated by the person B displays an image captured by the XR device 20 in the example illustrated in FIG. 38, the computer 10B may display only a map and a marker indicating the position of the person A on the map, instead.

Although the person B operates the computer 10B in the fifteenth to seventeenth exemplary embodiments, the person B may also wear the XR device 20.

Eighteenth Exemplary Embodiment

Figure 39A:
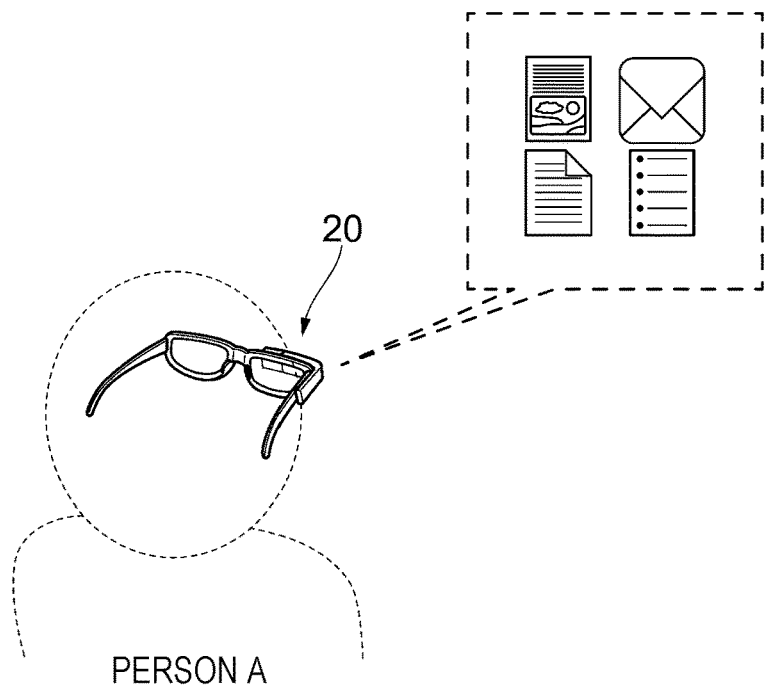
FIGS. 39A and 39B are diagrams illustrating an example of use of the XR device according to an eighteenth exemplary embodiment.
Figure 39A:
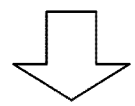
Figure 39B:
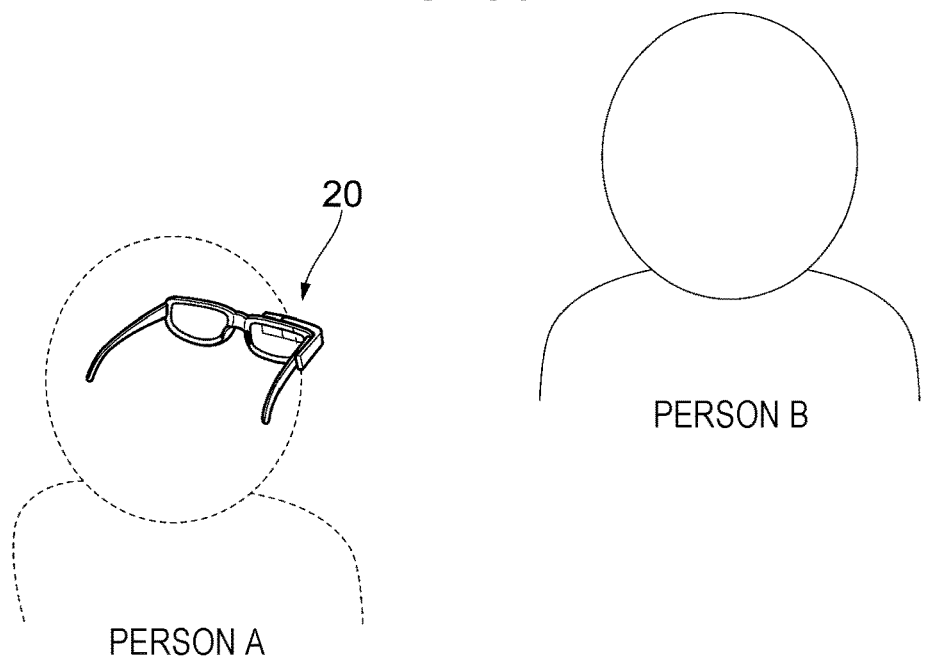

FIGS. 39A and 39B are diagrams illustrating an example of use of the XR device 20 according to an eighteenth exemplary embodiment. FIG. 39A illustrates a state before the person A meets the person B, and FIG. 39B illustrates a state after the person A meets the person B. In FIGS. 39A and 39B, the same components as in FIG. 1 are given the same reference numerals.

In FIG. 39A, the person A sees an AR image. With settings with which the AR image continues to be output even after the person A meets the person B, the AR image might overlap a face of the person B or the person A might not be able to focus on a conversation with the person B. It might also be rude to the person B that the AR image continues to be disposed even during a conversation with the person B.

In the present exemplary embodiment, therefore, the XR device 20 has a function of removing an AR image after the person A meets the person B.

The person B in the present exemplary embodiment is a person with whom the person A is to have a conversation in person. If a passenger in front of the person A is not determined, on the basis of an image captured by the camera 22 (refer to FIG. 3) or a voice obtained by the microphone 23 (refer to FIG. 3), to be a person with whom the person A is to have a conversation in person, therefore, the AR image continues to be output.

Nineteenth Exemplary Embodiment

Figure 40:
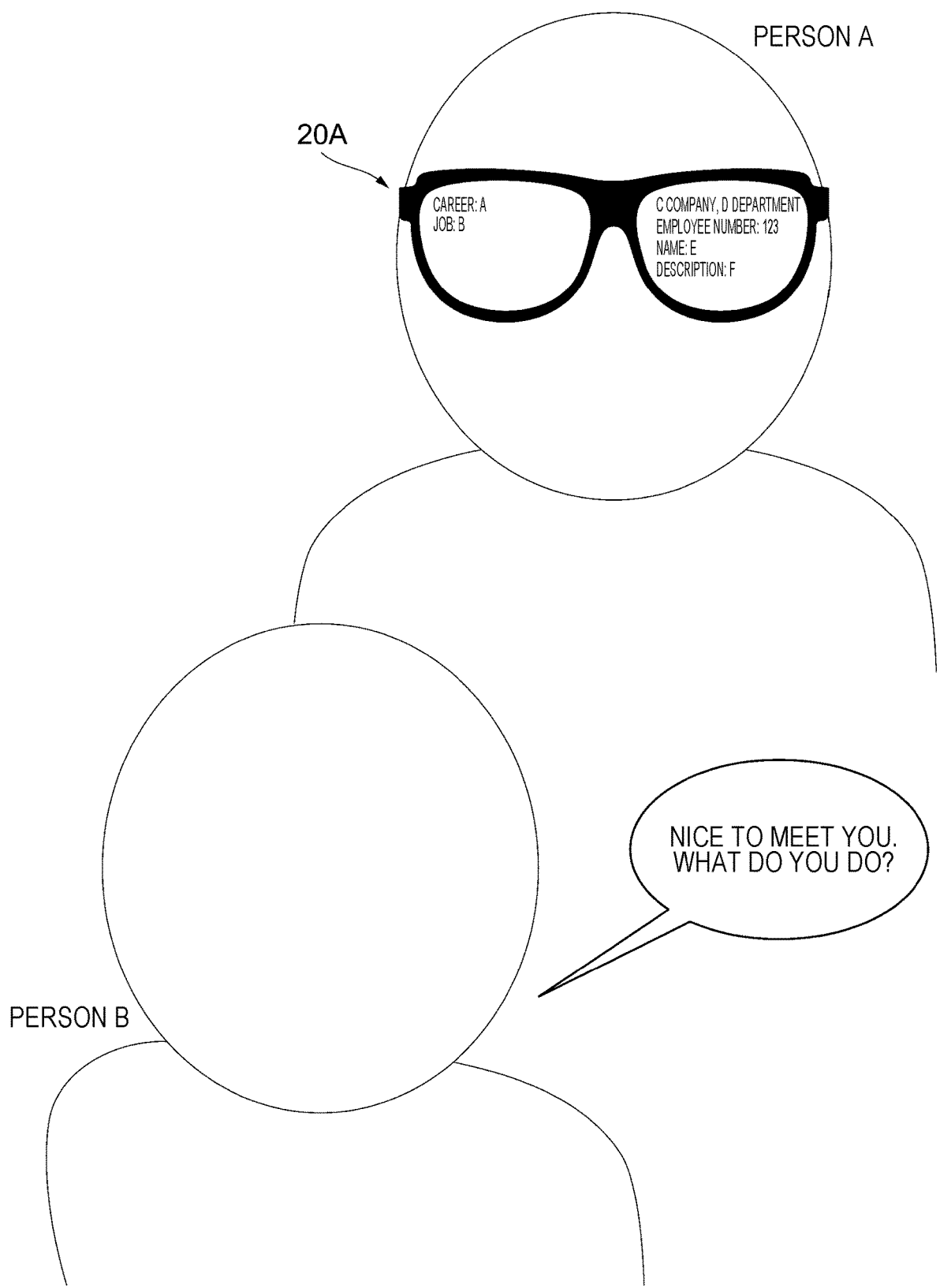
FIG. 40 is a diagram illustrating an example of use of an XR device according to a nineteenth exemplary embodiment.

FIG. 40 is a diagram illustrating an example of use of an XR device 20A according to a nineteenth exemplary embodiment.

In FIG. 40, the person B is talking to the person A, who wears the XR device 20A. The XR device 20A illustrated in FIG. 40 is capable of displaying a self-introduction of the person A to the person B, with whom the person A is having a conversation.

Figure 41:
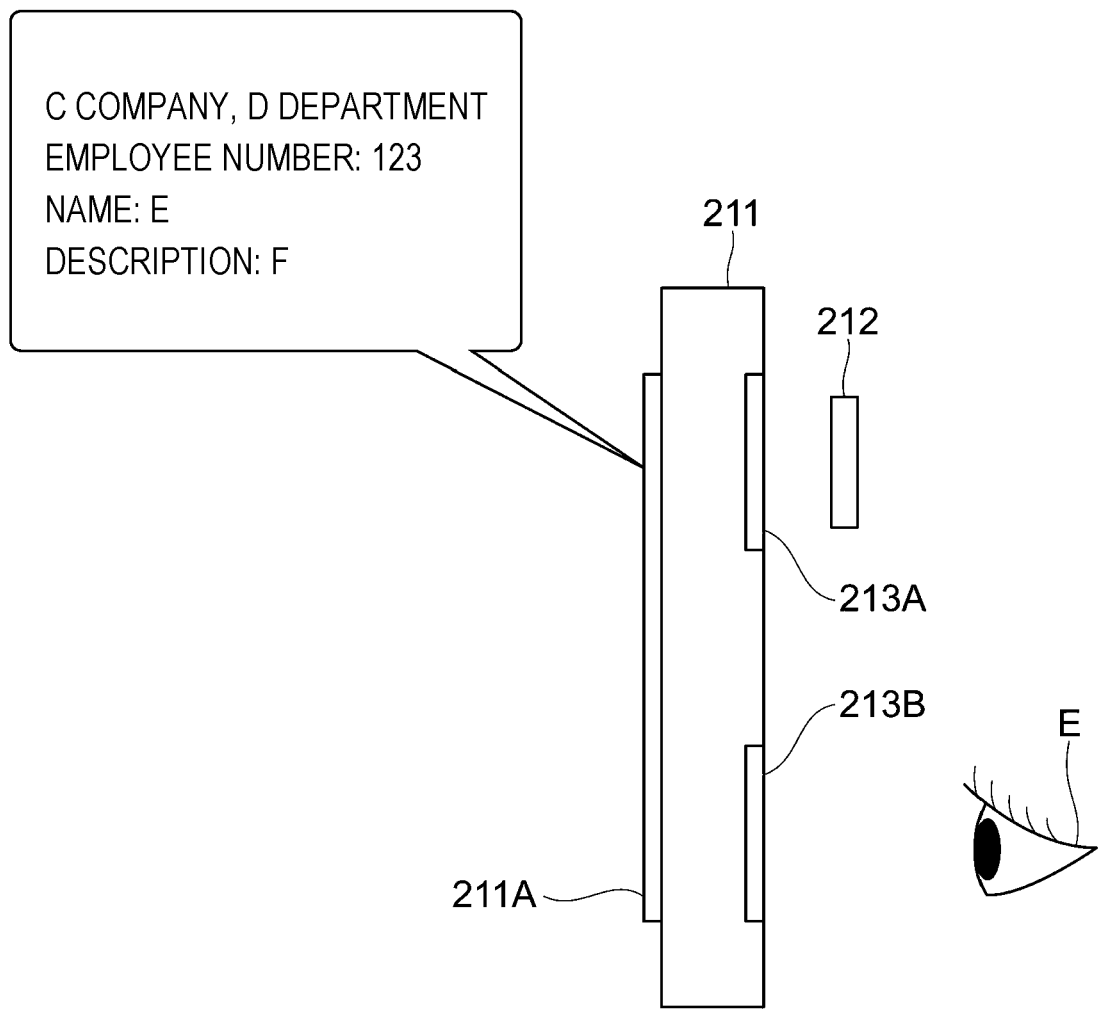
FIG. 41 is a diagram illustrating an example of the conceptual configuration of the XR device used in the nineteenth exemplary embodiment.

FIG. 41 is a diagram illustrating an example of the conceptual configuration of the XR device 20A used in the nineteenth exemplary embodiment. In FIG. 41, the same components as in FIG. 4 are given the same reference numerals.

In the XR device 20A used in the present exemplary embodiment, a film device capable of controlling light transmittance on a pixel-by-pixel basis is attached to a surface of the light guide plate 211. In the film device, a space between a pair of transparent electrode films is filled with a liquid crystal material. Light transmittance is changed on a pixel-by-pixel basis by controlling the orientation of the liquid crystal material for each pixel. Characters are displayed using this characteristic.

The self-introduction illustrated in FIG. 40 may be displayed in accordance with an instruction from the person A or when the XR device 20A detects a voice including one of keywords registered in advance, namely, for example, "Nice to meet you" and "What do you do". The XR device 20A detects keywords by analyzing voices obtained by the microphone 23 (refer to FIG. 3) using a voice recognition engine.

Twentieth Exemplary Embodiment

Figure 42:
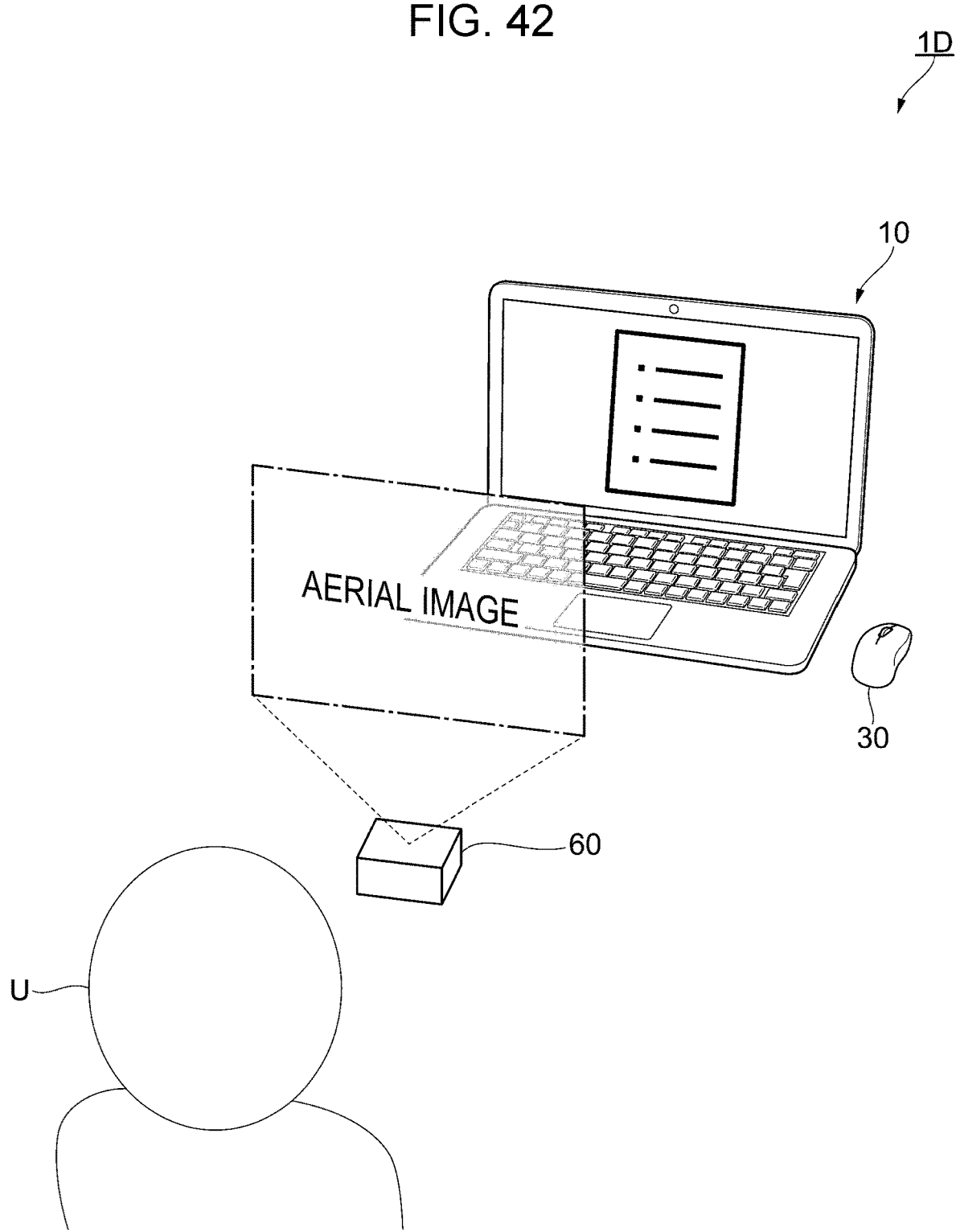
FIG. 42 is a diagram illustrating an example of the configuration of an information processing system used in a twentieth exemplary embodiment.

FIG. 42 is a diagram illustrating an example of the configuration of an information processing system 1D used in a twentieth exemplary embodiment. In FIG. 42, the same components as in FIG. 1 are given the same reference numerals.

In the present exemplary embodiment, an AR image is disposed in real space as an aerial image. The aerial image, too, is an example of the virtual image disposed in real space. The aerial image is formed in such a way as to float in the air. An aerial image forming apparatus 60 is used to form the aerial image.

The aerial image forming apparatus 60 directly forms an aerial image in the air. Various methods have been proposed for this purpose, and some of the various methods have been put into practice.

A method employing a one-way mirror, a method employing a beam splitter, a method employing a micro-mirror array, a method employing a micro-lens array, a method employing a parallax barrier, or a method employing plasma emission, for example, may be used to form an aerial image. A person can pass through an aerial image generated using one of these methods.

An example of an aerial image forming apparatus 60 that forms an aerial image that cannot be passed through is a projector that projects an image onto a screen that exists in real space. Another example of the aerial image forming apparatus 60 is an apparatus that moves an array of light-emitting devices in real space at high speed to generate an aerial image as an afterimage.

An aerial image may have a three-dimensional shape, a two-dimensional shape, or any other kind of shape. Examples of the three-dimensional shape include a sphere, a polyhedron, a curvilinear shape such as a cylinder, a person, an animal, an electrical appliance, and a fruit.

Examples of the two-dimensional shape include a circle, a polygon, a person, an animal, an electrical appliance, and a fruit. The person or the animal may be a virtual character or creature.

The aerial image formed in the air is not limited to an image that defines a surface of a solid, and may be a combination of an image that defines a surface of a solid and an image corresponding to the inside of the solid, instead. In other words, the aerial image may be represented by voxel data.

The aerial image according to the present exemplary embodiment may be a still image or a moving image.

Other Exemplary Embodiment (1) Although exemplary embodiments of the present disclosure have been described, the technical scope of the present disclosure is not limited to the above exemplary embodiment. It is obvious from the claims that the technical scope of the present disclosure also includes modes obtained by modifying or improving the above exemplary embodiments in various ways.

(2) Although an AR image is disposed in a space in front of the display 11 (refer to FIG. 1) in the above exemplary embodiments, an AR image may be disposed farther than the display 11, instead. In this case, however, the AR image is disposed behind the display 11, at which the AR image is not recognizable in real space.

(3) The operations performed by the XR device 20 (refer to FIG. 1) in the above exemplary embodiment may be performed by the computer 10 (refer to FIG. 1), instead. The operations performed by the computer 10, on the other hand, may be performed by the XR device 20, instead.

(4) Although an AR image is disposed in front of the screen of the laptop computer 10 (refer to FIG. 1) in the above exemplary embodiments, the computer 10 may be a monitor attached to a computer, a so-called television receiver, an Internet of things (IoT) home appliance, or a wearable terminal worn on the wrist, which is typified by a smartwatch, instead, instead of a desktop computer or the like mentioned above.

(5) Although information regarding the progress of downloading or the like performed by the computer 10 with which the XR device 20 cooperates is disposed in the air as an AR image in the above exemplary embodiment, the progress of an operation performed by an external apparatus connected to the computer 10 may be disposed in front of the display 11 as an AR image, instead.

When the external apparatus is a printer that prints images on sheets of paper or a three-dimensional printer that forms three-dimensional objects, for example, time taken for the printer to complete an operation may be disposed as an AR image. Alternatively, time taken for the printer to complete spooling may be disposed as an AR image.

(6) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
control a device that disposes a virtual image in real space; and
dispose, in a case where the device disposes the virtual image in front of a physical display device with an external terminal including the physical display device connected to the information processing apparatus, a button for requesting an operation of the external terminal as the virtual image, wherein the processor is configured to move the virtual image from the front of the physical display device to a different location in accordance with a line of sight of a wearer of the device when the wearer changes the line of sight to be away from the physical display device.

2. The information processing apparatus according to claim 1,
wherein the button is a selection button.

3. The information processing apparatus according to claim 2,
wherein the selection button is used to select whether to perform the operation of the external terminal.

4. The information processing apparatus according to claim 3,
wherein the operation of the external terminal is an operation that results in a change to a system configuration of the external terminal.

5. The information processing apparatus according to claim 3,
wherein the processor is configured to dispose, in real space as the virtual image, information indicating progress of the operation after the operation starts.

6. The information processing apparatus according to claim 1,
wherein the processor is configured to, if the physical display device displays a plurality of pieces of content, disposes information identifying one of the plurality of pieces of content associated with the button in real space as the virtual image.

7. The information processing apparatus according to claim 6,
wherein the information is disposed in real space above the one of the plurality of pieces of content.

8. The information processing apparatus according to claim 1,
wherein the button is an icon associated with an application.

9. The information processing apparatus according to claim 1,
wherein the processor is configured to, if a predetermined first condition is satisfied, dispose a cursor displayed on the physical display device of the external terminal in real space as the virtual image.

10. The information processing apparatus according to claim 9,
wherein the processor is configured to, if a predetermined second condition is satisfied, display the cursor disposed in real space as the virtual image on the physical display device.

11. The information processing apparatus according to claim 1,
wherein the processor is configured to, if a predetermined event is detected without the button having been used, output an alarm.

12. The information processing apparatus according to claim 11,
wherein the predetermined event is an operation for turning off the information processing apparatus, an operation for turning off the external terminal, an operation for removing the information processing apparatus from a body, an operation for disconnecting the information processing apparatus and the external terminal from each other, a case where a distance between the information processing apparatus and the external terminal exceeds a threshold, or a case where the virtual image disposed in real space is no longer located in front of the physical display device.

13. The information processing apparatus according to claim 1,
wherein the processor is configured to, if the information processing apparatus is disconnected from the external terminal without the button having been used and then connected to the external terminal again, dispose the button in real space again as the virtual image.

14. The information processing apparatus according to claim 1,
wherein the processor is configured to, if a positional relationship between the virtual image disposed in real space and the physical display device does not satisfy a predetermined condition, removes the virtual image from real space.

15. The information processing apparatus according to claim 14,
wherein the processor is configured to, in a case where the processor removes the virtual image from real space, fade out the virtual image from real space.

16. The information processing apparatus according to claim 14,
wherein the processor is configured to, even if the positional relationship between the virtual image disposed in real space and the physical display device does not satisfy the predetermined condition, continue to dispose the virtual image in real space in a case where there is a predetermined setting.

17. The information processing apparatus according to claim 1,
wherein the processor is configured to, if the positional relationship between the virtual image disposed in real space and the physical display device satisfies the predetermined condition, disposes the virtual image in real space again.

18. The information processing apparatus according to claim 17,
wherein the processor is configure to, in a case where the processor disposes the virtual image in real space again, fade in the virtual image in real space.

19. The information processing apparatus according to claim 17,
wherein the processor is configured to, even if the positional relationship between the virtual image removed from real space and the physical display device satisfies the predetermined condition, cause the virtual image to remain removed from real space in a case where there is a predetermined setting.

20. A non-transitory computer readable medium storing a program causing a computer that controls a device that disposes a virtual image in real space to execute a process comprising:
disposing the virtual image in front of a physical display device with an external terminal including the physical display device connected to the information processing apparatus; and
disposing a button for requesting an operation of the external terminal as the virtual image,
wherein the process further includes moving the virtual image from the front of the physical display device to a different location in accordance with a line of sight of a wearer of the device when the wearer changes the line of sight to be away from the physical display device.

* * * * *